(12) United States Patent
Brunk

(10) Patent No.: US 9,414,239 B2
(45) Date of Patent: Aug. 9, 2016

(54) SPACE TIME CALIBRATION FOR NETWORKS USING STATE MODEL OF NODE CLOCK PARAMETERS

(75) Inventor: Hugh L. Brunk, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 861 days.

(21) Appl. No.: 13/523,659

(22) Filed: Jun. 14, 2012

(65) Prior Publication Data

US 2013/0337825 A1 Dec. 19, 2013

(51) Int. Cl.
*H04W 24/00* (2009.01)
*H04W 64/00* (2009.01)
*G01S 5/02* (2010.01)

(52) U.S. Cl.
CPC .............. *H04W 24/00* (2013.01); *G01S 5/021* (2013.01); *G01S 5/0289* (2013.01); *H04W 64/00* (2013.01)

(58) Field of Classification Search
None
See application file for complete search history.

(56) References Cited

U.S. PATENT DOCUMENTS

| 7,876,266 | B2 | 1/2011 | Rhoads |
| 7,983,185 | B2 | 7/2011 | Rhoads et al. |
| 8,421,675 | B2 | 4/2013 | Rhoads et al. |
| 8,451,763 | B2 | 5/2013 | Brundage et al. |
| 2005/0037789 | A1* | 2/2005 | Rhee et al. ............. 455/507 |
| 2005/0255848 | A1* | 11/2005 | Cohen ...................... 455/445 |
| 2009/0213828 | A1* | 8/2009 | Brundage ........... G01S 5/0289 370/338 |
| 2009/0219815 | A1* | 9/2009 | Insler ..................... H04L 47/10 370/235 |
| 2009/0233621 | A1* | 9/2009 | Rhoads ................. H04W 64/00 455/456.1 |

OTHER PUBLICATIONS

U.S. Appl. No. 13/187,723, filed Jul. 21, 2011, entitled Multi-Path-Compensation Methods for Location-Determination of Mobile Devices.
U.S. Appl. No. 13/179,807, filed Jul. 11, 2011, entitled Location Aware Intelligent Transportation Systems.
Wright, "GPS Composit Clock Analysis", International Journal of Navigation and Observation vol. 2008 (2008), Article ID 261384, 8 pages.
Marques Filho, "Real Time Estimation of GPS Receiver Clock Offset by the Kalman Filter", Proceedings of Cobem 2003, $17^{th}$ International Congress of Mechanical Engineering, Nov. 10-14, 2003.
Haykin, Adaptive Filter Theory, Section 7.7, p. 320-334, 1996.

* cited by examiner

*Primary Examiner* — Charles C Jiang
*Assistant Examiner* — Thad Defauw
(74) *Attorney, Agent, or Firm* — Digimarc Corporation

(57) ABSTRACT

A space time calibration method determines location and timing for nodes in a network using a model of the state of clocks in the network nodes and observations of clock count stamps over an observation interval. At least one of the nodes in the network is moving, and the nodes have free running clocks, with corresponding clock error parameters. The method obtains observations of clock stamps for transmissions between nodes occurring over a time interval. It applies the observations to a model of network state, and generates from the model an update of network state. This update is a function of the observations and an estimate of the network state. The network state provides estimates of location parameters and clock parameters of the nodes in the network.

19 Claims, 30 Drawing Sheets

```
Plumbing_ID = PlumbingStruct {
    Who         .data
                .links
        session .data
                .links
        action  .data
                .links
        pung    .data
                .links
        LBR     .data
                .links
}
```

FIG. 10

SPACE TIME CALIBRATION FOR NETWORKS USING STATE MODEL OF NODE CLOCK PARAMETERS

TECHNICAL FIELD

The invention relates to positioning and timing systems, particularly for wireless network nodes.

BACKGROUND AND SUMMARY

Our previous patent disclosures describe a technology for determining position and timing of nodes in a network. These nodes are generally characterized as having independent, free running clocks, and one or more of the nodes is moving. The nodes communicate and share clock count information from which node position and clock parameters are derived. We refer to various embodiments of this technology as "space-time calibration," "PhaseNet," and "ZuluTime" (including the ZuluTime Web Service). For simplicity, we refer to this body of work as our space time calibration (STC) technology. This technology can be used to enhance the accuracy of positioning and timing within other systems, such as existing GPS or cell phone positioning systems, or may be used to build new positioning or timing systems, such as indoor positioning, asset tracking, phase calibration in smart meters for power distribution, etc.

Generally speaking, the space time calibration (STC) technology provides a framework for determining positioning and timing within a network of devices. The technology captures clock stamp values of independent clocks in network nodes upon transmission and/or receipt of signals transmitted between the nodes (called "pings"). It collects and organizes the clock stamp data for a grouping of nodes that communicate with each other over a time interval. In some embodiments, the nodes share clock stamps of pings in a data structure referred to as a "pung" or pung packet. For data collected over a solution interval, the technology formulates a system of equations to solve for location and/or timing parameters of the nodes in the network. The networks can be formed as an ad hoc network of mobile devices that communicate with each other using wireless communication techniques.

For more background on the STC technology, please see Assignee's U.S. Pat. Nos. 7,876,266, 7,983,185, Published US Patent Applications 20090233621 and 20090213828, and unpublished U.S. patent application Ser. No. 13/187,723 filed Jul. 21, 2011, entitled MULTI-PATH-COMPENSATION METHODS FOR LOCATION-DETERMINATION OF MOBILE DEVICES (Now published as US Patent Application Publication 2012-0309415), Ser. No. 13/179,807 filed Jul. 11, 2011, entitled LOCATION AWARE INTELLIGENT TRANSPORTATION SYSTEMS (Now U.S. Pat. No. 8,463, 290), 61/613,915, filed Mar. 21, 2012, entitled Positioning Systems for Wireless Networks (included in this specification), 61/645,589, filed May 10, 2012, entitled Location Based Router ("LBR")(included within this specification), which are hereby incorporated by reference in their entirety (referred to as "space-time calibration patents").

U.S. Pat. No. 7,876,266 describes schemes for computing a differential solution for node position and clock parameters for a time interval, and for deriving an "asymptotic" solution from differential solutions over a series of time intervals. The STC technology computes a differential solution that provides estimates of the changes in positions of nodes and clock rates and offsets, for time elapsed since a last solution based on count stamp differentials between pairs of nodes, and a coarse direction vector. The count stamp differentials are measured directly from count stamps provided by the nodes. The coarse direction vector is an estimate of the direction between two nodes.

The STC computes "asymptotic" solutions from a series of differential solutions. These "asymptotic" solutions refine the differential solutions by leveraging the data computed over time to compute more accurate results. Ultimately, differential values for change in position and clock rate are used to compute position and timing of the nodes within a frame of reference. This frame of reference may be one that is provided externally, such as reference locations or clock values provided by another system or known by some direct measurement. The frame of reference may be formed dynamically over time, as a composite solution computed from estimates of the position and clock parameters of one or more nodes in a network of devices.

One challenge of a differential approach is that errors in each differential solution may be compounded when combined together. U.S. Pat. No. 7,876,266 points to ways to address this error. This disclosure builds on the previous disclosure by detailing state models and applications of them for determining position and timing of nodes in ad hoc networks.

One aspect of the invention is a method for determining location and timing for nodes in a network. In this network, at least one, and possibly more, of the nodes is moving, and the nodes have free running clocks, with corresponding clock errors. The clock errors, in one embodiment, comprise clock rate and offset errors relative to a reference clock.

The method computes location and timing of nodes using a model of network state that provides updates to the state based on an estimate from a previous time interval and observations captured over a time interval. The method obtains observations of clock stamps for transmissions between nodes occurring over a time interval. It applies the observations to a model of network state. From this model, the method generates an update of network state based on the observations and an estimate of the network state. The network state provides estimates of location parameters and clock parameters of the nodes in the network.

In one embodiment, the method computes error in node position and timing for the time interval based on the observations and adds that error to the previous estimate to compute the update of position and timing.

The model of network state uses a linearized expression of position error. In one embodiment, the model of network state models position error of network nodes using a coarse direction vectors (CDVs) representing coarse directions between corresponding pairs of nodes. The CDV provides a way to linearize relationships between the error in a position of a node and a difference between estimated distances and observed distances based on flight times between a pair of nodes. In alternative embodiments, other approaches can be used to linearize position/timing relationships between nodes. The position error may be modeled using a quadratic equation (e.g., the square root of the sum of squares). This formulation of error can then be linearized using derivatives (differentiation of non-linear expressions of relationships). One systematic approach to linearizing non-linear equations is to use an Extended Kalman filter.

In one embodiment, the network state model is based on statistical properties of clocks within the nodes. While alternative Bayesian models may be applied, one embodiment of the model applies a Kalman filter based model.

In one embodiment, the model comprises a model of location error of nodes. For each new time interval the model provides an update of position of a node by adding a current estimate of node position error to a previous solution for node position. The state of the position of a node is initialized in the model as near a reference position. This is the initial estimate from which position error is estimated by the model based on observations of clock stamp data captured over a first interval. Subsequent estimates are determined recursively using the update as the estimate for the node position and calculating a new position error based on observations in the next interval.

Another aspect of the invention is a system for determining location and timing for nodes in a network. The system comprises a router, processing agent and solution agent. The router communicates with the nodes to receive ping data transmitted between the nodes. The ping data comprises observations of clock count stamps from clocks in the nodes for pings transmitted between pairs of the nodes.

The processing agent communicates with the router for receiving the ping data and organizing the ping data for a time interval.

The solution agent receives the organized ping data from the processing agent and applies the organized ping data to a model of network state. The solution agent generates from the model an update of network state based on the observations and an estimate of the network state. The network state provides estimates of location parameters and clock parameters of the nodes in a network.

In one embodiment, the system includes a grouping agent that communicates with the router to establish the network of nodes that participate in providing the ping data used to update the network state for a solution interval. The grouping agent communicates with the processing agent to identify the nodes that form the network for determining position and timing solutions by the solution agent. The processing agent, in turn, uses this identification of the nodes participating in the network to extract, sort and formulate count stamps.

In one embodiment, the solution agent uses a model of position error state, and updates that mode recursively for new observations in corresponding time intervals. The solution agent computes an update to node position and node timing parameters for a current time interval based on an estimate for that interval, and count stamps obtained from network nodes during the current time interval. The solution agent uses the updated position computed for nodes from a prior time interval for the estimate of position for the current time interval.

Another aspect of the invention is a method for determining position of a network of devices. This method receives timing for transmission of signals between pairs of nodes in a network. The timing provides time of flight of the signals based on internal, free running clocks in the nodes. The method initializes a model of state of position of the nodes in the network, and updates the model of state based on observations of the timing over a time interval to provide an estimate of positions of the node based on an input estimate position and the observations. Further features will become apparent with reference to the following detailed description and accompanying drawings.

BRIEF DESCRIPTION OF THE DRAWINGS

FIG. 10 depicts one example of a Plumbing Packet used in the LBR.

DETAILED DESCRIPTION

Overview of Space Time Calibration Technology

Figure 1:
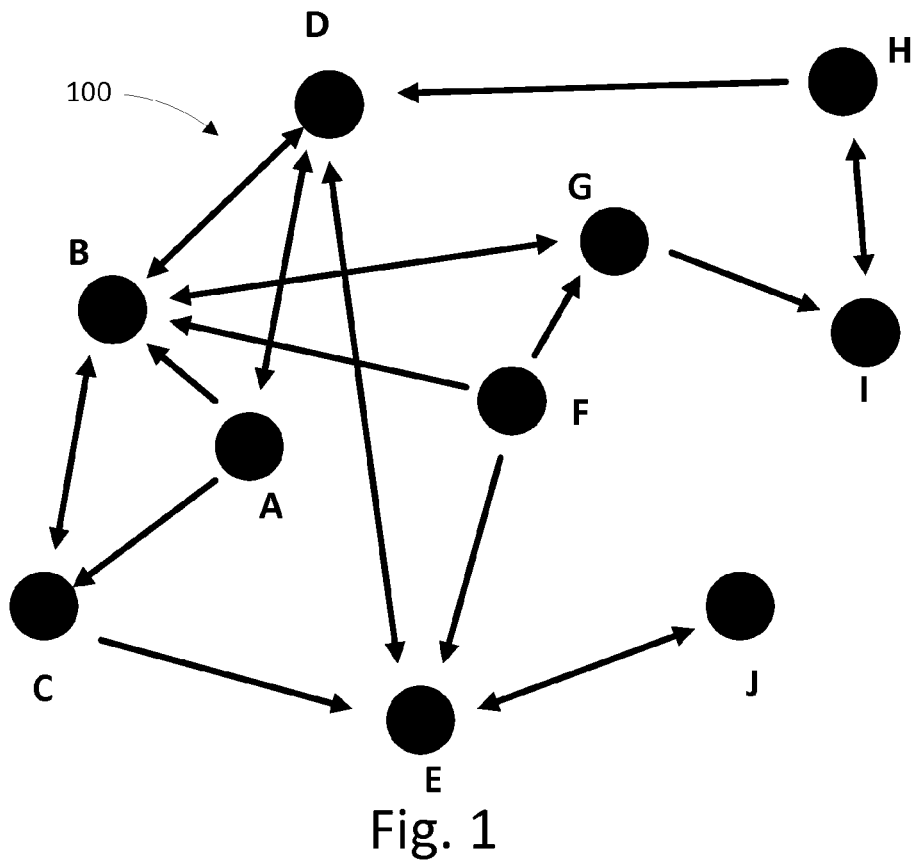
FIG. 1 illustrates a network of nodes in a network, along with inter-node communication of ping signals used to derive positioning and timing for nodes within the network.

STC technology operates within the nodes of a network, and messages passed between the nodes serve as input to a process for computing position and timing solutions. FIG. 1 illustrates an example of a network that includes ten nodes A, B, C, D, E, F, G, H, I, J. The network 100 may include different numbers of nodes and nodes may be added to or removed from the network 100 at any time. In this example, it is assumed that some of the nodes move with respect to the other nodes. For example, some of the nodes may be a cell phone communicating with cell stations, a Wi-Fi enabled device communicating with Wi-Fi access points, or moving vehicles such as automobiles or airplanes. Lines between nodes represent communication links (either a duplex link or a monoplex link). For simplicity, FIG. 1 does not show lines between each node. However, it is assumed that each node may establish duplex communication with any of the other nodes. Further, while the nodes in FIG. 1 are illustrated as being located in a two-dimensional plane, one skilled in the art will recognize from this disclosure that nodes may be distributed in a three-dimensional space.

Figure 2:
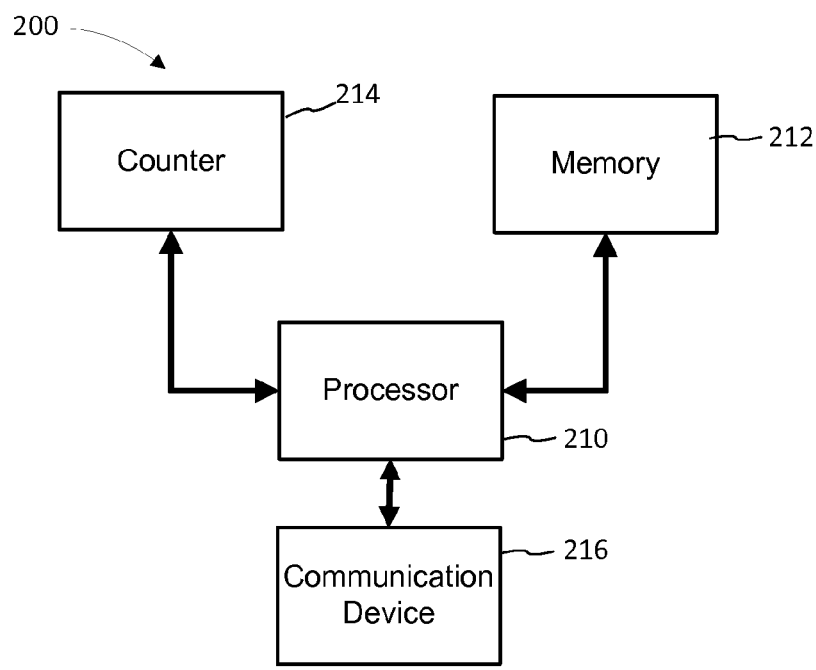
FIG. 2 is a block diagram illustrating components of a network node.

FIG. 2 is a block diagram illustrating an example configuration of a node 200. The node 200 shown in FIG. 2 may correspond, for example, to one or more of the nodes A, B, C, D, E, F, G, H, I, J shown in FIG. 1. The node 200 includes a processor 210 in communication with a memory device 212, a counter 214, and a communication device 216. The processor 210 may include, for example, digital signal processors, one or more field-programmable gate array (FPGA), general purpose single-chip or multi-chip microprocessors, special purpose processors, combinations of the foregoing, or the like. The memory device 212 may include, for example, random access memory (RAM), hard drives, drives that accept hard or floppy disks, tape cassettes, CD-ROM, DVD-ROM, or other computer-readable storage media. The memory device 212 includes program instructions that are executable by the processor 210 for determining space-time solutions as described herein. The memory device 212 may also include one or more databases (not shown) for storing data used to calculate the space-time solutions.

The communication device 216 is configured to provide communication with other nodes. In certain embodiments, the communication device 216 also provides an interface to other timing/location systems such as a GPS device. The communication device 216 may provide access to a variety of different types of networks that proliferate throughout our environment such as WiMax, WiFi, Cellular, Mesh Networks, Ad Hoc Networks, First Responder Radio, and Spaceborne systems such as Iridium and the GPS constellation itself. The communication device 216 may also provide access to wireline networks such as wireline IT networks, synchronization, geodetic remote sensing, and fiber optic backbone calibration networks. One skilled in the art will recognize from this disclosure (and the space time calibration patents incorporated herein) that many different communication networks and/or protocols may be used depending on the particular application.

In one embodiment, the counter 214 is driven by a low cost digital clock (not shown). The counter 214 may have at least a 64 bit counting range. The counter 214 is capable of running at approximately 1 million counts per second. The counter 214 may be built using cascades of counters, with 8 or 16 bit counters running at the highest speed, and driving lower rate 64 bit counters, for example. Of course, one skilled in the art will recognize from the disclosure that many other configurations may also be used. Given that STC solutions ultimately solve for count-rate variability between nodes, their quality may be commensurate with low-cost parts and basic performance specifications.

The STC technology weaves positioning and timing services into wireless communication networks, and may complement other location and timing technologies or function independently. The technology may be deployed across a wide variety of physical and network layer protocols. The technology exploits at least two aspects of a wireless network. The first aspect is that, by nature, the nodes in a wireless network are configured to pass messages between one another. The second aspect of a wireless network used by the technology is that each node has a local clock that may be used to count stamp the sending and receiving of messages.

In the general case, the messages passed between two network nodes take the form of pings and pungs. A ping transmit event includes a count stamped message from one node to another. The sending node appends to the message the value of its counter at the instant the message is transmitted. The receiving node then latches and records the value of its own counter when the message is received. The data resulting from a ping event includes, most basically, of a pair of count values. The first count is the clock value of the sending node when the ping transmit event was sent, and the second count is the clock value of a receiving node when it received the ping transmit event. The term "pung" is used to refer to any data communication between nodes of the network, such as sharing the data resulting from ping events, which is not itself a ping event. The STC technology takes the data resulting from ping events and pungs and uses it to solve for timing and/or location information useful for the nodes of the network. The specific form of this information is application dependent.

The method used by the STC technology to determine the locations of nodes is pseudo lateration. In lateration, the distances (or differences of distances) between nodes, derived by time-of-flight measurements, are used to solve for positions of nodes. However, the STC technology invokes lateration as but one element of a more sophisticated structure. This is because STC technology synthesizes both timing and position information for each node of the network. These two elements, timing and position, are intertwined.

To determine the positions of the nodes of a network using pure lateration implies accurate timing information is available to make time-of-flight measurements. Conversely, to synchronize the clocks within a network by passing synchronization messages between nodes requires that node positions are known, so that time-of-flight delays may be subtracted out. The STC technology handles the linked nature of time and space by solving for both elements simultaneously. This allows Phase-Net to do the following: Propagate position information throughout a network, even when only a few nodes have GNSS capability and/or access. Enhance the accuracy of Inertial Navigation System (INS) by developing a network solution using INS sensors across the network. Provide a background capability that is always available as a GNSS backup.

The STC technology starts with free-running clocks on each network node and, from these, synthesize a common network time and a relative location solution for the network. Before the STC technology is executed, there may not be pre-existing timing relationship between nodes, and no concept of what a "network time" might be. The free-running counters are used to count stamp messages passed between nodes, and the resulting count stamps are then processed by the STC technology.

Figure 3:
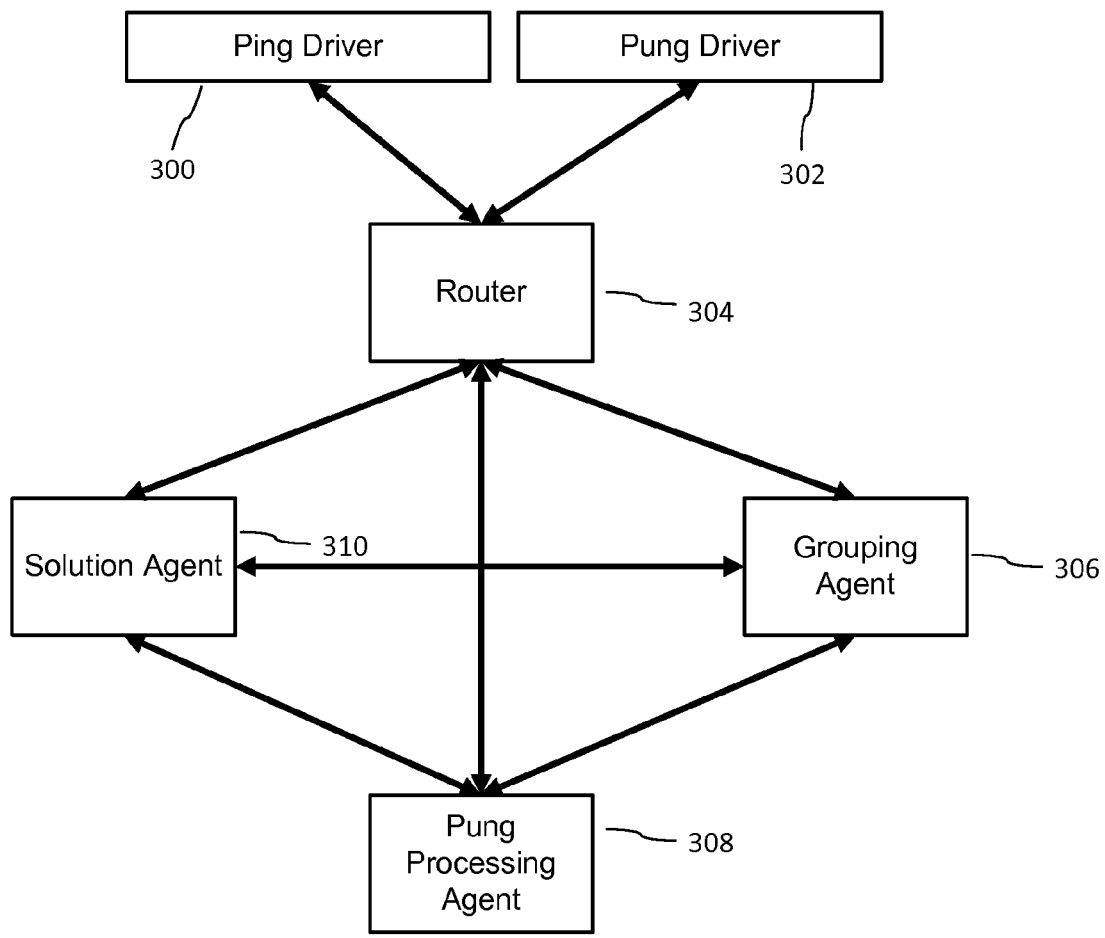
FIG. 3 is a block diagram of a space-time calibration system.

FIG. 3 is a diagram illustrating processing modules in a space time calibration system. This diagram is generally similar to the generic space time calibration unit (SCU) depicted in FIG. 14 of U.S. Pat. No. 7,876,266, which is incorporated by reference herein. We incorporate by reference the basic teachings of the SCU, its operation and data structures from U.S. Pat. No. 7,876,266. Additionally, the system of FIG. 3 includes processing modules of a location based router, which is described further in patent application 61/645,589, filed May 10, 2012, entitled Location Based Router (included in the specification), and 61/613,915, filed Mar. 21, 2012, entitled Positioning Systems for Wireless Networks (included in the specification), which are incorporated herein. The addition of a router to the SCU framework of U.S. Pat. No. 7,876,266 provides additional capability to provide location and timing solutions as a network service for multiple ad hoc networks of devices. Several such routers and supporting agents can be added to scale-up the processing capacity of the location and timing service.

The ping and pung drivers 300, 302 generally are intended to operate within nodes. The ping driver 300 is a processing module that interfaces with the node's clock, and controls the process of transmitting and receiving pings and associating count stamps with a ping upon transmission and receipt. The pung driver is a processing module that manages the formation of pung packet data structures and sharing of pung packets with other nodes, and the router 304. Preferably, these drivers have low level access to, and/or may be at least partially integrated within the circuitry of a device, to enable access to the device clock, radio, and digital signal processor that controls the wireless communication stack for the device.

The router 304 is a processing module that orchestrates the formation of a network of nodes and manages queries for location and timing solutions from nodes in the network. The router may operate within a node in the network or within another computer that is connected to the network of nodes, such as an access point in a wireless network that the nodes communicate with, or a server in a cloud based service that provides location and timing services to the nodes. The router 302 receives initialization requests from nodes in the network, and in response operates in conjunction with the grouping agent to establish a network of nodes that will participate in computing location and timing solutions for the nodes in that network.

Once a network of nodes has been established, the router 304 forwards pung packets from the nodes to the pung processing agent 308 for handling. The pung processing agent obtains information about the devices in a network from the grouping agent 306. The pung processing agent receives and parses pung packets from the nodes via the router, pre-qualifies the ping data within the pung packets and organizes it into a form for computation of position and timing solutions.

The solution agent 310 processes the ping data formatted by the pung processing agent 308 to compute position and timing solutions for nodes in a network. These solutions are routed back to the nodes in the network via the router 304.

The SCU described in U.S. Pat. No. 7,876,266 processed ping data to compute differential and asymptotic solutions of node position and clock rates and clock offsets. In the description to follow, we detail an embodiment that computes updated solutions for position and timing of nodes based on an estimate of position and timing parameters and observations of pings between nodes in a network observed over a time interval. Errors associated with differential solutions are not compounded.

In this approach, the solutions agent computes an update to node position and node timing parameters for a time interval (a "frame") based on an estimate for that interval, and count stamps obtained from network nodes during that interval. For the estimate of position for the current time interval, we use the updated position computed for the nodes from the last interval.

Figure 4:
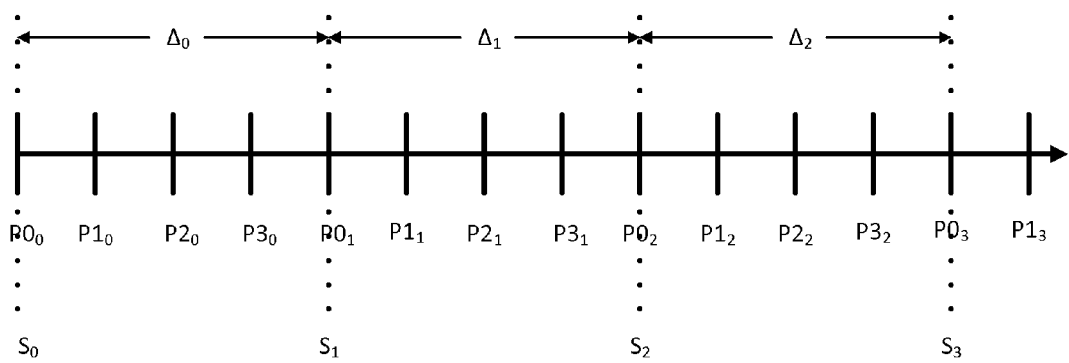
FIG. 4 is a diagram illustrating an example of the timing of pings between network nodes and intervals of time over which the data collected from these pings is used to compute a solution for timing and position of nodes in a network.

To help illustrate an approach, we begin with a diagram illustrating time periods over which ping data is collected and used to form a solution interval. FIG. 4 is an example illustrating an example of the timing of pings within a series of time intervals. We refer to these time intervals as "frames". In FIG. 4, the time interval between solution times, $S_0$, $S_1$, $S_2$, ..., are depicted as $\Delta_0$, $\Delta_1$, and $\Delta_2$, where the subscript notation corresponds to the frame number. The pings, identified as $P_{x_n}$ are shown as occurring at times within each frame, where x is the ping number within a frame and n is the frame to which it belongs. In this example, the pings are depicted as being transmitted by nodes at a uniform rate, but this is simply to illustrate an example, and need not be the case in practice.

Our approach employs a mathematical model of the state of position and timing parameters of nodes in the network. The model takes as input an estimate of network state and observations of clock counts exchanged among nodes of the network to produce an update to the state of the network. Our implementation of the model operates recursively, using an update as an estimate of the network state and observations for a time interval (e.g., frames $\Delta_0$, $\Delta_1$, and $\Delta_2$) to produce a new estimate of the state. This new estimate, in turn, is an update to the state, which becomes an estimate for the next update and observations.

The mathematical model for the position and timing parameters of network nodes is a probabilistic model that models the statistics of these parameters. The model falls generally within a family of Bayesian models in which the model of state relies on statistical properties of the variables in a system being modeled. In this particular case, the system is a network of nodes, and the variables are the positions of the nodes and clock parameters, such as the relative clock rates and clock offsets among the nodes.

In our STC formulation, as described in U.S. Pat. No. 7,876,266, relationships between nodes include the concept of a coarse direction vector. This vector provides a coarse direction between a pair of nodes. With this coarse direction, a system that models the network is formed as a set of equations that represent the relationships between pairs of nodes. The change in position and timing relationships between a pair of nodes is expressed as a function of the coarse direction vector, clock rate parameters (rate and offset relationships), and clock count stamp measurements for a ping transmitted between the nodes in a pair.

The particular model of state used in the following implementation falls within a Kalman filter family, which is also known as Linear Quadratic Estimation (LQE). There are many variants of a Kalman approach that may be used depending on the attributes of a particular network system being modeled as noted below. A Kalman approach uses a series of observations (also called measurements) over time having random variations and errors to produce estimates of variables of the system. It provides a minimum squared error estimate solution for variables in the system. A Kalman approach is recursive providing an estimate of system state based on observation and the system state. The model of state in a Kalman approach produces an estimate of current state variables and uncertainties of these variables.

With a new observation, the state is updated using a weighted average, with more weight given to estimates of variables having more certainty. The weights are calculated from covariance, a measure of uncertainty of the state produced by the model. The model produces a new estimate that is a weighted average of observed and predicted state.

A baseline Kalman approach is based on assumptions that the underlying system has certain properties. One property is that the system is modeled as a linear dynamical system. Another property is that the variables and error terms in the system have certain statistical attributes enabling a mathematical model of state to be derived This property is that the statistical distribution of variables and error terms is a Gaussian distribution.

However, despite these baseline assumptions, variations of the baseline approach have been developed to deal with systems that do not quite fit the baseline assumption. Examples of variations include an Extended Kalman Filter and an Unscented Kalman filter, which operate on non-linear systems. Other examples are where certain variables or error terms are approximated as having a Gaussian distribution.

In our application domain of positioning and timing for communicating nodes, there are noise sources that do not fit the assumption of the baseline Kalman filter. One example is multipath delay in a ping transmitted between nodes. This and other error sources can be estimated and compensated for so that the Kalman approach can be applied. For a discussion of multipath estimation and mitigation, please see related STC formulations described in U.S. patent application Ser. No. 13/187,723 filed Jul. 21, 2011, entitled MULTI-PATH-COMPENSATION METHODS FOR LOCATION-DETERMINATION OF MOBILE DEVICES (Now published as US Patent Application Publication 2012-0309415), and 61/613,915, filed Mar. 21, 2012, entitled Positioning Systems for Wireless Networks (included in the specification), which are incorporated herein by reference.

Relatedly, the mathematical expression of the system can be formulated such that terms that would otherwise violate baseline Kalman assumptions are removed or rendered negligible. One example of this is a differential expression of terms in the STC system of equations that removes or mitigates the effect of sources of noise. For example, noise sources that are approximated as being substantially in common for each node in a pair of nodes may be removed or reduced in a differential expression of the relationship of a variable affected by the noise in each node. Another example is to simulate variables as random variables as noted below for the case of simulating clock errors.

Discrete-Time Kalman Filter

In the implementation of a discrete Kalman filter for our STC system, we have an N-Dimensional State Column Vector Random Process that we want to estimate on the basis of observing an M-Dimensional Random Process.

(1) Process Equation:

$$x[n+1]=F[n+1,n]\times[n]+V_1[n],$$

where
$x[n]$: state vector at time n (N×1)
$F[n+1, n]$: state transition matrix (N×N)
$V_1[n]$: Process noise (N×1, Gaussion).

(2) Observation Equation:

$$y[n]=C[n]\times[n]+V_2[n],$$

where
$y[n]$: observed vector at time n (M×1)
$C[n]$: observation matrix at time n (M×N)
$V_2[n]$: observation noise.

Kalman State Vector Construction

In the example implementation that we depict here, we assume that the locations of the network nodes are two-dimensional, and we have three or more fixed nodes with known locations. These three or more fixed nodes allow the system to set a frame of reference relative to the coordinate space established by the plane passing through the location coordinates of these three nodes. Of course, this method extends to three dimensional locations and the number of fixed nodes with known locations can vary. We also make a clock on one of the nodes, node 0, the reference node. For the initial example, we assume that the clock of that reference node is perfect. Later, we show how a system clock can be derived as a function of the reference clock and clock parameters of the other nodes that are solved for relative to that reference clock using the mathematical model of the network state.

The following are the definitions of the elements in the state vector:

$e_{x_i}$ is the error in estimating the x location coordinate of the $i^{th}$ unknown node, and
$e_{y_i}$ is the corresponding y location coordinate error. $0 \leq i < k$.
rate_offset$_i$ is the clock rate offset error of a clock in the $i^{th}$ node, in parts per million, relative to the frequency of a reference clock. $1 \leq i \leq j$.
clk_err$_i$ is the error of node i's clock, relative to the reference node's clock. $1 \leq i \leq j$.

For this example, we have j nodes in total, and k=j−3 nodes whose location is unknown. In this case, the state vector consists of all:

$e_{x_i}$, $e_{y_i}$, rate_offset$_i$, and clk_err$_i$ error values.

This state vector has 2 k+2(j−1) elements.

State Transition Matrix F[n+1, n]

In this embodiment, software instructions compute locations using an "Error State" Kalman filter. The state transition equation for the location errors are:

$$e_{x_i}[n+1] = 10^{-5} e_{x_i}[n] + V_1$$

$$e_{y_i}[n+1] = 10^{-5} e_{y_i}[n] + V_1$$

The factor, $10^{-5}$, in the above transition equation is a small value chosen to insure computability of Kalman filter update equations.

The transition equation for the timing errors are:

$$\text{rate\_offset}_i[n+1] = \text{rate\_offset}_i[n] + \text{very small noise}$$

$$\text{clk\_err}_i[n+1] = \text{clk\_err}_i[n] + \Delta \cdot 10^{-6} \cdot \text{rate}_{\text{offset}_i}[n] + V_1$$

where $\Delta$ is a time interval between solutions (see, e.g., the depiction of these intervals in FIG. 4).

The implementation uses the above equations to construct the State Transition Matrix, F, of the Kalman filter. For location error, we have $10^{-5}$ at the diagonal elements. For rate offset, we assume that the rate offset changes randomly, and very slowly over time, and thus, have 1 at the diagonal. In some applications, one could model the change in rate offset over time as a function of a variable, such as temperature. For the state transition matrix rows constructed from the state transition equation of clock error, we have a 1 on the diagonal and $10^{-6}$ for the elements of the row corresponding to the rate offsets.

Thus, for our example of a network with 4 nodes (three that are in fixed position) in a two dimensional space, each with its own free running clock (with one clock assumed to be perfect, acting as a reference clock), we have the following state transition matrix:

$$F = \begin{bmatrix} 10^{-5} & 0 & 0 & 0 & 0 & 0 & 0 & 0 \\ 0 & 10^{-5} & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 10^{-6} & 0 & 0 & 1 & 0 & 0 \\ 0 & 0 & 0 & 10^{-6} & 0 & 0 & 1 & 0 \\ 0 & 0 & 0 & 0 & 10^{-6} & 0 & 0 & 1 \end{bmatrix}$$

$$x = \begin{bmatrix} e_{x_0} \\ e_{y_0} \\ \text{rate\_offset}_{0_1} \\ \text{rate\_offset}_{0_2} \\ \text{rate\_offset}_{0_3} \\ \text{clk\_err}_{0_1} \\ \text{clk\_err}_{0_2} \\ \text{clk\_err}_{0_3} \end{bmatrix}$$

This selection of 4 nodes (including 3 fixed) is for the purpose of illustration only. The approach is flexible and can accommodate more nodes and more nodes for which the location is not known (e.g., the node is moving, and thus, contributes a position error term in the state model equations). Just as a clock is selected as a reference for relative time solutions, so too can a node (or set of nodes) be selected as being a reference for relative position solutions. In particular, one of the nodes is selected as being near an origin (at an origin with some associated uncertainty). A reference coordinate space for node position is formed relative to this origin: for example, a first node is selected as positioned at this origin, a second node is selected as being positioned along a vector chosen to be the positive x axis, and a third node is selected as positioned in a positive x-y plane. In sum, these three nodes form a reference coordinate space. The position error update for each interval is then used to update the position estimate from the prior interval relative to this coordinate space. Over time, node positions are calculated relative to each other using this this selected coordinate space and initial relative positions.

We note that, for clocks in wireless devices such as cellular phones, Wi-Fi enabled devices, GPS receivers, etc., the clock error can be modeled as non-white Gaussian noise (e.g., as an auto-regressive process). The clock errors can be simulated as random variables using a method for simulating correlated noise. See, for example, "Simulating Correlated Noise" in the book entitled Optimal State Estimation, Kalman, Hoc, and Nonlinear Approaches, by Dan Simon, 2006, at 2.7, pages 73-75.

Process Noise Correlation Matrix

To construct the Process Noise Correlation Matrix, the system models noises within the vector as independent.

$Q_1[n]$ is a diagonal matrix, with the elements of the diagonal being variances of the corresponding variable.

The variance of noise for locations of nodes is approximately equal to the variance of motion of the nodes between the times at which the location of the nodes is computed.

The variance of noise for the clock rate offsets of the clocks in the nodes is very small, and we can tune the value of this variance as appropriate for the application.

The variance of noise for clock errors is found by measuring the clock errors of clocks used in the application, and computing the variance of the measured clock errors.

Observation (Measurement) Noise Correlation $Q_2[n]$ is a diagonal matrix, again with the elements of the diagonal being the variance of the corresponding variable. The size of the matrix depends on the number of observed pings in an interval. The variance terms put in this matrix model the count stamp error in the count stamp difference from the clocks of the corresponding transmitting and receiving nodes.

The size of this matrix varies with time according to the number of pings and the corresponding node pairs participating in the transmission and receipt of a ping.

Figure 5:
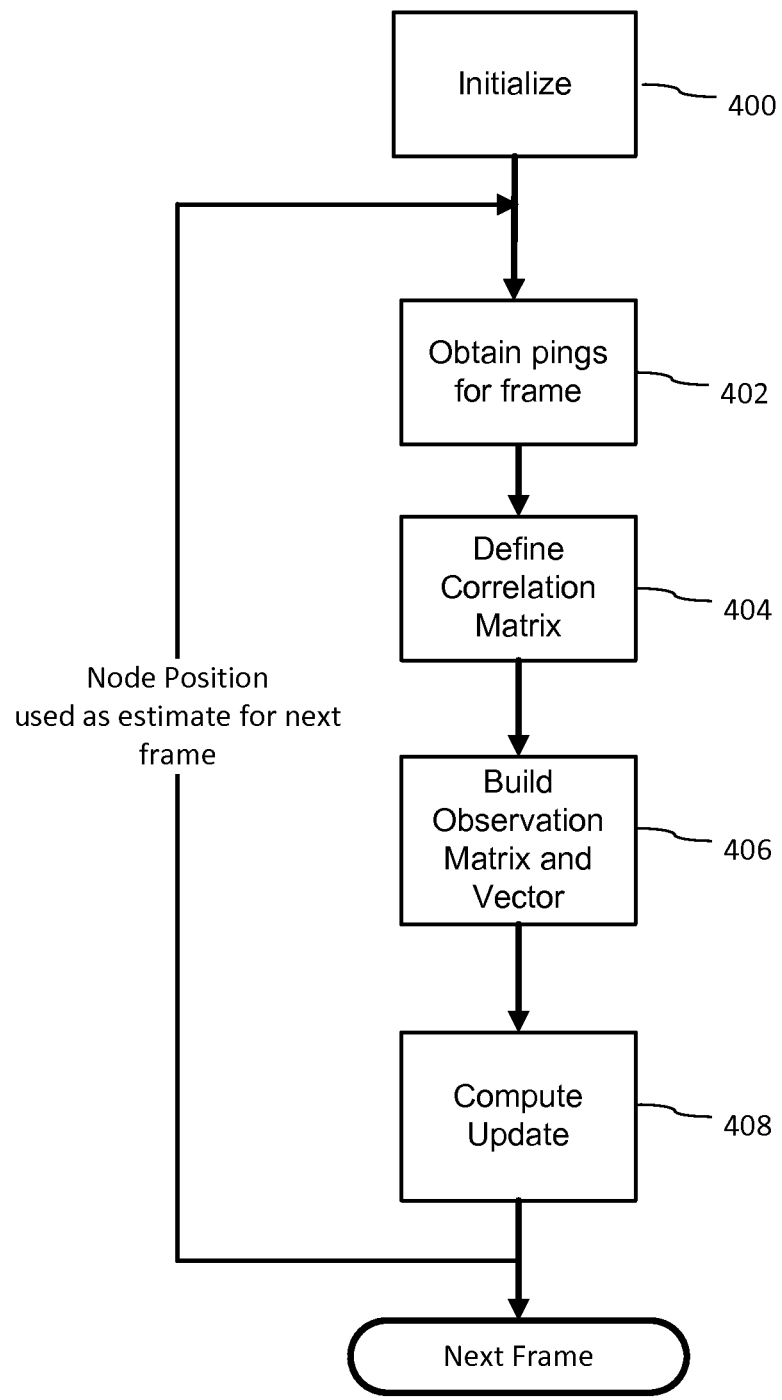
FIG. 5 is a flow diagram illustrating a process for updating node position and clock parameters over solution intervals based on observed ping data within the solution intervals.
Figure 6:
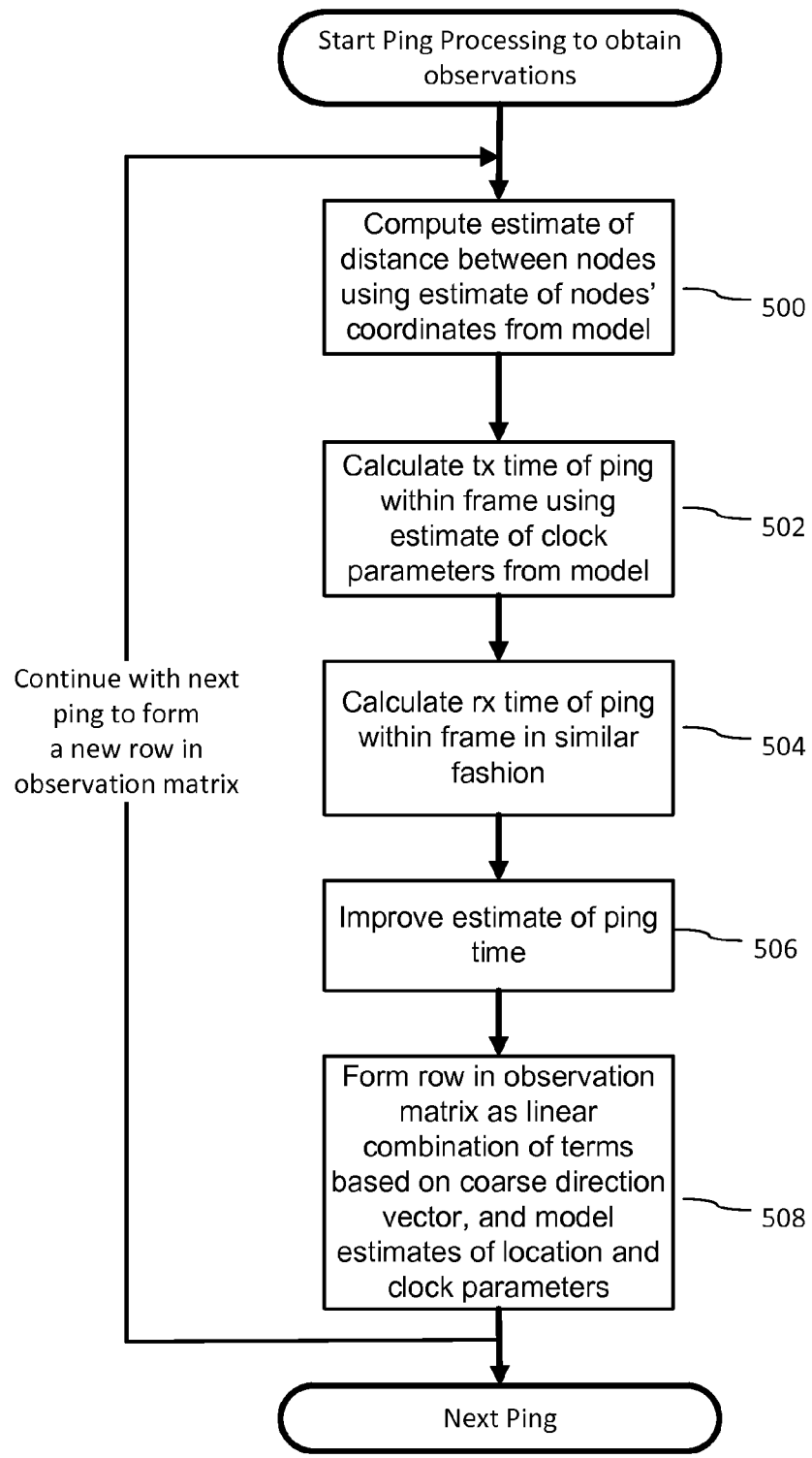
FIG. 6 is a flow diagram illustrating a process for constructing an observation matrix of ping data from pings occurring among nodes within a solution interval.

Having now defined the matrices in the Kalman filter construction, we now explain how the solution agent applies the filter to obtain solutions from observations of ping events during a frame. FIG. 5 is a flow diagram illustrating steps for initializing and then applying a state model to compute an update of position and timing parameters for a solution interval. FIG. 6 is a flow diagram illustrating in more detail the process of building the observation matrix and observation vectors. The description of the solution processing follows with reference to FIGS. 5 and 6.

Initialization

Before running the model to generate updates of system state, the model is first initialized (400). The initial estimate is:

$\hat{x}(1|y_0)=E[x[1]]$, and the correlation matrix of the initial estimate error is:

$$K(1,0)=E[(x[1]-\hat{x}(1|y_0))(x[1]-\hat{x}(1|y_0))^H]$$

In this initialization, the system sets initial estimate values for clock and location parameters and provides corresponding values for the uncertainty (e.g., variance) of these initial estimates. In the case of clock parameters, the error is initially set at zero as it is assumed that the initial difference between the clock parameters and a reference is just as likely to be positive or negative, netting to zero. Likewise, with the initial estimate of location relative to an origin, the system puts the initial location estimate near an origin. In both cases, the corresponding uncertainty of these estimates is high. Thus, regardless of the initial estimates, the confidence is low, and the model will assign lower weight to the initial estimate relative to the weight of observations made in the first interval. Over time, the weight to the estimates increases and the observations decrease, as the confidence in the estimates generated from the model increase relative to the confidence in the accuracy of the observations.

Regular Processing

After initialization, the recursive process of making observations and then computing updated estimates based on the state and these estimates begins and repeats for each frame. For each frame, the solution agent obtains the corresponding pings (402), and constructs an observation error (noise) correlation matrix (404) and observation matrix (406).

The processing flow proceeds as follows:
1. Define the correlation matrix $Q_2[n]$ based on the number of pings (404).
2. Build the observation matrix and observation vector y[n] (406)

FIG. 6 is a flow diagram illustrating the processing flow of configuring the observations obtained from the pings into the observation data structure used in the model of the system.

For each received ping:
Calculate the estimated distance D between nodes tx_IND and rx_IND (500).

$$\hat{D}=|Locs[rx\_IND]-Locs[tx\_IND]|$$

The observation vector is built on the following expression of time of flight of a ping between nodes:

$$y = \frac{\hat{D}}{c} - (t_{rx} - t_{tx})/\text{clk\_freq}$$

c is the speed of light;
$t_{rx}$ and $t_{tx}$ are timestamps in clock counts at which the ping is received at the receiving node and transmitted at the transmitting node.

Calculate the estimated transmit time of a ping within a frame (502).

tx_est_err is the prior estimated error of the clock of the transmitter node.
tx_est_rate is the prior estimated rate error of the clock of the transmitter node.

$$tx\_inst = \frac{\left[\frac{t_{tx}}{\text{clk\_freq}} - (\text{num\_start} + tx\_est\_err)\right]}{(1 + 10^{-6} \cdot tx\_est\_rate)}$$

num_start is the reference node, node 0, clock time at the start of the current frame.

tx_inst is the estimated time into the current frame.
Calculate rx_inst in an analogous way (504).
Improve estimated ping time (506):
This improved estimate is calculated, e.g., by averaging the estimates as follows:

$$Est\_inst = \frac{tx\_inst + rx\_inst}{2}$$

Now, construct a row of the observation matrix (508). As explained here, the row is an expression for the observed change in state as function of a coarse direction vector between the nodes, current estimates of the transmitting and receiving nodes' clock parameters, and the estimated time of the ping.

First, we define a coarse direction vector, CDV, that provides a coarse direction between the two nodes:

$$CDV = \frac{Locs[rx\_IND] - Locs[tx\_IND]}{\hat{D}}$$

$$CDV = (CDV_x, CDV_y)$$

A row of the observation matrix represents the following linear combination of terms:

$$y = \frac{-CDV_x}{c}e_{x_{tx}} - \frac{CDV_y}{c}e_{y_{tx}} + \frac{CDV_x}{c}e_{x_{rx}} + \frac{CDV_y}{c}e_{y_{rx}} + 1 \cdot \text{clk\_err}_{tx} -$$
$$1 \cdot \text{clk\_err}_{rx} + 10^{-6} \cdot est\_inst \cdot rate\_offset_{tx} - 10^{-6} \cdot est\_inst \cdot rate\_offset_{rx}$$

Note that the location error terms appear in a row in the matrix only if the corresponding node location is unknown.

Having now obtained the input observation vector and observation matrix, C[n], the Kalman filter is updated. In the processing flow shown in FIGS. 5 and 6, processing exits FIG. 6 and proceeds to compute the update to the model as shown in block 408 of FIG. 5. Below, we describe an example of this update process 408 in more detail.

First, we define the Kalman filter components, and the expressions used to compute the updates based on the observations and state of the model from the last solution. For more background on this Kalman formulation, see e.g., Haykin, Adaptive Filter Theory, Section 7.7, page 321.

Kalman Gain

The Kalman Gain is computed as follows using the state transition matrix, F, state estimate error correlation matrix K(n, n−1), observation matrix, C(n), and model of the observation noise, $Q_2(n)$:

$$G(n)=FK(n,n-1)C^H(n)[C(n)K(n,n-1)C^H+Q_2(n)]^{-1}$$

The Kalman gain is a function of the relative certainty of the observations and state estimate, and can be "tuned" to achieve particular performance. With a high gain, the filter places more weight on the observations, and thus follows them more closely. With a low gain, the filter follows the model predictions more closely, smoothing out noise but decreasing the responsiveness. At the extremes, a gain of one causes the filter to ignore the state estimate entirely, while a gain of zero causes the observations to be ignored.

Innovations (also referred to as a residual or output prediction error):
The innovations of the Kalman formulation are:

$$\alpha(n)=y(n)-C(n)\hat{x}(n|y_{n-1})$$

Prediction:

$$\hat{x}(n+1|y_n)=F\hat{x}(n|y_{n-1})+G(n)\alpha(n)$$

Filtered Error Correlation Matrix:

$$K(n)=K(n,n-1)-FG(n)C(n)K(n,n-1)$$

Prediction Error Correlation Matrix:

$$K(n+1,n)=FK(n)F^H+Q_1$$

Filtered Estimate:

$$\hat{x}(n|y_n)=F^{-1}\hat{x}(n+1|y_n)$$

Now, $\hat{x}(n|y_n)$ gives an estimate for the clock errors. We also have an estimate for the location errors. The next step is to update estimated locations:
For each node i with unknown location, the update to the estimated location is:

Locs[$i$]=Locs[$i$]−estimated error

Locs[$i$]=$(x_i,y_i)$ $x_i=x_i+e_{x_i}$ $y_i=y_i+e_{y_i}$

The updated clock value for each clock is:
$c_0+0$, (note that this is the reference clock, and as noted, is assumed to have 0 error).
The update to the other clocks are of the form: $c_1+e_1$, $c_2+e_2$, ....
Rewritten in terms of the reference clock, the clock values of the nodes, other than the reference node, are: $c_1=c_0-e_1$, $c_2=c_0-e_2$, ....
A new system clock can be derived as an average of the clock values, which for example of three clocks, is:

$$AVG=[c_0+c_1+c_2]\div 3$$

Substituting the clock value written as a function of the reference clock, the average is:

$$AVG = c_0 - \frac{e_1 + e_2}{3}$$

This new reference clock, derived from the average value of the clocks of the nodes, can then be used to compute new estimates of the clock values for each node. Variations on this basic approach are possible, such as using a weighted average of the node clock estimates as the system clock. The weight could be based on reliability of the clocks, where more reliable values are given proportionately greater weight in the system clock calculation.

Just as the reference "system" clock can be updated in this fashion as function of other clocks, so too can the reference node and relative coordinate system be updated as function of node position estimates over time. As explained above, a reference coordinate space for nodes may be formed, at least initially, by selecting a node to be at an origin and selecting other nodes to form the reference coordinate space. Other node position and position error is then calculated initially relative to this reference. Over time, as the model of position estimates leverages data captured over several solution intervals, the reference coordinate space may be updated as function of nodes for which there is more confidence in their position. In particular, nodes whose position is computed to be more certain can be used to form a new reference coordinate space, and other node position may be estimated relative to that new reference coordinate space. The above framework is sufficiently flexible in that node location can be computed on a relative basis, without requiring node position to be fixed relative to an absolute location. Further, both relative location and timing of the nodes is allowed to vary over time, and the state model solves for and updates both position and time error over time.

As describe previously, the processing of the model is recursive. The solution agent proceeds to the next frame as shown at the bottom of FIG. 5. The node positions are used as the estimate for the node positions for the next frame, and the processing repeats with a new sequence of observations.
Specification of U.S. Provisional Application 61/645,589

Figure 7:
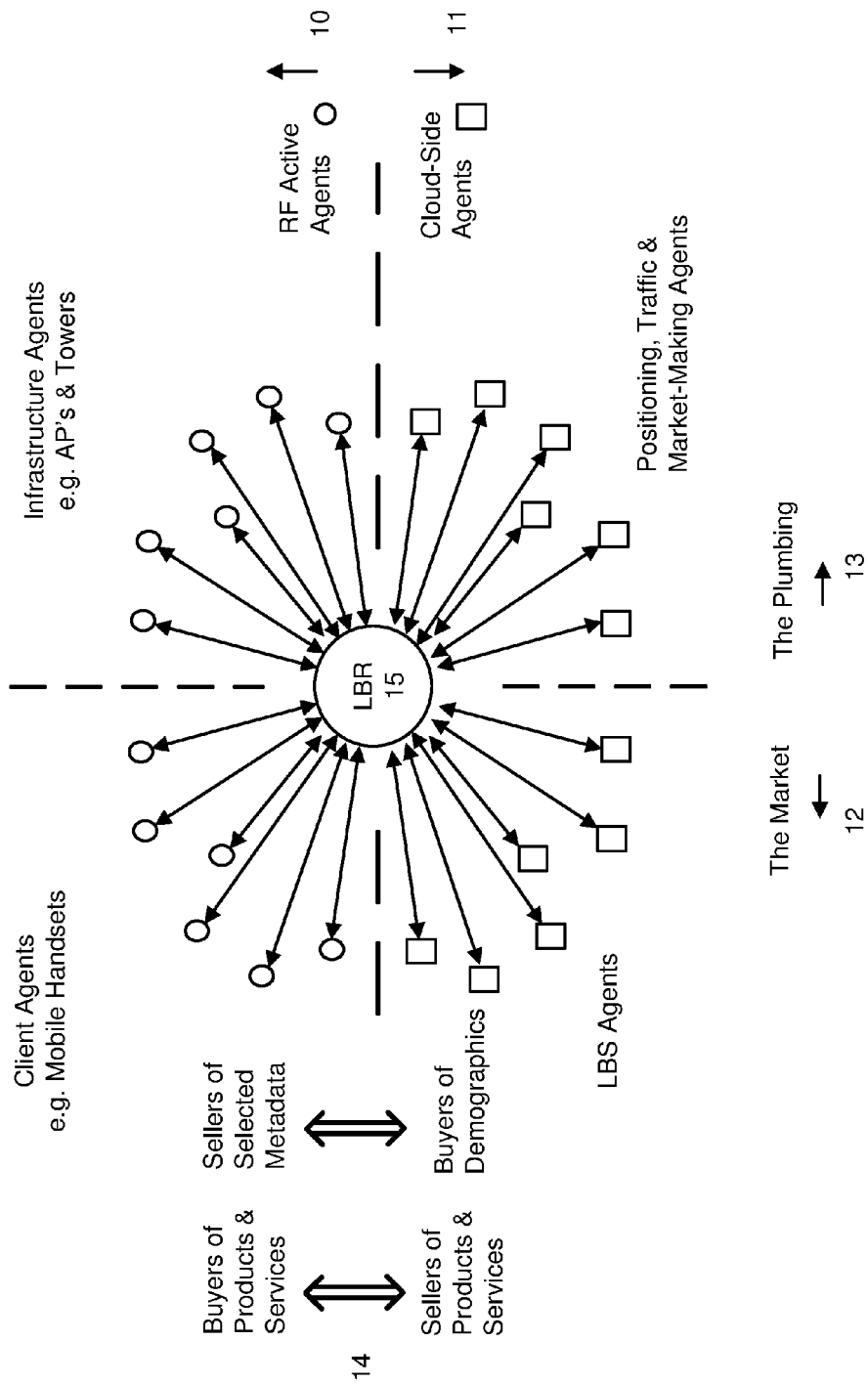
FIG. 7 is a diagram illustrating a LBR and its interrelationship with various types of agents.

FIG. 7 graphically introduces LBR in a holistic, unavoidably abstract manner. This disclosure will make liberal use of the categorical distinctions illustrated in this figure. Many later figures will provide technical implementation details.

FIG. 7 lays out certain distinctions starting with wireless nodes/agents, 10, in the upper part of the figure in distinction to cloud-side nodes/agents, 11, in the lower part of the figure, and then using the left side of the figure to indicate nodes/agents, 12, generally forming a marketplace of buyers and sellers, in distinction to the right side of the figure containing nodes/agents, 13, involved with the technical establishment of such a marketplace.

To the far left of the figure, 14, the duality and interchangeability of 'buyers' and 'sellers' is explicitly and centrally indicated, applying to 'The Market' nodes and/or agents. These actors circle around the central 'LBR' core agent, 15, implying that no direct communication between any nodes/agents is required for the overall system to function, all that is required is for each node to be able to communicate packets to and from the LBR hub.

FIG. 7 illustrates an objective of the LBR, acting as a "location based architecture" to facilitate markets and enable the limitless growth of independent (and innovative) players. The now somewhat tired and investment-wise-stale acronym of LBS needs to be superseded and subsumed by a more flexible approach that people can actually plug into. Monolithic systems and structures—think received-signal-strength WI-FI positioning systems as but one tiny example, or even GPS for that matter—need to be replaced by how the location of nodes/agents fundamentally informs how those various agents and markets work within the constant knowledge of location. The admittedly most arcane point to FIG. 7 is, thus, that the same technical approaches which can establish location (plumbing level agents sharing information and fixing location in the process) can do the exact same thing for establishing a location-based marketplace.

Figure 9:
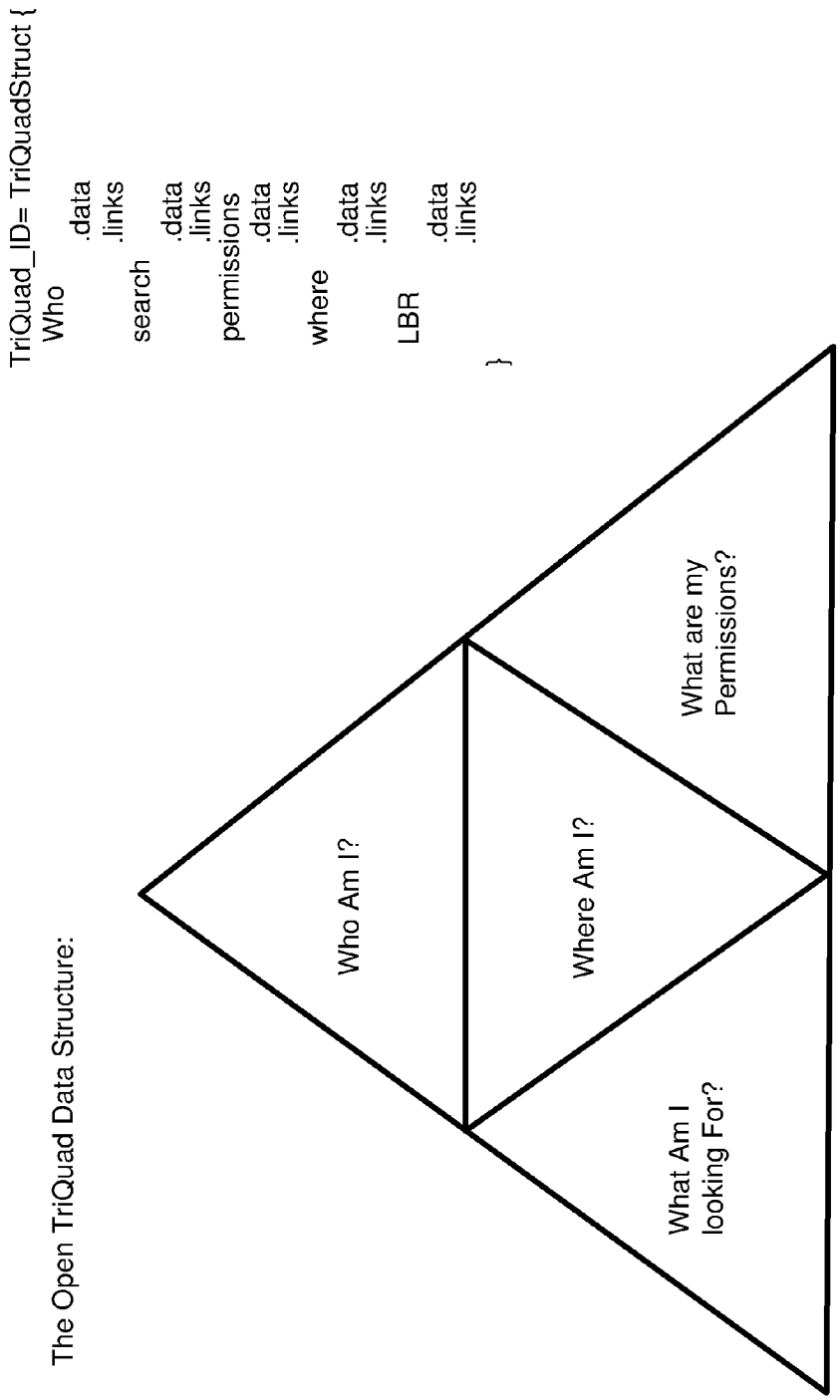
FIG. 9 illustrates the packet of FIG. 8 along with a software-like description of its data structure.

Foreshadowing much more disclosure to come, the classic question that a GPS receiver can answer of 'where am I' is slowly and inevitably replaced by 'what am I interested in at this place and whom am I willing to choose to help me satisfy those interests'. That I would need to even ask 'where am I' becomes quaint, replaced by an implied location based query with a globally vast array of eager suppliers of answers to my query . . . the bead shop just around the corner being most eager to alert me of its spitting-distance-presence, knowing that I LOVE to string weird necklaces and hand them out at parties. FIG. 9 and 'Tri-Quads' formalize these notions as engineering specifications on xml-like software packets, the flipside of weird necklaces.

A quick thumbing through of some of the figures in this disclosure can provide a finish to this introductory section. An underlying theme of these technical moving parts is the far-left text of FIG. 7—the duality/interchangeability of buyers and sellers—and its manifestation as richly populated location-based queries interconnected through an LBR architecture to a large, BUT, well organized sea of willing respondents to those queries.

Agent-LBR Packet Exchange

An LBR-designed network would operate with simple packet exchange as its most elementary operation. An agent (node) needs to know how to send and receive packets from 'an LBR'. At the end of the day, there needs to be only one basic format for a packet, but cracking one open would quickly find one of the two flavors of packet exchange:
1) Market Packets, and
2) Plumbing Packets
corresponding to the left and right halves of FIG. 7 respectively. In both cases, the form of those packets would follow industry standardized protocols similar if not even fully borrowing from familiar examples such as HTML, XML, image file formats, IP data packet formats, etc. Indeed, the more such existing formats and protocols can be used the better. No need to invent entirely new data formats; rather, existing formats can be adapted to LBR requirements.

Figure 8:
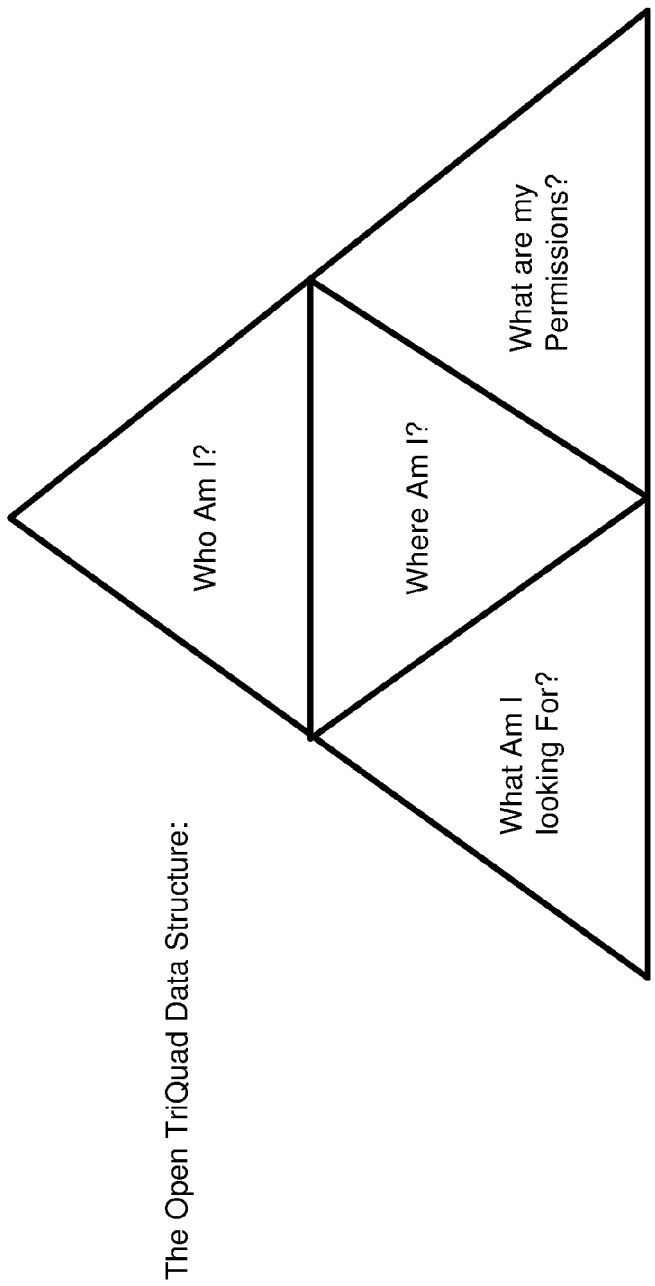
FIG. 8 illustrates a graphical example of market information packet used in the LBR.

A simple and by no means only example of a Market Packet is illustrated in FIGS. 8 and 9, FIG. 8 showing a conceptual view of the packet and FIG. 9 illustrating its software-like description. This disclosure refers to this market-oriented packet as a "Tri-Quad" as later sections will describe in detail. The driving idea behind Market Packets is that they are actively engaged in the direct exchange of goods and services, interpreted very broadly. One of the recently modern concepts of 'selling metadata'—where 'metadata' is really just an iceberg with the submerged part actually being detailed demographic data down to preferred color of socks—is thus included in the definition, as depicted in FIG. 7. The words 'selected metadata' in FIG. 7 is a prelude to the descriptions of the many levels of 'opt in' that consumers can choose for themselves and thus control the level of selling they do of their own interests and what they are willing to be presented with.

FIG. 10 then depicts one example of a Plumbing Packet. The presented graphic and its underlying data structure are deliberately closer to many existing standards and formats for data packet exchange accordingly. The key dividing line presented in the data fields of the Plumbing Packet split into two parts: one part dealing with simply establishing, maintaining and repairing a marketplace infrastructure even when there might be no traffic or chatter going on in the marketplace itself; and the other part directly dealing with the ongoing traffic associated with a live, functioning marketplace, largely driven by populating the "pung" field with the ever-flowing raw ping data.

As detailed in the Space Time Calibration patents incorporated above, pings are transmissions from one network node to another, while pungs are records of pings that are collected over time intervals and used to determine timing and location of network nodes. While the space time calibration patents describe implementations of pings and pungs for space-time calibration within networks, the LBR can also be implemented for other types of positioning with or without integration of the space-time calibration.

These include positioning systems that are rely on strength of signal (Received Signal Strength (RSS)), dead reckoning using directional sensors, positioning systems listed in the above Background and Summary, or hybrid systems that fuse data from combinations of these techniques.

Note in both FIGS. 9 and 10, there is an LBR field which will be further described on its own accord later in the disclosure. An element of that field to note early on is that this field can and will often contain multi-layered routing instructions such that a single packet exchange to the LBR can instigate one or more packet exchanges, including sequence-type instructions such as 'send subset A and B of this packet to Agent X, get a response C from Agent X and then send a packet with B and C to Agent Y. These multi-layered and time-sequenced routing instructions will be seen to be critical to many location-based query and response networks replete with competitive forces wanting to buy the right to serve up responses to various queries.

Each of these packet types and their many variants will be further described herein. The higher level point to be made here is that an LBR-prescribed network need only specify—at the network message passing level—this basic exchange of packets between any given node/agent and an 'LBR', used here as an explicit noun. Everything else having to do with timing and location/position knowledge will be performed 'in the cloud' and the resulting solutions made available to the node in a steady stream of LBR-packets coming back to that node/agent. Again, this does not mean that 'an LBR' needs to be halfway around the world, across the country, in another county or halfway across a building; it can be as simple as a second thread on a CPU in a mobile handset! The actual physical location of the various nodes/agents and how they all share resources and how they all communicate is 100% flexible accordingly.

Establishing an LBR Infrastructure: Registering Plumbing-Side Agents

As previous disclosures and now patents have described (see the space time calibration patents incorporated above), certain nodes in a network will need to take on responsibilities for initiating and then maintaining basic location and timing services for the network as a whole. Such nodes are generally aligned with the right side of FIG. 1, the plumbing side. Though it is certainly possible for any node to have all 'LBR software' and all 'agent software' available to it, this will almost never be the case in implementations. The usual case will be that most nodes will want to minimize both their software requirements and their communications requirements to just those necessary to either offer their specialized brand of services to the network on the plumbing side, or consume location and timing services from the network certainly in the upper left quadrant of FIG. 7. One wishes to get to the situation where a given node fires up and one of its first communications to some other node will be a query whether that other node can directly or indirectly provide to it both location and timing services. For brevity, we shorten this to the simple question: "Are you an LBR or can you connect me to one?" The remainder of this section will assume that location-aware operations are not simply built into the standards of the network operations, and thus all initiation procedures need to be explicitly performed as opposed to 'hard wired'. Once some of these procedures are more familiar to wireless device designers, many of the explicit initiation steps will be pre-programmed into nodes.

One embodiment of an LBR sets up a common IP-address with a variety of services it offers, i.e. setting up what has been branded as a Web Service. See, in particular, discussion of web services (e.g., ZuluTime Web Service) in U.S. patent application Ser. No. 13/187,723 filed Jul. 21, 2011, entitled MULTI-PATH-COMPENSATION METHODS FOR LOCATION-DETERMINATION OF MOBILE DEVICES (Now published as US Patent Application Publication 2012-0309415), Ser. No. 13/179,807 filed Jul. 11, 2011, entitled LOCATION AWARE INTELLIGENT TRANSPORTATION SYSTEMS (Now U.S. Pat. No. 8,463,290), and the web service architecture in 61/613,915, filed Mar. 21, 2012, entitled Positioning Systems for Wireless Networks (included in the specification), which is incorporated herein. Previous and companion disclosures have also described the operations of such a service without an LBR perspective, this disclosure will emphasize certain modifications to such a web service which can have it behave in line with LBR design principles.

Figure 11:
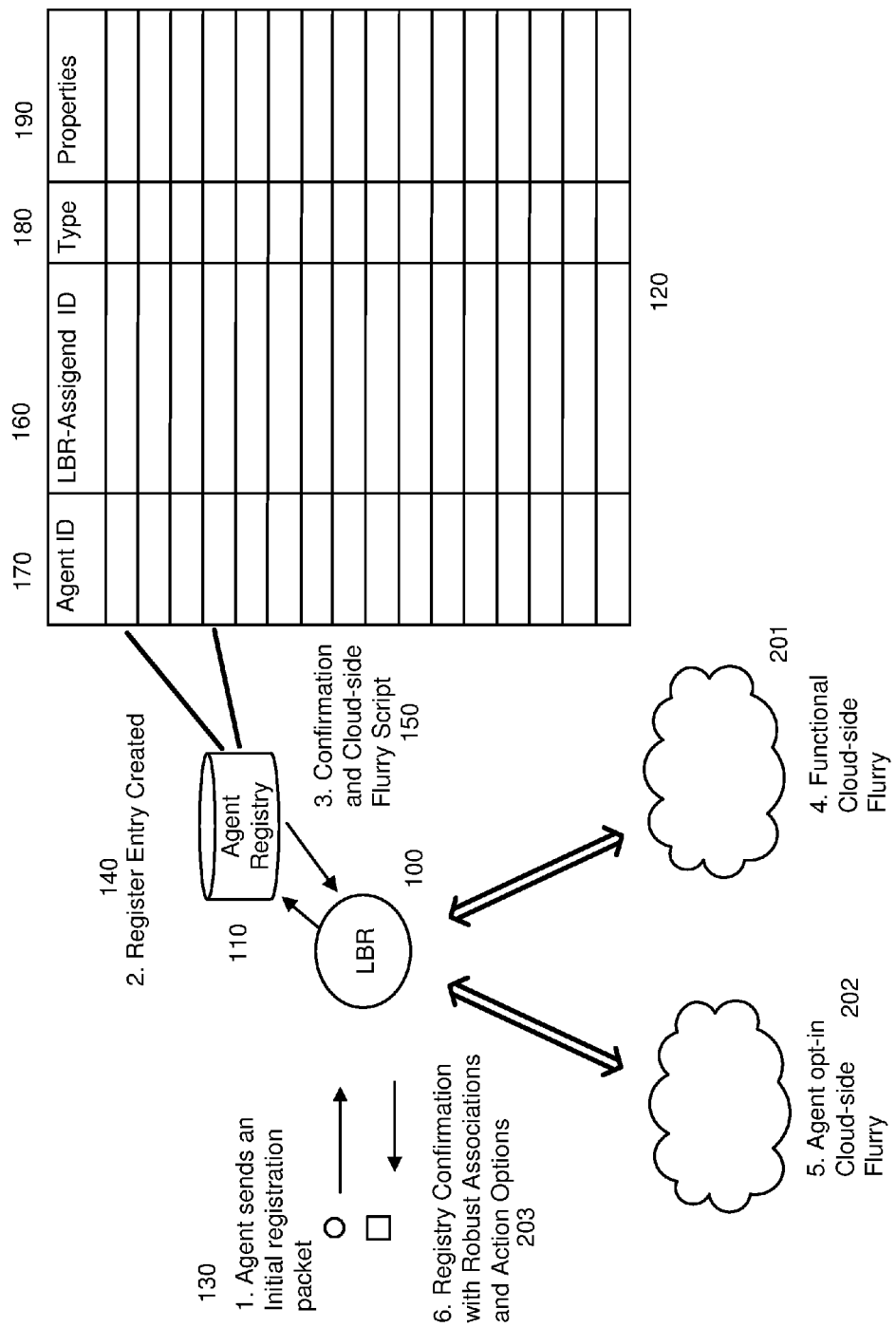
FIG. 11 is a diagram illustrating structure and operation of a LBR infrastructure operating at an IP address.

FIG. 11 is a rather involved figure that attempts to cover most if not all of the key ingredients in the embodiment of an LBR infrastructure existing at some given IP address. This section will go through this figure first with a plumbing-side node or agent, and then later disclosure sections will show how market-side nodes/agents can selectively choose to directly or indirectly participate in this approach.

In FIG. 11, we see the circle with 'LBR' inside and labeled with italicized 101. This circle represents the packet ingest software at the IP address discussed above. Also depicted is an 'Agent Registry' icon, 110, with a view into its registry structure, 120. This Agent Registry is itself an agent in the LBR definition of that term, where also depicted is some external random agent contacting the LBR with an incoming packet, 130, in this case the packet is an initial registration packet from the external agent announcing its presence and requesting association with the LBR and its universe still to be described. The incoming packet contains a flag which emphasizes that it is a registry initiation packet and the packet also contains typical metadata allowing the LBR to route the packet to the Agent Registry, 110, along with the metadata needed to populate the registry fields, 120.

The LBR software, 101, cares little about the contents of the registration packet and just knows it needs to pass it on to the Agent Registry, depicted as action 140, then expecting some kind of return packet 150, with whatever routing instructions it may contain.

When the Agent Registry receives the packet, 140, it performs quite typical database operations checking to see if the registration packet is valid, has not already been registered, etc. Later disclosure sections will examine the various intricacies and options available to this agent, but for the purposes of just showing how an LBR network is established, we'll leave it to this simple registration act with the fields shown. The field 'LBR-assigned ID', 160, indicates that the Agent Registry, 110, is uniquely assigned to the LBR 101 and it is free to use its own internal ID scheme, even though the external agent sending in the registration packet may have its own ID as sent in the packet, where that ID is stored in field 170. Later sections will better explain why an isolated LBR should follow best practices of setting up its own unique agent identification system whilst still respecting the externally defined ID systems of the various agents contacting it. In this way, this is just a mapping exercise between all the various agents that the LBR will be mediating with all their various flavors of ID's, and a unified ID scheme that the LBR and its associated Agent Registry can deal with. [The ID schema for both can certainly be identical in LBR-designed networks of lower and contained complexity].

Also depicted in FIG. 11 at a basic level is field 180 'Type' and field 190 'Properties'. Again, further sections will dive into details on these and other fields, but for the establishment of an LBR network, suffice to say that plumbing-side agents checking in to establish an LBR infrastructure need to announce their roles and provide basic information on their properties. An example of 'type' might be a Wi-Fi 'wallwart' listening node or a common Wi-Fi Access Point. An Example of 'properties' might be specifications on ping count stamp resolution or the anticipated rate at which the agent expects to be contacting the LBR with data packet traffic. One 'property' for plumbing-side nodes/agents is any knowledge they might have of their location. This is usually expressed in latitude, longitude and altitude, if they know this. Clearly, these fields are quite flexible and expandable.

The Agent Registry 110 having finished its registration task then sends a response packet back to the LBR, 150. Later sections will go into much greater detail on how this response packet 150 can contain several layers of packet-routing combinations, basically telling the LBR to route some subset of the packet 150 to some 'Agent X', another subset to 'Agent Y', and perhaps yet another subset of the packet back to the initiating external agent (not depicted) that sent the original packet 130. This general notion is referred to as a 'flurry' in FIG. 11, attached to label 150. Deferring the discussion of a "flurry" to later sections, the main three actions (realized as packet transmissions) the Agent Registry would like to see happen after this registration act are depicted as 201, sending a subset of the response packet 150 to one or more plumbing-side agents, 202, sending a subset of the response packet to one or more market-side agents, and 203, sending a subset of the response packet back to the initiating (registering) agent. What is difficult to depict in FIG. 11 but should be appreciated and described is that in general, the steps listed as 4, 5 and 6 in the figure are performed sequentially and that there is an option for the response packets from, say, step 4 to append new data into the packet sent to step 5 agents. Unfortunately, it CAN be even more complicated than this sequential stepping, but for registration, we can imagine it to be strictly sequential and that routed packets can have appended metadata attached. The next few figures and associated text will parse steps 4 and 5 a bit more, so for the purposes of describing this FIG. 11, suffice it to say that interested plumbing-side and market-side agents have been contacted, with response packets duly received by the LBR, as one consequence of the external agent registering itself with the LBR. This appending of packet information can be an operation performed by the LBR software, 101, or, one can posit a 'packet appender' agent not depicted in FIG. 11, or, even send packets back to the Agent Registry, 110, to do this operation along with the typical process control steps ensuring that the response 203 ultimately sent back to the registering agent is correct and authentic.

As stated, FIG. 11 is trying to isolate the initiation process and, given its still high level nature, the 'flurry' aspects of 150, 201 and 202 will all be further described. Concluding then with discussion on FIG. 11, a confirmation packet 203 is of course sent to the initiating agent, presumably almost all the time with a 'good to go' flag and the implicit message, 'start doing whatever thing you are going to do,' with the implicit notion that LBR 101 is willing to serve the initiating agent's needs.

Figure 12:
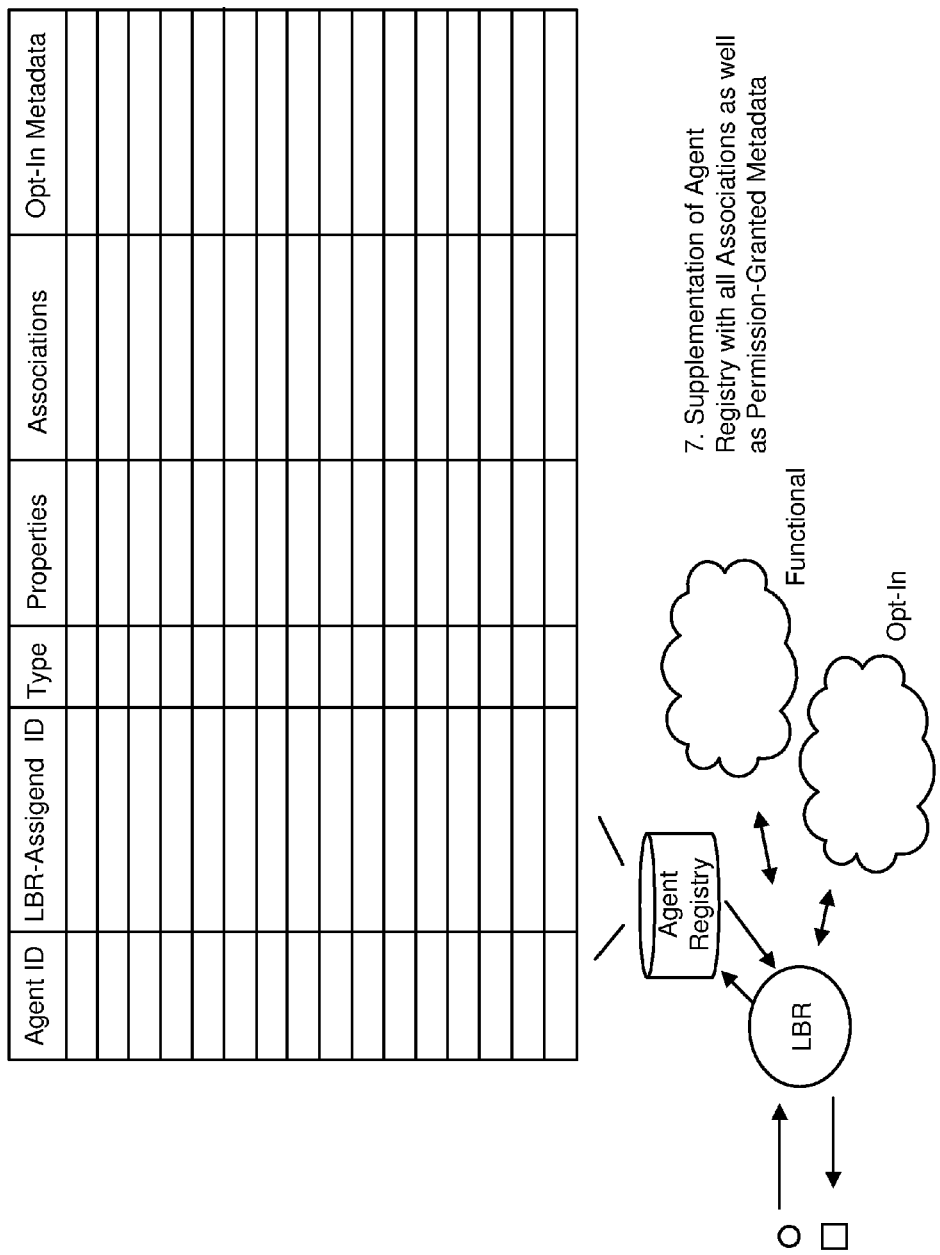
FIG. 12 is a diagram illustrating how an agent registry may be supplemented with associations and permission granted metadata as a consequence of actions triggered by registering an agent within a LBR.

FIG. 12, however, does put a little more detail into another 'consequence' of the 'flurries' that were described in FIG. 11. That is, both the plumbing-side flurry and the market-side flurry sent back data which then the Agent Registry received and appended to the registry data associated with the external agent being registered. A concrete example here might be that a Wi-Fi wall wart is the registering agent and some grouping agent (to be described) not only discovers that it should belong in one or more of the groups it is already managing, but that it also is close in location terms to ten other wall warts and that its register entry ought to indicate such. Likewise, contacts with market-side agents may find certain connectivity into either private or public networks where the registering agent will make its permissions to participate known and the networks will likewise invite it to either participate or exclude it as the case may be. The main point of FIG. 12 is that these new fields will show up in the Agent Register's database, appending database 120 of FIG. 11. It should be noted that the actual operations which initiate appending of the registry fields and their subsequent filling with data can be a separate packet-exchange session between agents in 'the flurry' and the Agent Register, hence they are not explicitly depicted in either FIG. 11 or 12.

It should also be noted that FIGS. 11 and 12 reinforce the location correspondences between common infrastructure nodes and market-services that hope to tap into a given location. So when a Wi-Fi wall wart or access point registers its lat-long-altitude and some flurry indicates (via looking up the lat-long-altitude database as is common in geographic services) that this new device is in some public cafeteria, then inherently the new device's function is being set up for the plumbing-side service of helping to locate clients determine where they are in the cafeteria, AND, setting up its participation in market-services to those clients. All of this gets back to the ideas behind FIG. 7, illustrating that injecting location information into the setting up of common infrastructure nodes becomes a foundation for also setting up location-based services to a location. A technician installing some device is inherently creating a location-based marketplace by bolting the device in and turning it on. The proprietor/owner of the device then becomes free to exclusively exploit the marketplace thus created, lease it, make it free to all comers, etc., as further sections will continue to describe.

Not every last step, packet and operation can be depicted in FIGS. 11 and 12. The intent is to show that even in the simple act of registering a plumbing-side node/agent into an LBR's domain, many things can happen. Further sections of this disclosure will describe these more detailed steps and operations.

Establishing an LBR Infrastructure: Timing and Location Agents

Figure 13:
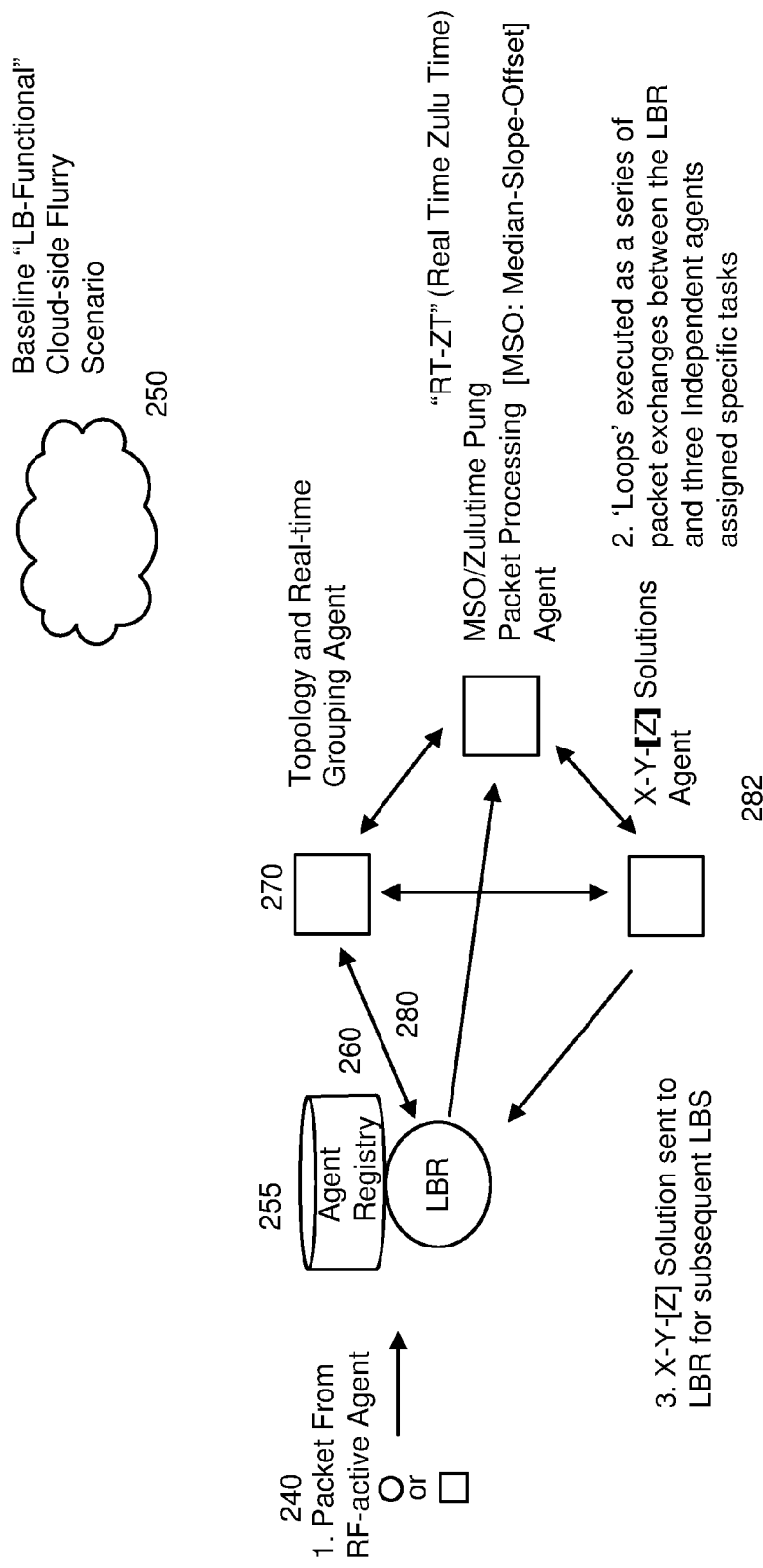
FIG. 13 is a diagram of an example of an LBR interacting with elements of a positioning system, which are implemented as agents.

FIG. 13 is a diagram of an example of an LBR interacting with elements of a positioning system. The particular example of a positioning system in FIG. 13 is called "Zulu-Time," and specific examples of such a system are described in the space-time calibration patents incorporated above. In this section, we describe an example of a process for setting up of a timing and location capability within an LBR framework based on the space-time calibration approaches described in the space-time calibration patents. In those documents, one will find many variants of the production of raw data, the organization of nodes and how they communicate (mainly through pings and pungs), and how all these things are rolled up into timing and location solutions. This section describes how such operations can be executed within and LBR framework.

With reference to FIG. 13, this section explains how elements of the space time calibration system can be 'broken up' into an LBR framework, where various algorithmic and organizing steps become their own independent agents. FIG. 13 continues with the agent registration process flow established in the previous section and explains both how timing and location can be initialized within an LBR context, but also how data can start to flow through that infrastructure and produce timing and location solutions for those nodes requesting such. We will run through FIG. 13 twice, first as it is connected to the registration process of new agents as described in FIGS. 11 and 12 with associated text, and then a second time as external nodes become active data producers providing real-time data toward the LBR, expecting timing and location solutions in return.

In FIG. 13, at the left we see a packet 240 coming in to the LBR from some external node/agent as described in FIGS. 11 and 12. Let us first postulate that this is the same 'initialization and registration' packet described in those previous figures 130, and hence, as label 250 indicates in the upper right of FIG. 13, we will take a peek in on one example of a 'flurry' that can happen as part of setting up the LBR infrastructure and enabling it to provide timing and solution services, i.e. a peek in on cloud flurry 201 of FIG. 11.

We have already been through the various registration steps consolidated as label 255 in FIG. 13, let's now enquire about the packet 260 being sent to a newly introduced agent called the 'Topology and Real-time Grouping Agent' 270. This agent 270 has already registered itself with the LBR and its Agent Registry. In an initialization phase, packet 260 will be announcing the arrival of a new RF-active plumbing-side node, call it Bob, and implicitly asking the Grouping Agent 270 to group together nodes with certain proximity relationships to each other, as described in the space time calibration patents incorporated above. An example of this might be that folks are setting up a given floor in a given building with 5 Wi-Fi access points (AP's) and 30 Wi-Fi wall warts, and the first packet received by 270 instructs it that such a new grouping is coming its way and that it should initiate a group associated with this very specific floor. The next 34 of these 35 registering agents will indicate they want to belong to the newly established Bob's group and agent 270 obliges by setting up a group database. In both the case of Bob asking for the group to be set up, and the 34 agents after Bob, a response packet 280 is sent back to the LBR of 'all clear' which eventually makes its way back to the RF-active nodes via packet 203 of FIG. 11. Later sections of this disclosure will further examine the operations of the grouping agent 270, so again for the purposes of describing how an LBR infrastructure is first established, FIG. 13 at least shows the basics of how RF-active nodes can become associated (grouped) based primarily on proximity and implicitly, RF interaction (utilization of common Wi-Fi channels, sharing of those channels, etc.).

The section entitled 'baseline operations, timing and positioning' will come back to FIG. 13 and discuss its operation in a real-time setting. The remaining item to note for this section is that also part of response packet 280 going back to the LBR is a sub-packet destined for the LBR's Agent Registry 110, instructing it that the group agent 270 accepted the new agent as part of 'group Bob' and that the agent 110 should perform the registry-appending as described in FIG. 12 accordingly. Part of the packet 280 is also a message to agent 110 that pung data received from the newly registered node will in most cases be routed toward the agent labeled packet processing agent in FIG. 13.

Using the example of 5 AP's and 30 wall warts above, at some point enough of these active Wi-Fi agents have fired up and registered with the LBR such that the grouping agent will send a message back to the LBR that it has estimated that Bob's group is probably sufficiently populated for timing and location solution action. This message can both a) trip a flag in the Agent Registry's database and/or b) can be sent all the way to the registered nodes. This then completes a look at how an LBR infrastructure can be set up and made ready for live data feeds ('data feeds' meaning: floods of pung packets, referring to the collection and distribution of ping data in pung packets in the space time calibration patents incorporated herein, above).

Enter LBR Market-Side Participants: Initializing/Registering RF-Active Nodes/Agents For the purposes of this section, we shall confine the description to RF-active nodes/agents on 'market-side' to be any device which primarily wishes to accept and use timing and location services from the network along with the later described marketplace services of the network. A primary example here is mobile phones. Other examples include laptops and tablets, RF-active sensors and RFID's, two-way radios, industrial devices and equipment, etc. Market side agent applies to any device that communicates and wishes to consume location services.

There are two main classes of these nodes/agents: ones which explicitly interact with an LBR universe and ones that don't. The former category is rather straightforward and will be described first. Industrial devices using Zigbee, IEEE standard 802.15, are excellent examples of this class. The latter class is typified by transmit-only tracking of smart phones, where the users of such phones typically do not care about LBRs operating within the surrounding network, but they just want to know where they are and have very explicit and reliable 'opt in' or 'opt out' participation in market services. In the latter smart phone case, the smart phone merely makes packet transmissions and does not directly interact with an LBR, at least relative to the pro-active determination of its location (it often wishes to consume/use the solutions to that process, however).

Starting with the first class, a typical operational scenario would be for a client device, for example a Zigbee-based mobile sensor communicating with some fixed-in-space infrastructure device also Zigbee-based. There are of course many options available to this mobile sensor but a common one is where it wants to have a direct relationship with an LBR and directly consume timing and location services from that LBR. FIG. 11 also depicts how such an agent/node can pretty much follow the same initialization/registration procedures as fixed infrastructure nodes/agents. This section will describe some small variations from the plumbing-side nodes/agents case.

Looking again at FIG. 11, such a client device has at least two options for directly participating in LBR timing and positioning. Option one is to have knowledge of the IP address of the LBR and to just register itself directly, and the other is to 'ask or assume' that some local infrastructure node/agent will do all that for it. Either way, a registration packet 130 is sent to the LBR just like the earlier case but now with the simple distinction inside the packet that this node is a market-side (or client-side, equivalently, where one can imagine that this industrial device is 'in the market for determining its location', and may later be 'in the market to have certain industrial services provided to it based on its location') node and generally will be expecting to be provided services as opposed to providing them. As previous disclosures have explained, this is not a hard distinction, as even client-side nodes can also provide data to an LBR network that assists other nodes (indeed, it is hard for data to be provided which does not somehow accrue to the benefit of all nodes in the network except in data glut situations).

The LBR will then generally follow the same routine previously described with a few small differences. For example, there may be a logically separate Agent Registry for client nodes, think of it as 120' (120 prime), with slightly different fields being populated with ID's, metadata and associations. Such a registry would also expect a more fluid coming and going of client nodes whereas the plumbing-side registry may be more stable as interpreted in a geographic and 24/7 sense. This separation of registries is by no means required however, where another approach is to just have more data fields, where plumbing-side nodes will have 'N/A' in several fields that apply only to market-side nodes, and vice versa.

Also, the cloud-side flurries 201 and 202 will be similar at the high level (they happen), but in each case there will be different agents potentially contacted with indications that a market-side node is being registered. For example, the grouping agent 270 of FIG. 13 will fundamentally 'expect' that this new market-side node will probably be mobile (especially if such a field is set '1'), and thus to expect that it will be changing its group relationships over time (see Ser. No. 13/179,807 filed Jul. 11, 2011, entitled LOCATION AWARE INTELLIGENT TRANSPORTATION SYSTEMS (Now U.S. Pat. No. 8,463,290), and 'topographic ooze', for example, which is incorporated herein). Likewise as will be discussed later in this disclosure, the Agent Opt-in cloudside flurry 202 will in general be much richer and complicated, reaching and interacting with more cloudside agents, than is the general case with plumbing-side nodes.

All in all, however, the registration and initializing into the LBR framework for a duplex RF-active node is therefore quite similar to a plumbing-side node. The case of an RF-active agent/node such as a Smart-Phone needing to be registered, where the device itself is only participating in a transmit-only modality, is just a bit more involved than the directly participating duplex agent. The primary difference is that such a Tx-only device needs to either a) directly 'instruct' some LBR-participant that it wants to be registered and that second participant will do the registering, b) be 'heard' by some LBR participant and registered as an anonymous Tx-only agent, c) find the IP address of the LBR and do the registration itself, d) request some 'third party app' that it wishes to participate in timing/location services and thereby 'imply' choice 'a' above where then that third party app does the registration. There are clearly even more options than a) through d) above, but the main point is that for most practical implementations, it is rather inefficient for the network as a whole to have the smart phone do anything more than 'transmit RF packets like you usually do' and let other nodes do the work. Later sections on levels of 'opt in' elucidate the various choices a smart phone has in participation in an LBR-enabled network.

Baseline Operations for Timing and Positioning

Previous sections started to touch upon the actual functioning of the timing and positioning services once some set of nodes have been registered and are ready to begin producing ping data and sending pung data. The space time calibration patents incorporated herein provide additional explanation of the meanings of pings and pungs, how they are shared and organized, and how timing and location solutions are generated. This disclosure and this section of this disclosure will continue to concentrate on practicing these methods in an LBR-mediated fashion as opposed to the many other forms presented in the space time calibration patents.

Going back to the example of our building with 5 AP's and 30 Wi-Fi wall warts (see, for example, U.S. application Ser. No. 13/179,807 (Now U.S. Pat. No. 8,463,290) incorporated herein, for more information about how AP's and wall warts can function together as a space-time calibration enabled network), let us now assume that all 35 agents have registered themselves and all have indicated, ultimately to the grouping agent 270 of FIG. 13, that they all are on floor 4 of building 7 on some corporate campus, and all have provided their 'floor coordinates' in the registration process ('Bob' decides that they should not name the group after him finally, and he served his role however in at least being the first to initiate a group later to be renamed 'floor 4 bldg 7'). One activity that the grouping agent 270 begins doing and continues to do as these new agents (the 35) register themselves is to initiate a new group structure assigned to this floor and it will enquire back to one of those agents the following English-phrased questions, but of course executed as LBR-agent packet exchanges AND as indicated by setting flags accordingly to fields associated with the English questions:

a) Are you and your floor associated with any of my existing macro-groups, e.g. Building 7 or Acme Corp Trilling Pines Campus?

b) Are you willing to share with me (agent 270) your square footage of the floor or even a floor plan?

c) Can you fix that floor plan onto latitude, longitude and altitude coordinates? If not, would you like me to try?

d) how many plumbing-side nodes do you expect to register, i.e. when should I believe you have registered most or all of the agents (5+30 in our example)?

e) Are you expecting floors 3 and 5 to also register and am I allowed to attempt cross-floor sub-groupings (thus providing for Z-axis continuity of solutions).

f) Do you have estimates of your expected traffic loads, ping rates, pung rates, etc., that are in addition to the individual 'properties' that I will already be acquiring through the individual registrations of the nodes on your floor?

g) MANY other such questions, many of which have been described in the space time calibration patents, especially U.S. application Ser. No. 13/179,807 (Now U.S. Pat. No. 8,463,290), incorporated herein, dealing with grouping, mobility and constantly changing network topologies.

As item g indicates, this list of questions is far from inclusive for all such relevant questions that can assist the grouping agent 270 do its job. The notion that the grouping agent 270 needs to 'enquire' of one of these nodes is also just a convenient tutorial example, actual campus-wide and building-wide implementations will no doubt have batch uploads to agent 270 covering thousands of devices, hundreds of floors and often a couple dozen buildings (think college campuses for example). The more explicit example laid out above, including its deliberately 'non-engineering English question formulation', is meant to be clearer on the steps involved and some of the critical information necessary/desirable for the grouping agent 270.

Once the grouping agent 270 has some minimum threshold of information as indicated above, and once a dozen or two of the floor agents/nodes have registered themselves (or have been bulk-registered), the agent then performs some first-cut pairings of plumbing-side nodes, using proximity of those nodes as an initial guide. The pair-wise associations of nodes has been explored at length in the space time calibration patents, incorporated herein, and agent 290 in FIG. 13 is specifically geared toward processing real time pung data of such pairs. The reason that this is 'first-cut' pairings is that as anyone practiced in RF-arts knows, proximity and radio specifications do not equal expected quality of channels. One goal at this point is to understand exactly 'who is talking to whom' RF-wise, can node M hear and respond to node N, or just one hear the other, the combinations are obviously quite complicated.

The more refined step that agent 270 can initiate at this point is to send simple 'calibration' packet messages to some or all of the nodes on floor 4. The message to some particular node will be: send me a few dozen packets please (through the LBR of course), it can have any message you like inside, indicated as 301 in FIG. 14. Agent 270 also respectfully requests all other nodes on the floor to 'listen and record pings' while our selected node sends these 'dummy messages', indicated by 311 in FIG. 14. Presumably agent 270 either sends one LBR-agent packet to one master node on the floor, or, individual packets to all 35 participants, either way. All nodes duly listen and record pings then take turns shipping in their pung packets to the LBR, BUT, they too send several dozen pung packets, not just one, such that all nodes can attempt to hear all other nodes for not just one packet but many. This sending of pung packets and simultaneous listening and recording pings is indicated as 320 in FIG. 14. Finally, after all nodes (including the very first one) have had a chance to try to gather pings from as many other nodes as they can during this induced chatter calibration session, they all then send in their pungs from this chatter session, whereupon the agent 270 sorts these pungs and performs a thresholding of pairwise associations by asking 'Did node J EVER even hear node K, and if so, was it at least 25% (tunable) of the pings node J actually sent'? Crossing this threshold for any given pair, agent 270 then submits the raw ping values to packet processing agent 290 (described below) for it to determine whether pair J and K is of sufficient quality to indeed 'log' as a valid pair, with such pairings then being recorded in a registry inside agent 270. It tests this for all possible pairings (and then some, if floors 3 and 5 are indicated as associated with floor 4 as well)—or 35*34/2=595 possible valid pairings.

The above description of a more refined notion of 'grouping' is thus predicated on first finding decent channel characteristics between pairs of nodes. The above description and FIG. 8 is truly more of a didactic example and those implementing such pairwise testing will assuredly use more batch-oriented methods and will no doubt use 'normal chatter' as the source for the pings and pungs. Again, the description above is explicitly meant to draw out steps and lessons on at least one way to manage the grouping of nodes. In short, the grouping agent determines the pairs that are communicating sufficiently, and logs them, and as the pairs change over time, it does periodic checks to maintain the validity of the pairs.

Figure 14:
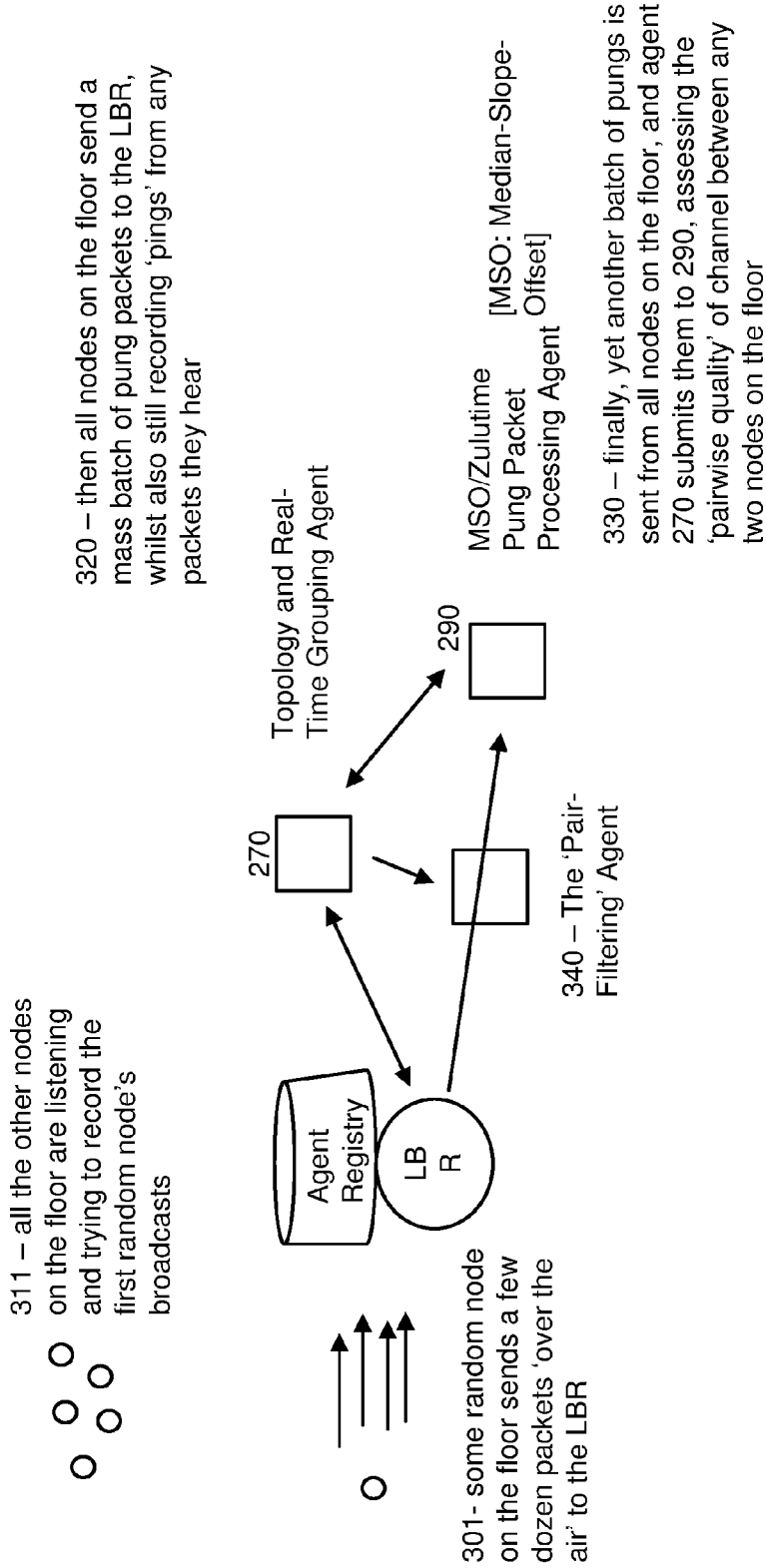
FIG. 14 illustrates interaction of the LBR of FIG. 7 with a node grouping agent, a packet processing agent, and a node-pair filtering agent, which together manage an ad hoc network of nodes.

Let us now imagine the agent 270 has performed the steps laid out in FIG. 14 and has empirically found 301-or-whatever qualified pairings of plumbing-side nodes amongst the 35 nodes of floor 4. One thing it can do at this point is to lay out a graphical presentation of these pairing and present them as a graphic to a technician, although it would be pretty busy as a visual. A better 'intuitive' graphic might be presentations in an animated manner, stepping through nodes and ensuring that each node can hear some minimum desired number of other nodes. For more discussion of the density of nodes and the effects such densities have on quality of timing and spatial solutions, see the space time calibration patents incorporated herein. Automated agents can also be employed rather than requiring a human technician to make judgment calls on densities and qualities of connections.

Preparing for live operation, now, a minimum step that agent 270 should take is to at least store away the registry of pairings itself in its own memory and/or disks, and then to send either a rather large LBR-agent packet to the LBR, addressed to the Agent Registry 110, instructing 110 to add new fields to all of the tested nodes, indicating in their own database entries which nodes they seem to be well paired with. Such data fields would properly show up under the 'associations' field of FIG. 12. Exactly how such information will be used in live time-space services situations will be explored below.

It should be clear that the explicitness of the inherent pairwise checking is really more of an ongoing operation. So, one of the operational jobs of the agent 270 during live operations is to routinely (e.g., every hour or once a day) do pairwise checking, testing, what have you, deleting valid pairs if they somehow stop behaving well and adding new pairs if they are discovered during normal operations.

Between the questions listed and presumably answered in the early part of this section, and the pair-wise mapping of the latter part, agent 270 has much of what it needs to now be ready for real time pung ingestion and the performing of its real time role.

The next step is for either some node at the building or some human controller at the building to send a packet to the LBR instructing 'all concerned agents' that everything is ready to initiate an ad hoc network session. At this stage, each of the 35 plumbing nodes on floor 4 start listening for Wi-Fi traffic (or Zigbee, cell packets, etc. as the case may be) and generate and store pings from the traffic it hears, then ship this data as normal pung packets to the LBR, which then feeds them into the solutions group of agents, as mediated by the grouping agent 270.

As noted above, elements of the space time calibration system are implemented as LBR agents. Another one of these agents in FIG. 14 is the "Pair Filtering Agent" 340. Its main role is to be the first guard at the gate of the flood of incoming pung packets, trying to condense pungs down to just the 'good pairs' that the packet processing agent processes further. The processed data one desires from the plumbing-side nodes is real time and continually changing clock count relationships between pairs of infrastructure nodes (plumbing-side). The next agent (packet processing agent) transforms the pung data of these 'good pairs' into a form usable for computing location solutions. One embodiment of the packet processing agent, called the Median Slope Offset packet processing agent, applies a model to ping data sampled over time by a pair of nodes and transforms it into form used by the solutions agent, as described further below. The filtering agent 340 is a computational efficiency filter, removing lower quality data from subsequent processing stages, like the packet processing and solution agents. One side task it can perform for the sake of agent 270 is to monitor the ongoing quality of pair-channels and report back on problems or new additional pairs discovered.

The picture becomes complete when a mobile market-node comes onto the scene. The mobile node starts transmitting packets that are heard by a handful of fixed nodes. In these packets, the mobile node issues a query for its spatial location to be determined, and in response, the X-Y-[Z] Solution agent, 282 FIG. 13, provides a solution for the location of the mobile node. The space time calibration patents describe how the combinations of pairwise data mixes with the raw ping/pung data received by fixed nodes from the mobile devices' transmissions, all leading toward an X-Y-[Z] location determination. Particular implementations, for example, for mobile devices are described in patent application 61/613,915, filed Mar. 21, 2012, entitled Positioning Systems for Wireless Networks (included in the specification), which is incorporated herein.

Spotlight on Dynamic Topology and Grouping Agents: Continuity of Solutions and Continuity of Connections Expanding upon the description of the previous section/ending paragraph, details on how incoming pung packets from fixed infrastructure-side nodes get turned into mobile client location solutions is better described by going straight to the 'normal' situation of some mobile device entering, travelling around in, then leaving a typical retail space. This section keys in on what exactly might happen behind the scenes in an embodiment of a LBR while this scenario plays out. Many of the ensuing figures are taken directly from U.S. application Ser. No. 13/179,807 (Now U.S. Pat. No. 8,463,290) and Ser. No. 13/187,723 (Now published as US Patent Application Publication 2012-0309415), which are incorporated herein.

Figure 15:
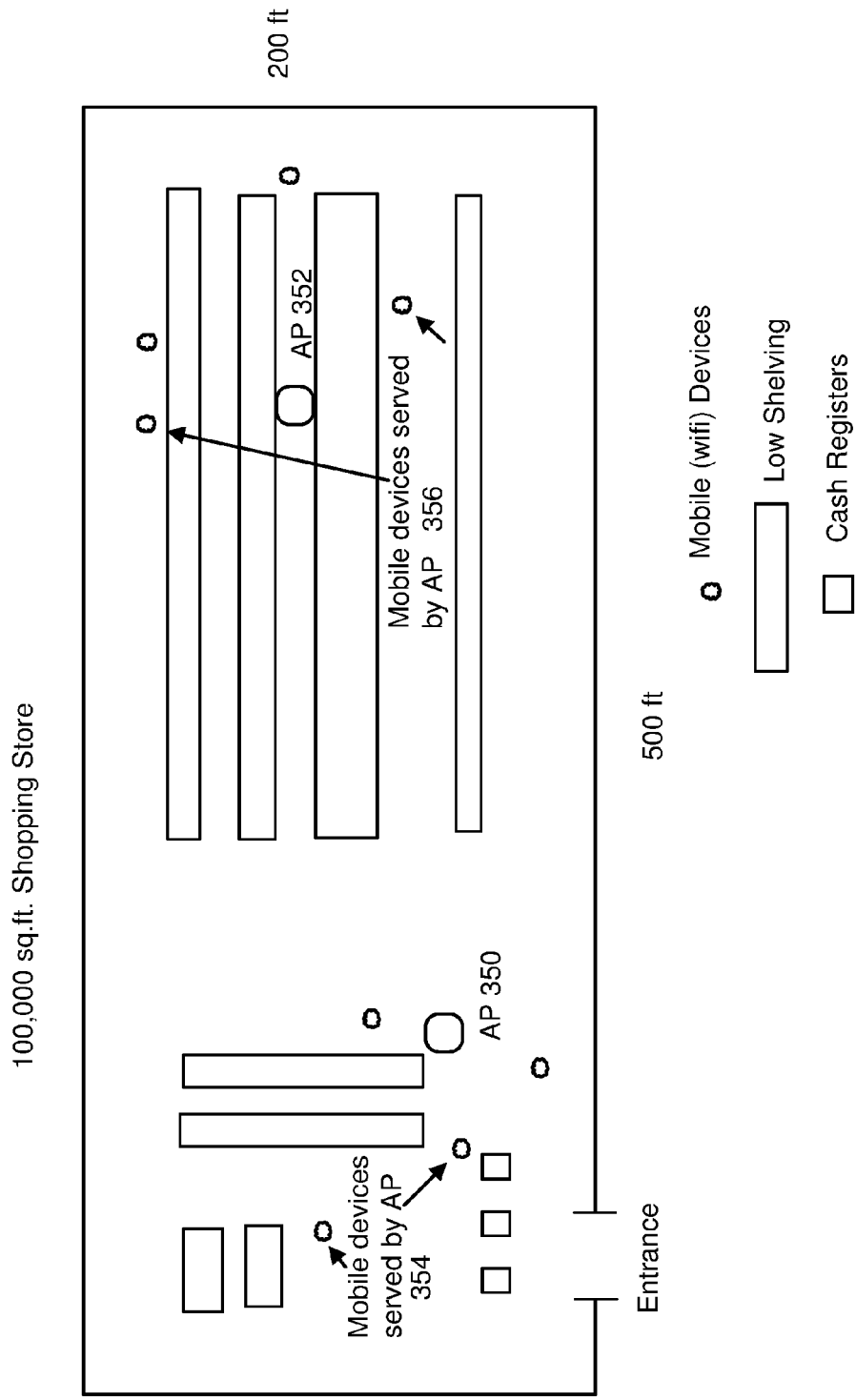
FIG. 15 provides an example of a retail store floor plan to illustrate an implementation of a LBR that manages queries for location solutions from mobile devices in the store and matches consumers of location based servers (mobile device users) with cloud-side suppliers of those services.

FIG. 15 thus introduces the basic single floor plan of a retail space, with a generic 'complication' of having two operative access points, 350 and 352, servicing the Wi-Fi clientele inside the store, each which happens to be on separate Wi-Fi channels (see other disclosures for a discussion on Wi-Fi channels and how spatial solutions adapt to multi-channel environments, such as U.S. application Ser. No. 13/179,807 (Now U.S. Pat. No. 8,463,290) and Ser. No. 13/187,723 (Now published as US Patent Application Publication 2012-0309415)). Random client nodes being serviced by these AP's are labeled 354 for those nodes serviced by AP 350, and 356 for those serviced by AP 352. Hypothetical shelving and cash registers are also included in the graphic.

Figure 16:
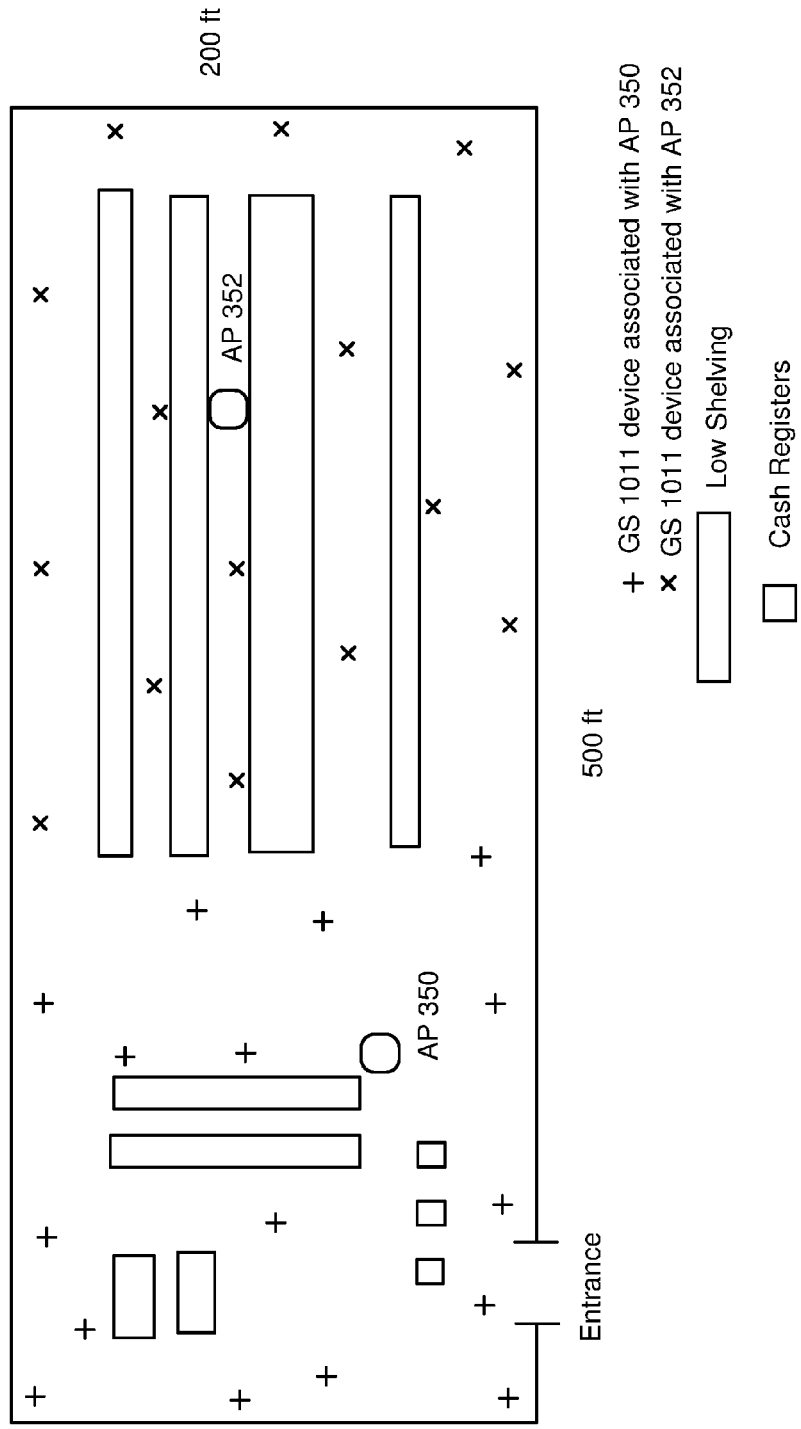
FIG. 16 illustrates an arrangement of wireless network nodes, including infrastructure nodes and access points (AP) in a Wi-Fi network embodiment.

FIG. 16 removes the icons for the mobile clients and instead points out the locations (on the ceiling) of a large quantity of infrastructure nodes, which in this Wi-Fi embodiment comprise low cost Wi-Fi devices referred to in the figure as 'GS 1011 device'. This embodiment of a Wi-Fi device is typically statically fixed to a ceiling, a wall plug (wall wart), a post, etc. The GS 1011 Wi-Fi device is provided by GainSpan of San Jose, Calif. A property of these devices is that they have two processing units, one largely dedicated to Wi-Fi communications and the other being a general purpose ARM processor capable of being programmed to perform operations of an infrastructure node described herein. While we use the GS 1011 in our Wi-Fi implementation, other Wi-Fi modules may be used. Also, for implementations based on other signaling methods and standards, communication modules compatible with those signaling methods and standards may be used (e.g., BlueTooth, Ultra WideBand, etc.)

All infrastructure devices strewn throughout the store are generic and essentially identical, BUT, there are two different icon types presented in FIG. 10, indicating the differences between those infrastructure devices, 358 or '+', which choose to associate with AP 350 and use its particular Wi-Fi channel accordingly, and those, 360 or 'x', which choose to associate with AP 352 and use its Wi-Fi channel. A description of how such devices are configured, installed and subsequently 'associated' with an AP is provided in U.S. application Ser. No. 13/179,807 (Now U.S. Pat. No. 8,463,290), incorporated herein. Existing Wi-Fi communications may be employed for installing, configuring and associating such devices with an AP.

The general point that FIG. 16 is setting the stage for is that this particular store has effectively two slightly overlapping 'zones' with two different Wi-Fi channels, foreshadowing the coming description whereby mobile devices move randomly throughout this store and yet are supplied with continuous and seamless location determination solutions. That only two AP's are presented is for tutorial/description reasons, and many if not more larger stores will have more than two AP's, yet will have identical LBR principles apply which are discussed in this section.

Figure 16A:
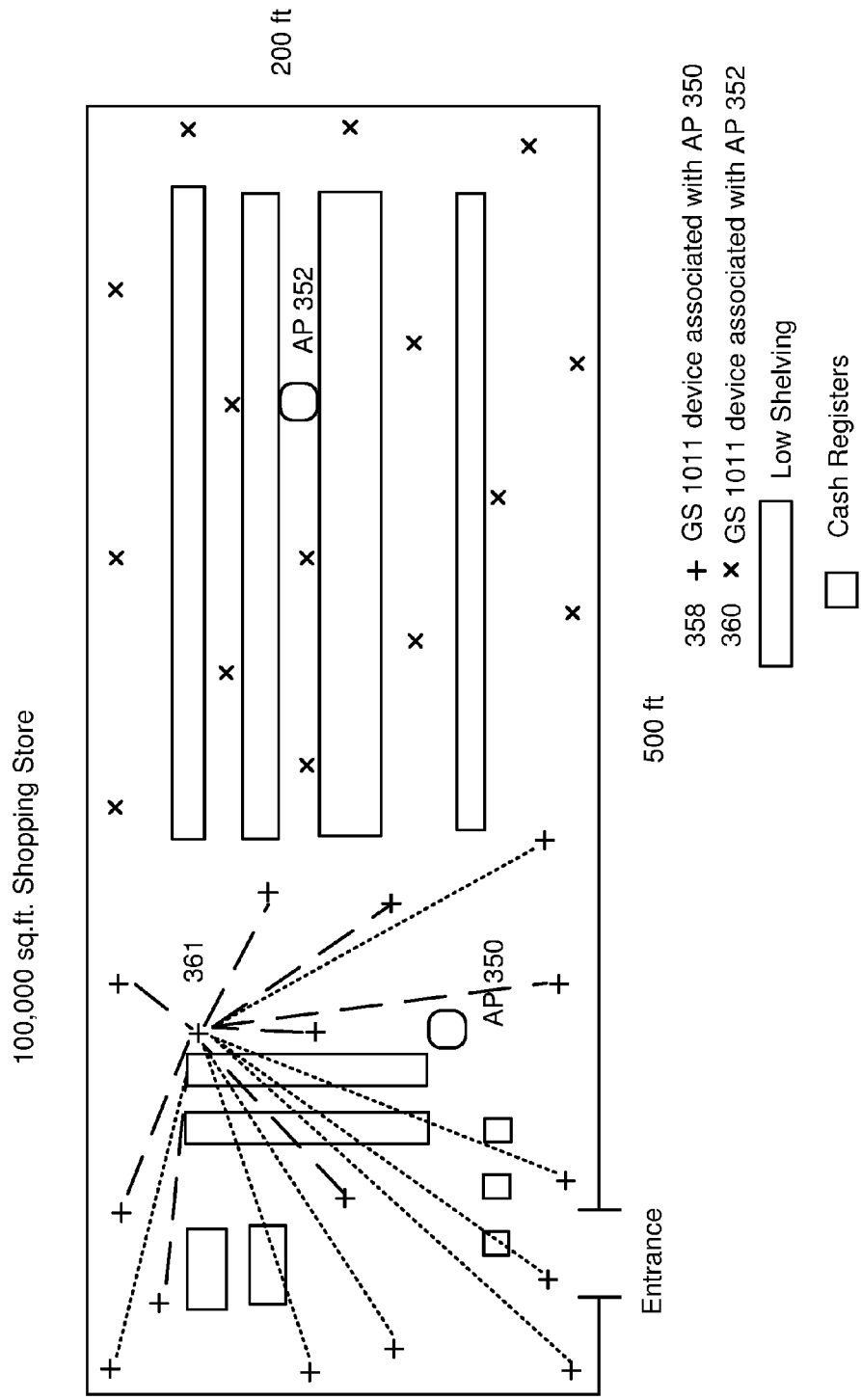
FIG. 16A depicts an example of classifying pairs of nodes as being sufficient or insufficient for use in forming an ad hoc network of nodes that provide reliable data for determining position solutions.

Now, let us assume that the set-up operations described by FIGS. 11-14, and all the accompanying sections around those figures, are performed on all of the infrastructure devices depicted in FIG. 16, including the creation of two sub-groups associated with the two AP's, with the two combining to form one overall group identified by the store itself. Consider also that a 'chatter session' has been run whereby a grouping agent has determined all the decent pairs of Wi-Fi direct channels between two random GS1011 devices. FIG. 16A then depicts one particular infrastructure node, 361, and which other nodes were found to both 'hear it' and 'be heard by it', depicted as dashed lines versus dotted lines. The dotted lines to the nodes associated with the other AP are not depicted as being obvious (as they are different channels and won't hear each other). Note that many of the further devices on the same channel nevertheless have dotted lines indicating that the high quality reception of signals was below threshold for those given pairings. This may be due to simply being out of range, some process applied whereby it was determined that too much noise or 'multipath' was present between two nodes, perhaps they hear each other but there is some sporadic distortions due to an excessively RF-distortion-mobile factors—it can be any number of reasons for a grouping agent to determine whether a given pairing is a good one or not (and as stated, these pairings are constantly monitored and changed if necessary, even during X-Y-[Z] solutions stages).

Figure 17:
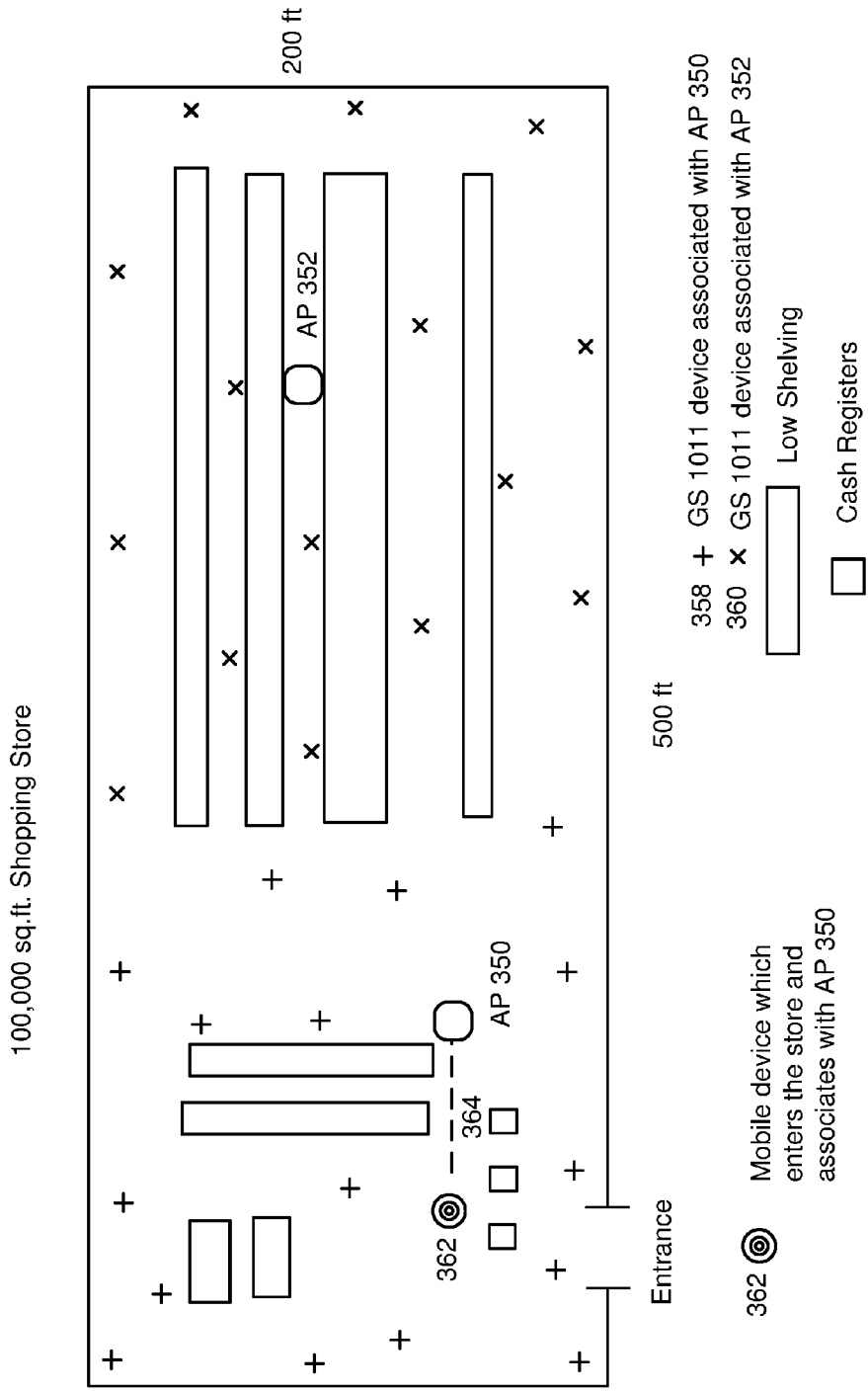
FIG. 17 depicts an example of a mobile device node joining an ad hoc network, and becoming a market side client, which queries the LBR for its location and to which the LBR directs cloud-side, location based services.

FIG. 17 now graphically introduces a mobile market-side client into the scenario. The graphic is simple in its changes from the previous figures and concentrates attention of what goes on during this so-called 'association' with AP 350, depicted by the dashed line 364 in the figure.

The reality is that there are a great many variants on what exactly might happen during this initial association. Many variants will have more to do with the customer/store-proprietor relationship being formed than they do with LBR and location determination. Many of these customer-relationship activations and 'opt-ins' and loyalty program implementations will be covered in greater detail in sections devoted to LBR marketplace dynamics. This section will concentrate exclusively on LBR operations in support of location determination with mobility and channel-switching involved. So the dashed line 364 in FIG. 17 effectively represents what was discussed previously in the section on market-side node registration and initiation, where it referred largely to FIG. 11. More particularly, what was described in the final paragraph of that section included several options of how a market-side client, most typically a consumer's smart phone, gets registered into an LBR framework.

Perhaps the easiest but by no means only way to register a new mobile node, 362/364, is for the store proprietor to first establish a loyalty program Wi-Fi session with that node—logging in to a mobile application for the store—then simply ask a newly arrived customer if they want location based services inside the store. This can also simply be a 'checked setting' so that a customer only need be asked once. Once the store knows a given customer is desiring location services, the store will know the ID or MAC address of the device and will instigate all the LBR registration activities described in earlier sections of this disclosure. Again, the dashed line 364 is very short hand graphic indication of all of this activity. We can then assume that now an LBR, an Agent Registry AND a Grouping Agent, generally run by the store or some service provided to the store, knows about our new mobile node 362. This mobile need do no more than transmit Wi-Fi packets every now and then (once or twice a second if it wishes to be real-time tracked with navigation assistance) for it to be located, with details on how this is done immediately below.

Figure 18:
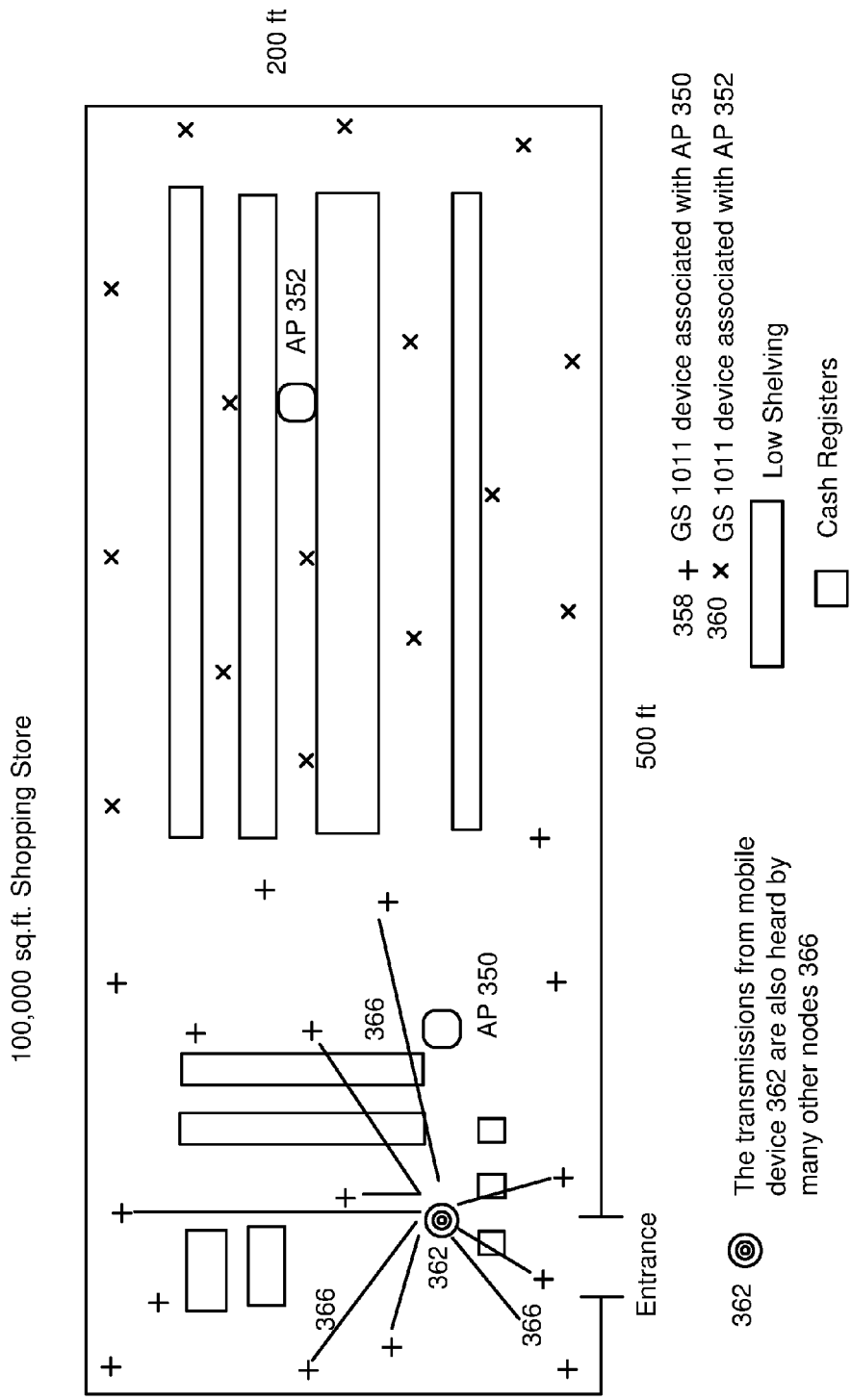
FIG. 18 depicts an example of the transmissions from the mobile device being heard by several infrastructure nodes.

FIG. 18 then depicts that even with the first packet transmit from mobile node 362, there is a small set of nodes which receive that packet and record its local arrival at that device using its individual free running counter, i.e., the depicted nodes all record pings from that packet transmission and subsequent reception. They know absolutely nothing about this new device, and indeed they generally only 'know' about ID'd devices that they should record pings and put ping data into pung packets, or explicit 'don't care' lists informing them they don't need to record the pings. For unknown transmission pings received at infrastructure nodes, best practices would be to have new/unknown devices being heard on the 'care and record' list and later, the LBR can send a message to put any given device onto the 'don't care' list. [As 'opt-out' descriptions attest, devices pro-actively telling the store that they wish to not participate in any form of location services or 'tracking' will give rise to these 'put this specific ID device onto your 'don't care' list, whereby each and any node cannot help but at least to RF-wise record an incoming packet from some device, but upon decoding the device ID and matching that ID to its 'don't care' list and finding it on that list, the node will then immediately discard/erase said ping data rather than packaging it up into a pung packet]. Thus, this raw RF-level receipt and countstamp recording of the transmissions of node 362 is represented as 366 in FIG. 18, labeling the many lines to specific nodes but by no means all nodes in the store (see discussion on the 'chatter session' whereby fixed infrastructure nodes established their 'good pairings' relationships; same general idea applies here: some nodes will hear the new device well, others won't).

So, back in the cloud (e.g., LBR embodiment operating as a cloud service), some Agent Registry 110 now has taken note of the sheer presence and typical 'opt-in' of mobile node 362, instigated whatever flurry is necessary to alert other agents of this presence, with a Grouping Agent 270, FIG. 14, being one important agent in this regard. Such a Grouping Agent will as previously stated have many options available to it but at the core it must effectively say 'I notice that this new device is obviously now within my store ABC123 group, I know it is mobile, I know it is transmit-only and I know it is currently associated with AP 350, which itself has nodes N through T associated with it'—the stage is set for putting all these pieces together as a contained local-solution group generally centered around the nodes that actively and with ever-changing configurations hear this new node 362. The grouping agent will monitor which nodes continue to hear transmissions from 362 and a section below will describe what happens as the node 362 wanders about the store.

Returning still to FIG. 18, let us now posit that the store-app-server, the 'loyalty program server' having been informed by node 362 that it wishes to play in its location services realm, now instructs the new node 362 to simply transmit a few more Wi-Fi packets (or, if the device 362 was already going to be sending packets for session relationship purposes, there is no need to instruct 362 to send packets as it was going to anyway). The end effect of this is that our small group of infrastructure nodes will collect maybe five, maybe a dozen ping-values each as they hear the packet transmissions from 362. Over an ensuing period of a couple seconds (difficult to graphically depict in FIG. 18 and hence not present), each infrastructure node also dutifully packs up such ping values into its pung packets that will be 'over the Wi-Fi airways' sent to the LBR as described in earlier sections. Of important explicit note in this example is that as nodes transmit their own pung packets 'over the airwaves'—i.e. as their own RF transmissions, other nodes will hear and record pings on these pung transmissions. So, at least for this isolated example of just one mobile device 362 being in the store, the infrastructure nodes will be recording pings from both the mobile device 362 AND all neighboring nodes in its vicinity, generally speaking the ones in the 'good pairings' list being tracked by the grouping agent, 270, FIG. 14. After a couple seconds therefore, and after every infrastructure node has had an opportunity to submit its latest batch of ping data to their LBR as pung packets, and after the LBR has routed such pung packets to the appropriate grouping agent, at last we get to the point where some pung processing agent, 290, FIG. 14, can collect such data and launch a specific solutions thread associated with new mobile device 362.

Figure 19:
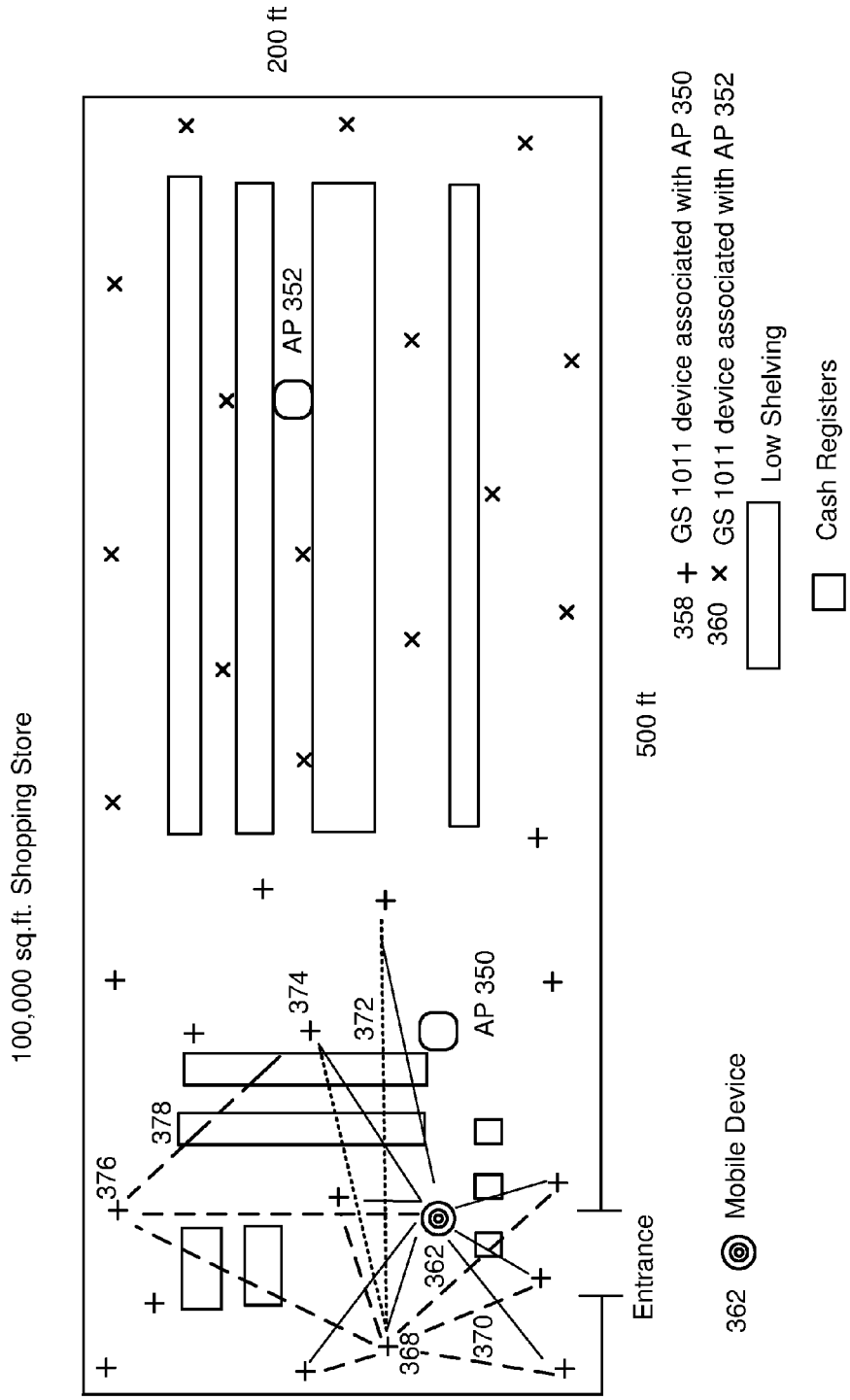
FIG. 19 depicts an example to illustrate how packet processing agents and pair filtering agents operate to assess the communication between pairs of infrastructure nodes as a means of pre-filtering ping data in the packets that these infrastructure nodes provide to the packet processing agent.

FIG. 19 graphically indicates one aspect of what the pung processing agent, 290, does. One specific infrastructure node, 368, is chosen as an example of all such nodes which are hearing mobile device 362. The pung processing agent, through services provided to it via the Pair Filtering Agent, 340, FIG. 14, determines that 'at least for right now', node 368 has decent communication channels going with precisely '6' of its neighboring nodes indicated by the dashed lines in FIG. 19, 370, but it does not have good channels with two of its neighbors that are nevertheless hearing mobile device 362, where this poor-pairing relationship is indicated by two dotted lines in FIG. 19, labeled 372.

Those practiced in the art of real-time ad hoc networks will recognize that the main ideas being described in FIGS. 18 and 19 is that mobile devices are just that, mobile, and generally on a second by second basis their RF transmissions will be somewhat stably heard by certain specific devices but that exactly which will always be changing. The underlying problem to be solved with all of this is that over some couple second period, there happens to be a closed set of RF-active nodes which both hear 362's transmit packets AND hear each other's transmit packets. This ever-changing sub-set of RF devices forms the solution basis for 362's location. So, node 368 happens to 'right now' have good pairings with 6 of the 8 devices which are 'right now' hearing 362's transmissions, but if we then look at node 374, we find that it has a separate 'good pairing' relationship with device 376, indicated by the long-dashed line 378. Any good pairings of listening devices can provide useful input to location determination.

Figure 20:
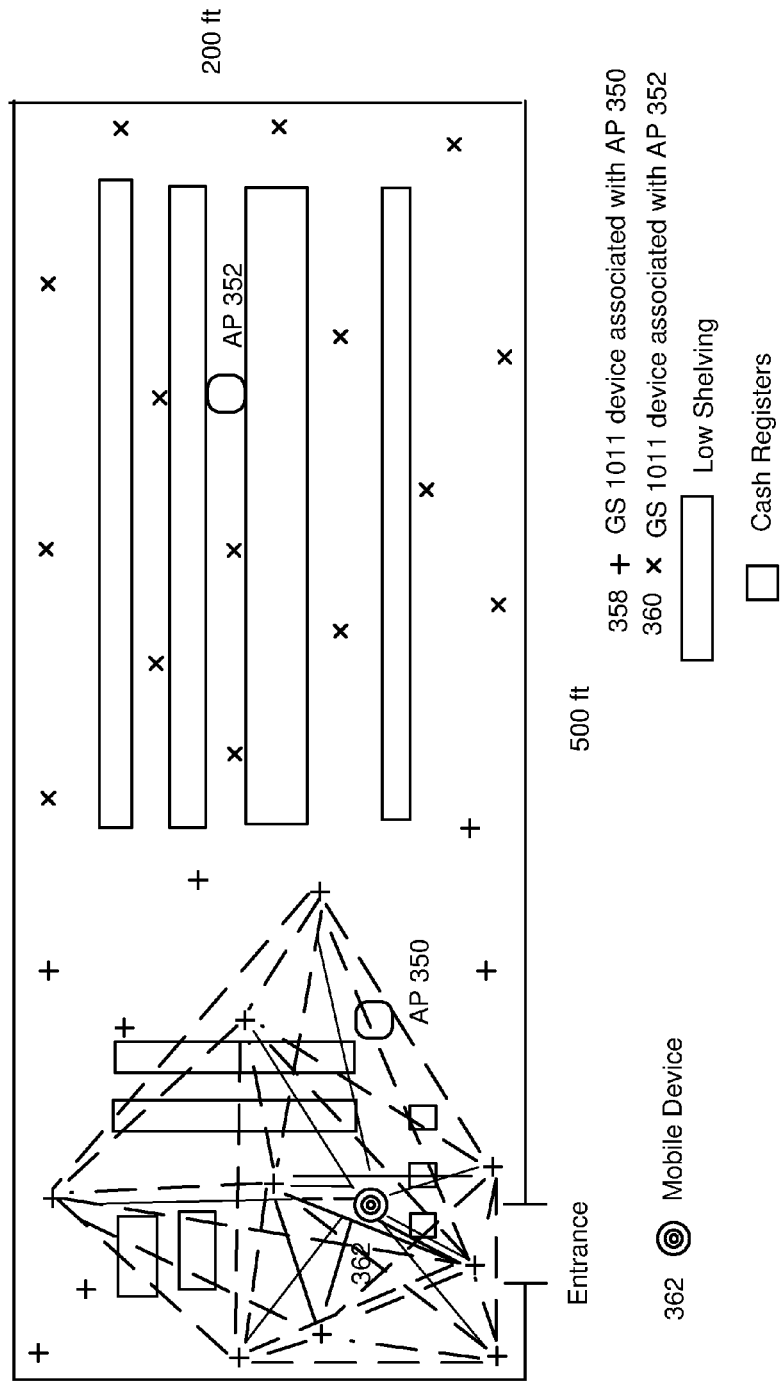
FIG. 20 illustrates an example of good pairings between infrastructure nodes that are hearing transmissions from a mobile device, and as such, these nodes and the mobile device form an ad hoc network at a point in time for determining location of the mobile device.

FIG. 20 illustrates this concept by showing a case where all good pairings for some specific few second period and for this specific mobile device 362 are fully displayed. This disclosure keys in on the networking principles and software agents in the cloud that track this veritable spider web through time. What is perhaps most interesting about the visual presented in FIG. 20 is that the reader must now imagine this plot 'in real-time' and ever-changing on a couple-second by couple-second frame rate, and with just a bit of internal visualization, one can watch this web follow device 362 as it begins to move about the store. The underlying operation of the LBR of this dynamic version of FIG. 20 is, primarily, contained in FIGS. 11-15 and their associated written descriptions of the previous sections. Examples of the processing of ping data to compute timing and location in this type of indoor Wi-Fi environment are described in the space time calibration patents, and in particular, Publication 20090213828, Ser. No. 13/187,723 filed Jul. 21, 2011, entitled MULTI-PATH-COMPENSATION METHODS FOR LOCATION-DETERMINATION OF MOBILE DEVICES (Now published as US Patent Application Publication 2012-0309415), Ser. No. 13/179,807 filed Jul. 11, 2011, entitled LOCATION AWARE INTELLIGENT TRANSPORTATION SYSTEMS (Now U.S. Pat. No. 8,463,290), and 61/613,915, filed Mar. 21, 2012, entitled Positioning Systems for Wireless Networks (included in the specification), incorporated herein.

Over time scales of a few seconds or a few tens of seconds, a GPS receiver generally expects a reasonable stability of the satellite signals it is receiving from various specific satellites, but it also expects constant change as well, once those time scales stretch to minutes and longer. The situation depicted in FIG. 20 is not hugely dissimilar at this time-scale level, where the mobility of the mobile device itself becomes the inherent driver of what at its deepest level is a de facto network configuration issue—i.e., the need to continually determine which nodes are 'during this short few last seconds' communicating packets between each other, keying in on just one mobile node for the framing of the configuration issue. The singular mobile node, 362, defines its own network configuration relevant to itself. The sequencing of this disclosure will next discuss what happens as more mobile devices enter the picture and 'efficiencies behind the scenes' can become clearer.

Dynamic Topology and Grouping Agents: Scaling the Number of Mobile Devices Served FIG. 21 continues the exampled started above, this time illustrating several mobile devices. This diagram is also found and described in U.S. application Ser. No. 13/179,807 (Now U.S. Pat. No. 8,463,290), incorporated herein. Here again we will focus in on an LBR construction of how such examples more easily scale as mobile devices may approach dozens and hundreds for some given very large store or mall, and the numbers of stores and malls approaches thousands and tens of thousands.

Figure 21:
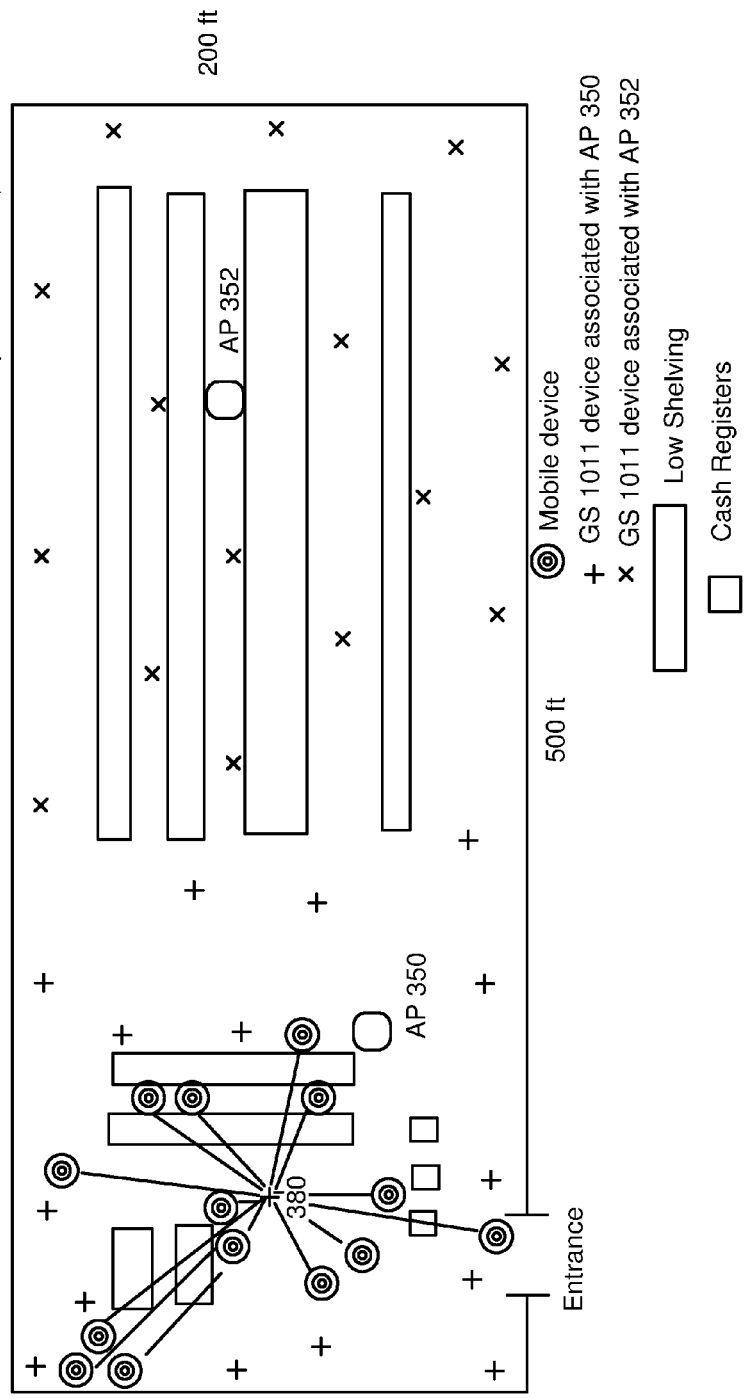
FIG. 21 illustrates communications between a particular infrastructure node and several mobile devices, and a corresponding example of how the node builds a packet recording data about transmissions received from various mobile devices (which is a type of "pung" packet in embodiments described herein).

FIG. 21 isolates a singular example infrastructure node, 380, on the ceiling or on a wall, etc. Its location in the store is such that at some few-second period in time, it can receive and decode packets from 14 specific mobile devices (unlabeled in the figure). Recall that a valid receipt is not just verifying the identity of a given mobile device but also latching a counter upon the receipt, thus capturing a ping datum for that packet. The figure then illustrates how a pung packet is thus generated in the top right corner of the figure, 382.

In the LBR context, we can know that device 380 has been duly registered with an LBR. This device receives and records ping datum from nearly every 'relevant packet' it receives, packs up the datum as pung packets and transmits the pung packets to the LBR. The filtering of relevance between packets involved with LBR activities and those that are not relevant should follow standard 'updated lists' practices, as has been described, including in reference to an 'opt out' procedure, where devices can choose to place themselves onto 'ignore' lists, 'immediately discard' lists, etc.

Figure 21A:
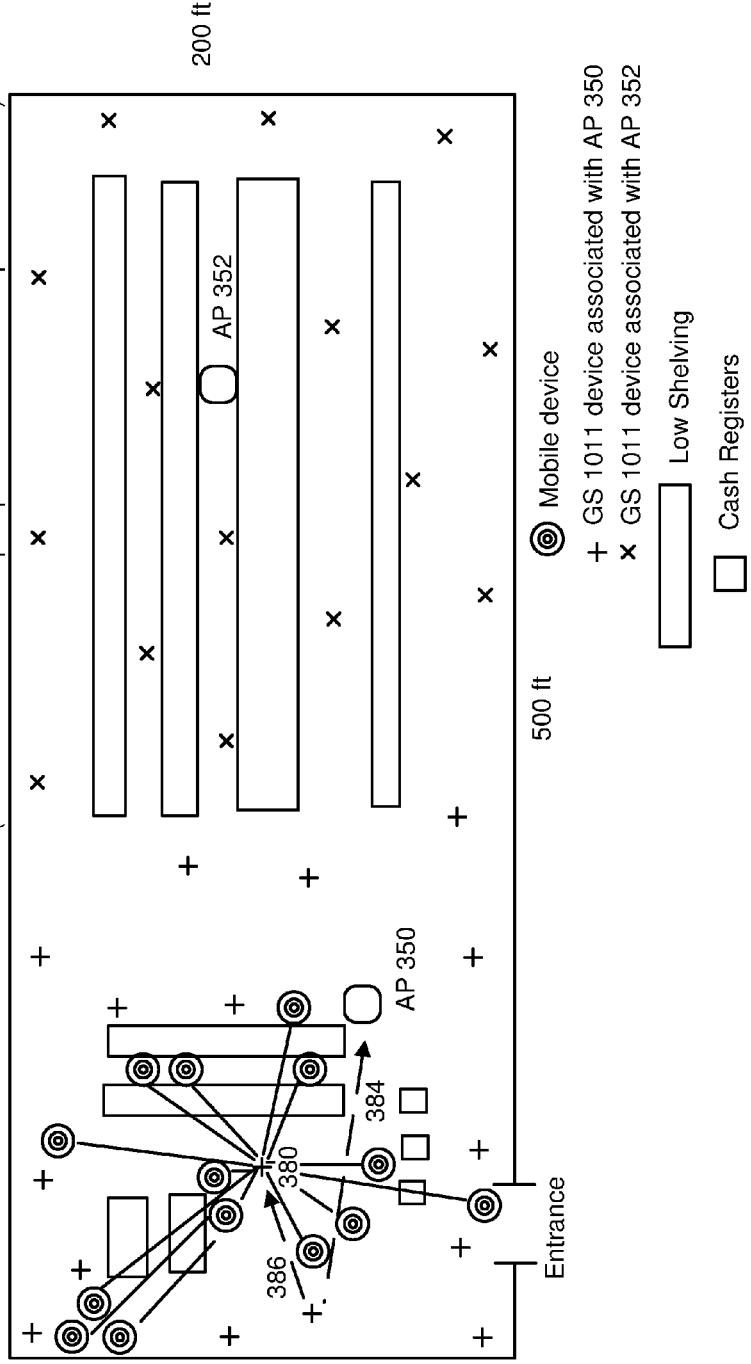
FIG. 21A illustrates the situation where an infrastructure node (386) hears a pung packet sent by another infrastructure node to an access point, and records that event as additional ping data, which in this case is a ping obtained from listening to transmissions (e.g., a pung packet to AP) of another infrastructure node.

Node 380 records pings from some group of mobile devices AS WELL AS records the ping counter values as it hears other nodes sending their pung packets to AP 350. This situation is depicted in FIG. 21A, where the pung packet 384 sent from some other random infrastructure node to the LBR is also heard and ping-recorded by our example node 380. It is exactly the same packet transmission, the two numbers just refer to the fact that both AP 350 and infrastructure node 380 receive the packet, with 380 also count stamping the packet and placing its value and ID of the transmitting node into its pung list 382. It should be recalled that all 14 depicted mobile devices are just having 'normal Wi-Fi communication sessions' as mediated by AP 350. AP 350 can also be counts-tamping incoming packets just like the infrastructure nodes, indeed, this will be the preferred embodiment of this invention once more AP providers understand the benefits of enabling location capabilities in their offerings, but for now, these capabilities generally do not exist on AP's and thus, the situation depicted and described herein simply posits the AP's as doing their usual thing: mediating communication sessions with a variety of Wi-Fi devices around them.

Another quite acceptable variant to the scenario herein described which will work just fine but is not generally supported by 2012-era devices is that duplex count-stamping (ping gathering) can also be happening between fixed nodes (both GS 1011 devices AND AP's) and the mobile devices themselves. One can envision FIGS. 21 and 21A all having mobile devices with on-board count stamping capabilities for Wi-Fi packets received by those devices, pung packets constructed accordingly, then the mobile devices could place such data into packets received by AP 350 and sent to the 'store app' or whatever 'session' they are a part of, to then be passed onward to some LBR and therefore their data would also participate in location determination. Indeed, it is this inventor's belief that mobile devices will someday ALL have accessible packet-receipt (and probably packet-transmit) count stamps latched upon packet Rx (and Tx) events. When this happens, mobile devices can choose to be more active participants in LBR sessions. 'App developers' will be able to create and provide all manner of new apps exploiting a more direct relationship with LBR's and location-based marketplaces. "Opt-in" and "opt-out" capabilities go to a new level of sophistication and trust once a given device itself can choose what data to share and what not to share, or, to simply keep all of its operations to itself similar to a GPS receiver being able to function by simply listening to public-domain signals. Likewise, a mobile device can also just sit and consume (receive) public domain signals and determine where it is. The LBR architecture CAN support such pure consumption of services by making many of its current data feeds (from infrastructure nodes such as the illustrated GS 1011's devices, for example) publicly accessible.

Concluding this section, one can see that in the nominal case of mobile devices simply broadcasting Wi-Fi packets every so often, then scaling is just a matter of how many mobile devices can be heard by any given fixed-node infrastructure device—in the final analysis this will be determined by Wi-Fi airways and contention for air-space, as one would put it in the parlance of wireless communication. The LBR cloud-side construction is such that LBR's can be parallel, agents parallel, threads spawned and pretty close to 'indefinitely scalable' as the hyphen 'cloud-side' implies.

Dynamic Topology and Grouping Agents: From Raw Pung Data Ingest to Location Solutions This section will go further into details of what is happening as the infrastructure nodes continually send their pung data to an LBR. As will be seen, essentially all of the 'algorithmic steps' remain similar to those of previous disclosures in the space time calibration patents, including prescriptions on dealing with multipath distortions and dropped channels. Here, the emphasis is on breaking up these steps into a more efficient and easily scalable form. One simple example of this is embodied in a rhetorical question, answered in this section: if two fixed infrastructure nodes are involved with receiving packets from 20 or 30 mobile nodes in order to assist in determining those mobile node locations, and if there are sub-operations common to just those two nodes applying to all 20 and 30 mobile nodes, why do such operations 20 or 30 times? (short answer: do them once and make these results available to the 20 or 30 solution threads; longer answer: practice LBR principles for scalability).

Figure 22:
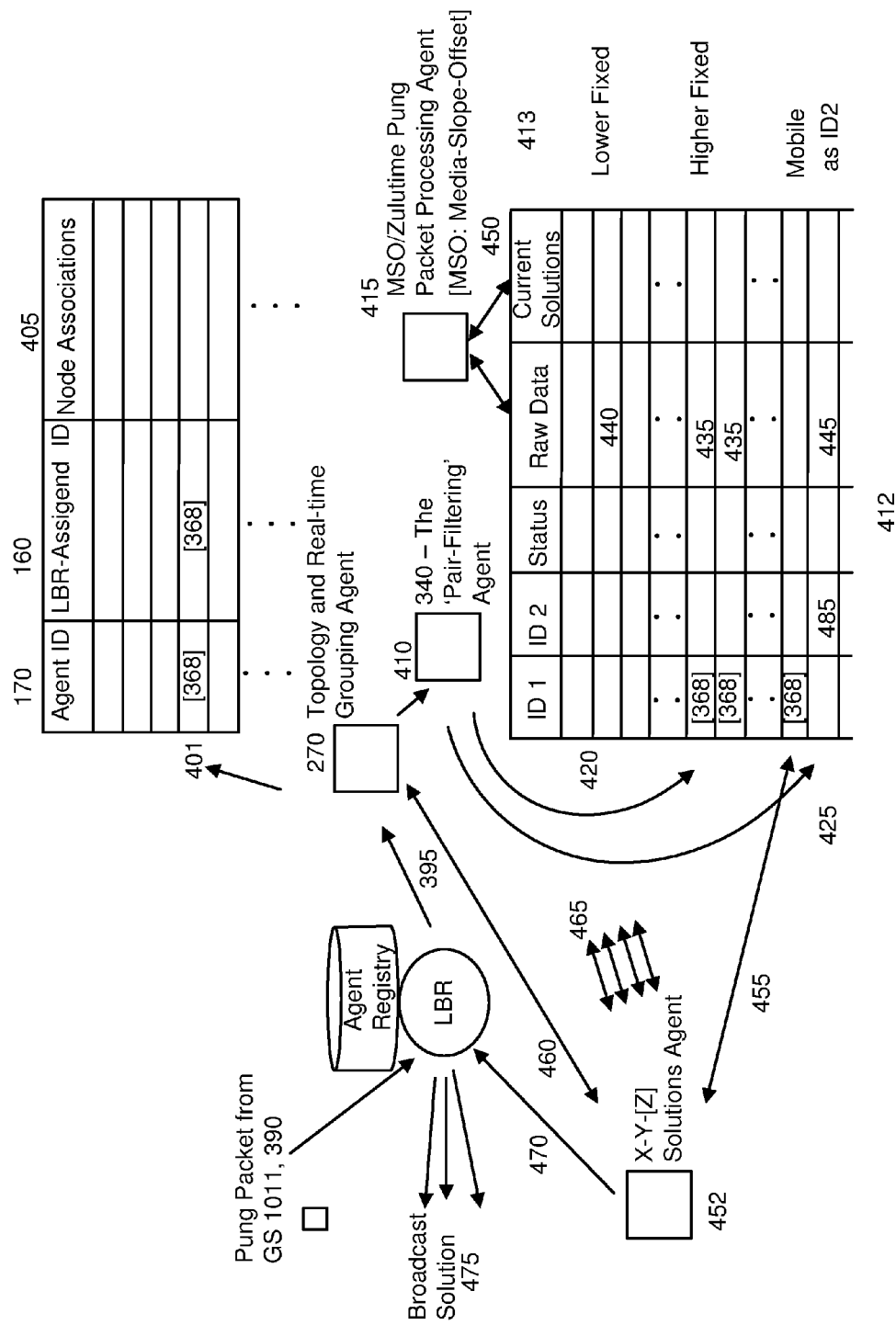
FIG. 22 is a diagram illustrating how the LBR routes packets among agents, and the agents process the packets to provide locations solutions.

FIG. 22 takes some of the bones of FIG. 13—which illustrates how various player-nodes are registered and organized—and will now illustrate how ongoing pungs are processed from many fixed infrastructure nodes. [As previously noted, it would be useful to have pung data from mobile nodes as well, but this example assumes that mobile devices are in a 'transmit only' configuration, not 'caring' about being a direct participant in determining their location but merely wishing to benefit from that knowledge; this issue is a 'market penetration' issue, where limiting the requirements of a mobile device to simply transmitting a few Wi-Fi packets is a lower barrier to entry, and hence this section continues to concentrate on this mobile transmit-only scenario].

In FIG. 22, let's start by looking at the far left of the figure and the presumed incoming pung packet 390 [For now, let's assume it is from node 368, FIG. 19]. This is, in our implementation, 'wrapped' by a LBR packet frame, see FIG. 10 and its accompanying description. Via wrapping instructions, the LBR and its associated Agent Registry, the LBR in this case knows to pass along this packet, 395, largely intact to the grouping agent, 270, that has been previously assigned to fixed infrastructure node 368. The LBR may also perform some housekeeping operations such as incrementing a counter for how many pung packets it has received from 368, and/or updating the 'time of last LBR packet' from 368, and/or broadcast a message to any agents which have signed up to be alerted any time 368 submits a pung packet. There are other options as well, but generally speaking these will be mediated by fields in the Agent Registry where such instructions have been previously loaded.

Grouping Agent 270 immediately determines (step 401) which of its many nodes it might be handling has sent this incoming packet, again through the LBR wrapping. In this case, it determines the sending node through database look-up through a conventional database process. From this look up, it finds whatever operative ID(s) are associated with the sending node. Much of the Grouping Agent's task has already been performed when it was tasked with doing a crude grouping of nodes based on 'floors' and 'AP's', etc., where subsequent operations created the chatter sessions and found initial configurations of 'good pairs'. In a highest level design sense, the Grouping Agent is chief instigator of the cloud-side flurries required to initiate groups and set the stage for real-time solutions processing, and its real-time role becomes therefore more of just another router with some housekeeping chores watching over the general health of the established groups, pairs, serviced mobile clients, etc., doing something about the 'health' and/or changing network configurations if it discovers major changes in such. Inherent to these earlier activities was the storing of such information and the creation of its own internal listings of managed nodes and node associations, with FIG. 22 making this more explicit.

Continuing on with FIG. 22, we see a broadly defined column heading labeled 'node associations' which is obviously more involved than a simple column would indicate. The activities depicted primarily by FIG. 22 and its associated text are generally kept track of (recorded and monitored) at a higher level in this agent's database (higher level=the nodes generally grouped with AP 350 but not necessarily 'good pairings', which we will come to; and also, generally which active mobile devices MAY, but not necessarily ARE, being heard at any given few second period of time). We might refer to this level of association as a virtual or potential level, and ensuing discussion on the pairwise agent and the packet processing agent clarifies another level of granularity on how few-second by few-second changes are monitored, stored, processed, etc.

For this scenario, we can imagine that Agent 270 does a quick check on the pung packet looking to see that most if not all of what it contains is within the 'known' group of nodes, and if so, it mainly just passes along the intact packet (410) to the Pair-Filtering Agent 340. If it does find 'new nodes' in the pung packet, or some other anomalies (division of labor of anomaly-checking can be negotiated between 270 and 410), it may perform other actions such as inquiring back through the LBR whether there are new fixed infrastructure nodes that have neglected to register themselves, new mobile nodes which have not explicitly registered to 'opt out'—which itself launches a complex decision process on what to do with such 'purely anonymous' nodes—etc. As the sections describing more of the marketplace aspects of LBR will further elucidate, the whole privacy/opt-in/opt-out choices are rich and varied, and the Grouping Agent 270 is one logical contained set of software where some of those capabilities can be expressed and acted upon in public/readily identifiable and 'trustworthy' ways.

Continuing with the specific scenario, once the Pair-Filtering Agent 340 receives the packet 410, its primary task is to sort through the lines and fields of information depicted as label 382, FIG. 21, sorting everything into 'good pairs' discussed earlier.

This is one of the reasons that the word 'filter' is used, though it could also be called a Pair Manager Agent, for its role in managing an updated list of 'good pairs' operating in an ad hoc network. One embodiment of how exactly this Agent 340 sorts information and subsequently stores it is depicted as the 'new' database layout in the lower right of FIG. 22, labeled 412. This database itself is actually not 'new' only newly described now that we are at this level of granularity. Its initiation was during the previously described chatter sessions whereby the many 'good pairs' were found and recorded. It can be argued that this database more properly should be managed by the Grouping Agent 270 and that the Pair-Filtering Agent should simply be an agent which operates on the database—which is exactly how this embodiment lays out the Packet Processing Agent 415 next to be described—OR instead this embodiment posits that this database warrants its management by Agent 340.

The lay-out of database 412 is also flexible with one specific embodiment presented, with the fields also limited in the depicted graphic to some mainline actors. The overall structure of 412 consists of two larger row structures with potential double entry logging for fixed duplex node pairings and a second single entry logging for mobile nodes. The field layout and the ID sorting approach are generically labeled as 413 and this and subsequent paragraphs walk through these items. The basic concept is that the node shipping in the pung data will become ID1, while all the ID's it contains inside its pung packet will become 'possible' ID2's, after certain checks and filtering occurs. In practice, the filtering done by node 368 itself, its so-called 'don't care' or 'discard' list, is not perfect and it will very often be sending in ping datum received from nodes not currently within the 'good pairs' database 412. We can then view Agent 340's task as first walking through its newly arrived pung packet and finding the sending node's ID (either the LBR ID and/or the Agent ID, etc.) in the ID1 field, assuring that the sending node is at least part of one good pairing. We will come back to the case where the sending node's ID is not discovered anywhere in the ID1 field.

Depicted in FIG. 22 is the curved arrow 420 where in this scenario the pung-sending node's ID has been located in the ID1 field. We can imagine that a total of ten entries are found after the first entry at the end of the arrow 420, corresponding to the six dashed lines of FIG. 19 at device 368, and four more that are not depicted in FIG. 19 because they may not have received good packets from mobile device 362 which was the primary subject of that figure. The task of Agent 340 is now simply to add in the raw ping datum of the pung packet into the raw data fields, labeled as 435 in the figure. It is generally sufficient to only place the raw data into the fields associated with the pung-sender, but there are also practical reasons that suggest also placing this raw data into the raw data fields of the 'transmitting nodes' as well, labeled as 440 in the figure. This is a kind of double-entry logging so that any node participating in either a transmit or a receive ping can have access to all recent relevant raw data as purely a function of the ID1 field. Again, though, this is a convenience not a necessity.

Agent 340 sifts through each entry in the received pung packet, attempting to find 'good pair' matches, indicated by the second and subsequent lines in the database. Here as well, it may find fixed infrastructure node ID's that are not a part of the ID2 field and/or it may have entries in the ID2 field where it is expecting to see some new raw data but finds none. Both cases are routinely encountered in practice. In both cases, the task of identifying and subsequently doing something about these situations can be negotiated between the Pairing Agent 340 and the Grouping Agent 270. In the earlier case where the sending node was not found in the ID1 field, and here in this paragraph's pointing out that sometimes good pairs find no new data and/or possible new 'good pairings' are showing up, secondary processes can start either in 340 or 270 to monitor and change the current good pairing database. Usually, this entails a certain kind of thresholding and consistency checking that was part of the initial chatter calibration earlier described. Those practiced in the art of maintaining real-time databases which log current connections and the need to monitor the 'age' of those good connections, the need to purge entries if they go stale, create new entries if new valid ones are found, should use such practices in the building of database 412.

Depicted next in FIG. 22 is the curved arrow 425, indicating that Agent 340 will also be cycling through all ping datum in the pung packet that belong to mobile devices that were transmitting packets. New mobile device ID's will either be found or not found in the current database 412 ID2 field. Where found, Agent 340 provides the raw ping count values into the raw data fields, labeled as 445; where not found, 340 or 270 may wish to kick off a 'is there a new unregistered mobile' message back to a store's app server for example, or similarly, 'we have found a new mobile ID, is your store policy to assume 'opt-out' first', with the response of 'yes' causing a broadcast to all infrastructure nodes in the store to place the newly discovered mobile ID onto their 'discard lists'. Sections on privacy, opt-in, opt-out will all explore these topics further, but the point for the current scenario is that some events will always be happening (good pairings going stale, new good pairs, etc.), and that one of the tasks beyond filtering of either 340 or 270 will be to deal with these types of anomalous events by making corresponding updates to database 412.

The steps through and including label 445 can together be seen as database look-up and updating operations, keying in on sorting and storing the raw ping datum contained within ongoing floods of pung packets being sent in from deployed fixed-node Agents. Scalability of this capability is the very definition of the process depicted. Agent 340 is largely tasked with this filtering out of 'good pair' real-time data, with the dispatch of the anomalous situations also included. This is now a good time to introduce the MSO Packet Processing Agent (also labeled as the Tung Processing' agent), 415 and its activities alluded to by the two arrows labeled 450.

Figure 23:
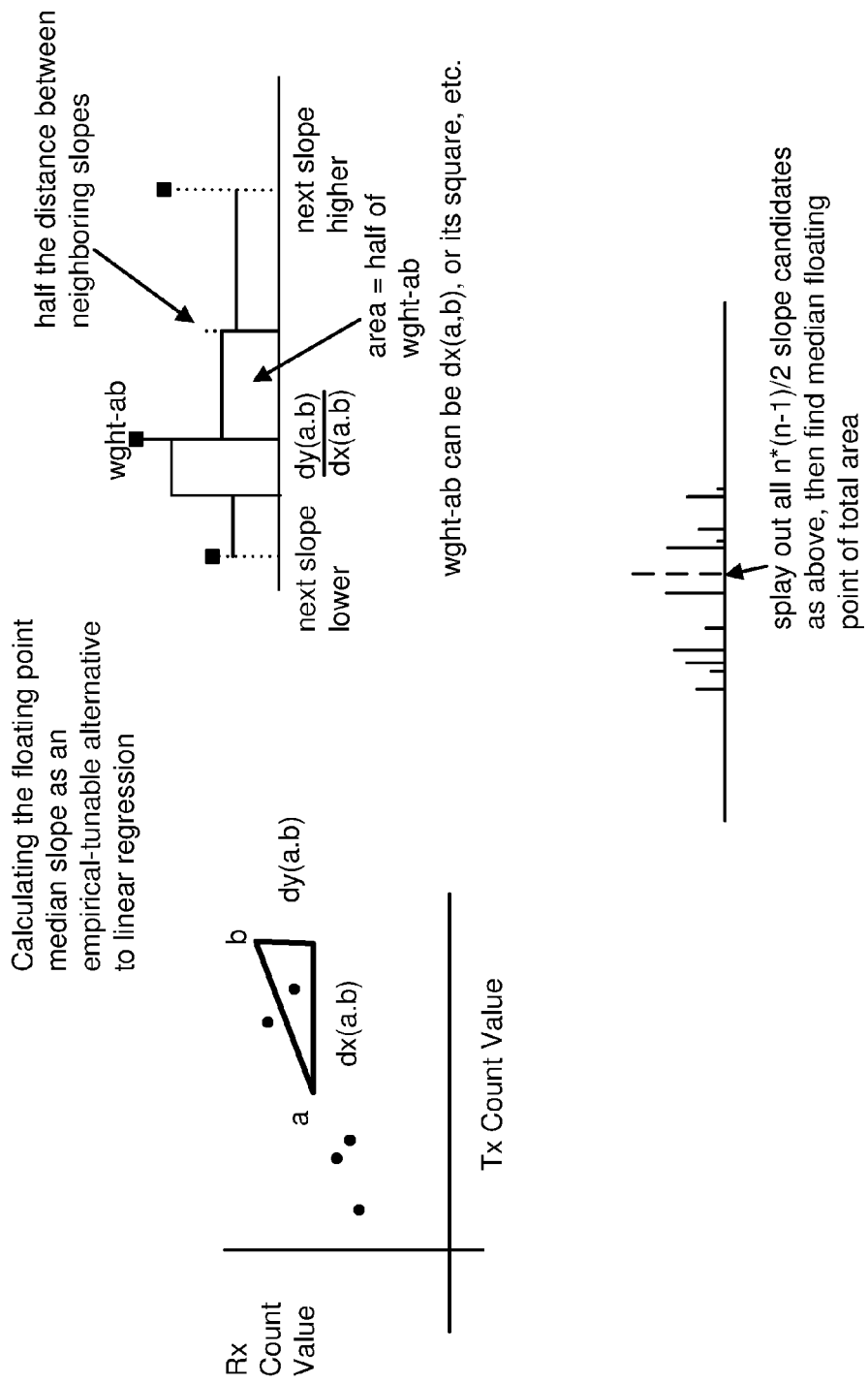
FIG. 23 illustrates a particular method of packet pre-processing in which clock/counter data gathered from transmissions between pairs of nodes is transformed into a representation used for computing location solutions.

As has been typical of descriptions of the exact operations of various agents heretofore, the precise execution of the MSO Packet Processing Agent 415 has many variants. Its central task is to transform raw current ping data stored in the raw data field into current slope/offset information existing between, generally, two fixed nodes in a 'good pair' duplex ping session. FIG. 23 illustrates aspects of an embodiment of this Median Slope Offset approach for transforming raw ping data. This approach comes from our observation that linear regression fitting of lines to sample data is sufficient in some cases to model ping data over time, yet empirical tuning with non-linear methods can provide better results. Depicted is one such 'empirically tunable' approach to finding slopes and offsets of sample distributions that are typical of Tx count v. Rx count plots between two fixed infrastructure nodes. If clocks/counters were perfectly in synch and counting together (same slope and zero offset between counters), these plots would be very close to y=x lines, offset by distance between nodes. This is stated only to help understand the depicted plot and obviously never happens. Another typical sample distribution is Rx-Tx as a function of either Tx or Rx—which tends to better intuit clock/counter differences though is largely the same information as Tx v. Rx. The point of FIG. 23 is mainly to explain how 'MSO' (median-slope and offset) functions, where other sections in this disclosure and previous disclosures explain the numerous places where such an operator-on-data can be useful, noise tolerant and tuned.

While linear regression fitting of lines to sample plots is acceptable as well, the MSO approach depicted in FIG. 23 appears to be a bit better in practice (10 to 50 percent error reductions are not uncommon, usually in high distortion environments—read high multi-path and delay-asymmetric instrumentation). Referring to FIG. 23, finding the median offset is essentially the same as finding the median slope, where the slope usually comes first, then the offset is found after subtracting the y='median slope' *x line from the sample distribution, followed by the same sample splay operation depicted in the lower part of the graphic on the resulting y-values after the subtraction (replacing y'=y−'median slope' *x for the 'dy(a,b)/dx(a,b)' in the figure, upper right). This is mathematical description of the transformation that agent 415 applies to clock/counter data. As noted, other means for fitting the data to a model, such as fitting to a linear model by linear regression, are also possible.

Thus, a function of agent 415 is to process a given raw data column cell-entry that it is pointed at, by grabbing the last few seconds of Rx/Tx count values and placing these median slope/offset results into the adjacent database column. Other agents to be discussed further operate on those 'interim solutions'. The 'pointing to which entry cell' is widely variable on how this happens: it can just do a common top to bottom cycling, it can be instructed to go to specific places by Agents 270 and/or 340, or it can just follow its own logic of watching when sufficient raw data conditions are met (thresholds, etc.) in all the raw data entry cells and operate when they are met. Other options are possible as well. Those practiced in real-time updating of raw data feeds into databases structure cells, then transforming such raw data into steady processed results, can recognize the options available for agent 415.

Turning back to FIG. 16 then, the X-Y-[Z] solutions agent 452 can now be more properly introduced. [It was labeled 282 in FIG. 13, with a higher level description earlier]. This agent's function also can have the 'generality of approaches' description exactly as agent 415 described in the prior paragraph: the details of its implementation are quite flexible. In our current scenario, its primary focus is on the many mobile devices moving about the store and the global need for some agent to process MSO and raw-mobile-Tx data into X-Y-[Z] solutions. Again for a 'Tx-only' example of mobile devices which get located by simply transmitting packets, the task begins by searching the ID2 field for any specific mobile device wishing to be located, indicated generally by line 455, then noting ALL ID1 fields wherein the ID2 field has that given mobile device, THEN inquiring of either agent 270 of where all the 'good pairs' involving this new set of ID1 players (effectively trying to piece together the logical situation depicted in FIG. 20 and its associated text). Once the web of FIG. 20 is thus determined, the MSO results are fetched (465) from the solutions-field of database 412 and combined with raw ping data in the "mobile as ID2" part of the database (co-indicated by 455), ultimately driving the several variants of final X-Y-[Z] solutions described in space time calibration patents incorporated herein, including the descriptions in the multipath oriented disclosures showing how the web-structure of FIG. 20 can be optimally exploited in a multipath-mitigation sense. See, e.g., Ser. No. 13/187,723 filed Jul. 21, 2011, entitled MULTI-PATH-COMPENSATION METHODS FOR LOCATION-DETERMINATION OF MOBILE DEVICES (Now published as US Patent Application Publication 2012-0309415), and 61/613,915, filed Mar. 21, 2012, entitled Positioning Systems for Wireless Networks (included in the specification), which are incorporated herein.

FIG. 22 illustrates the LBR operations that coordinate the proper data fetching and assembly lines of real-time data flow. Mass scalability generally dictates these approaches to 'getting to the math'. Minimizing Cost in its broadest sense is the real problem to be solved, with these last few sections describing an embodiment to such.

Concluding the discussion of FIG. 22 and of this section then, once given X-Y-[Z] solutions are determined for one or more mobile devices in the store, the solutions Agent 452 dutifully sends such solution(s) 470 to the LBR for whatever new flurry of activities this may instigate—475. As this disclosure transitions from plumbing-side descriptions of how location of devices is determined to market-side descriptions of tri-quads and location-based-markets, it will quickly be seen that the three lines labeled 475 are really just small matches which ignite several new and richly adaptable activities all with the end-goal of the far left side of FIG. 7: matching buyers and sellers.

Figure 24:
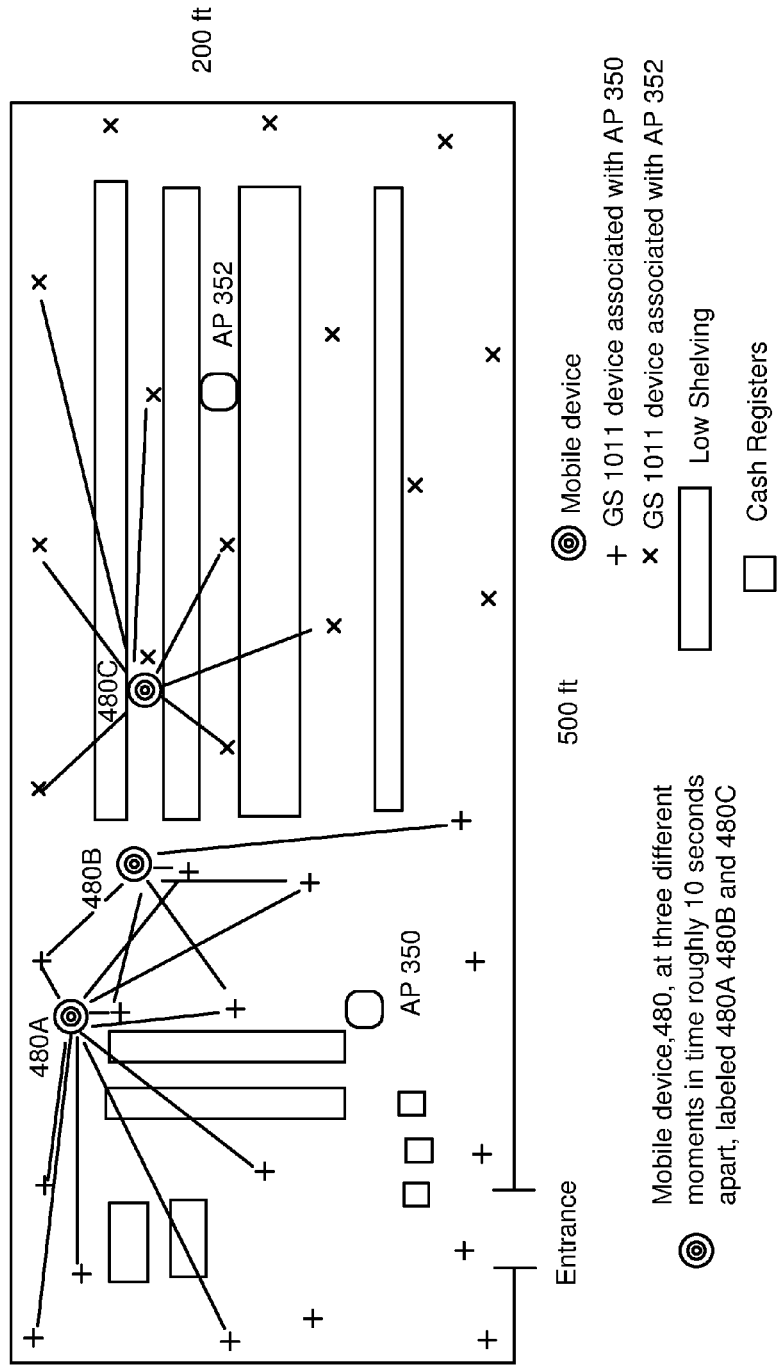
FIG. 24 is a diagram illustrating changing connections among a mobile device and other network nodes as the mobile device moves to different locations over time.

Dynamic Topology and Grouping Agents: Mobile Device Movement, Channel Hopping and Topographic Ooze FIG. 24 is largely borrowed from an earlier filing where this section will now concentrate on the LBR-aspects of this earlier-described scenario. The main concepts surround how LBR message passing amongst the various agents handles the constantly changing network topologies, including the point where a given mobile device switches from being associated (in primary data packet exchange with) AP 350 and switches over to AP 352, a scenario which also includes the plumbing-level-important switching of Wi-Fi channels.

FIG. 24 depicts a singular mobile device 480 now in three separate instances in time, separated by 10 seconds each, labeled as 480A, 480B and 480C in the figure. It also depicts 10, then 6, then 8 'good' Tx to Rx connections between itself as transmitter, and infrastructure nodes as receivers, at the respective A, B and C points in time and in the store. It can well be appreciated by this graphic that determining indoor location via this constantly changing set of connections is a bit trickier than the situation a GPS receiver faces, where satellite signal reception has a much slower timescale of change and, of course, a much more predictable set of connections.

If we go back to FIG. 22 now, we see label 485 in the ID2 column near the bottom of its graphic depiction. This label 485 is within the 'mobile' section of the database, as depicted on the far left, labeled 413 well above. The point of label 485 is to say that much of the rest of FIG. 22 and its accompanying text description is just going on as usual: infrastructure devices in the store are simply sending in their pung packets, non-mobile 'good pairs' doing their normal thing, but as device 480 moves around the store, we find that the main changes behind the scenes are that now different nodes will be reporting pung packets which have transmissions from mobile device 480 showing up.

As the solutions Agent 452, FIG. 22, is asked to make a location determination for 480, it has access to this last five or ten or twenty seconds of pung data showing up in database 412. Naturally, the solutions-agent fully expects that different nodes will wind up having 480 show up in the ID2 field over this time period, and previous disclosures have delved into how a singular time-filtered and/or Kalman-filtered determination of location can fall out from this short time period (e.g., five seconds) of Tx-Rx connections that have occurred between 480 and any infrastructure nodes. Solutions agent 452 thus collects all instances of 480 ping data as identified in the ID2 field and performs these mathematical operations accordingly.

As device 480 moves from 480A to 480B, the main action behind the scenes is that each second by second a changing set of nodes are actually hearing from 480, but all are still associated with AP 350 and hence on AP 350's Wi-Fi channel. The nodes associated with AP 352 and on its channel are thus not hearing transmits from 480 and thus are not showing up in database 412. Next we turn to what happens when 480 moves from the part of the store where nodes generally associate with AP 350 to the part of the store where nodes are associated with AP 352.

As usual, there are several options for detailed treatment of this situation. Perhaps the easiest and now the most common is when a given mobile device simply goes through its normal 're-association' process whereby the in-store Wi-Fi service simply figures out that 480's signal quality/strength is obviously and rapidly decreasing for AP 350, and a quick channel-hop procedure on the mobile device finds that there is a stronger-signal alternative in AP 352 and its channel. These procedures are well understood in mature Wi-Fi AP deployments and environments such as retail spaces. The most basic way of saying this is: mobile device 480 just switches over to AP 352 with the LBR infrastructure having nothing to do with it—it just happens as a normal part of Wi-Fi operations.

For this simplest/easiest case, then, the primary thing happening behind the scenes in LBR-space is that there is some 'coarse' instant in time where database 412 no longer finds 480 showing up in the ID2 field for all nodes associated with AP 350, and all of the sudden starts seeing 480 showing up in ID2 fields for nodes associated with AP 352. At the raw data level, it is as simple as that. It is then EITHER the Solution Agent's job to see that this wholesale switch of ID2 fields has occurred, notifying the Grouping Agent 270 of this change, OR, the Grouping Agent itself can have a low level process watching for this kind of channel hopping/AP re-association by monitoring pung packets and making sure its tracked group relationships—at the AP level—are holding firm. Both approaches also can work, a form of redundancy.

However the re-association and channel hopping happens, from the solutions Agent 452's perspective, it simply needs to take this switch into account during its calculations and blending together (usually in a Kalman filter way) of past, recently past and very current data into one singular estimate of location. In this case, the 'past' and 'recently past' data has come from AP 350 associated nodes, with the latest batch of data from 352-associated nodes. A couple seconds later, a hypothetical 480D not depicted, most data will now be coming exclusively from 352-associated nodes. This is a basic problem of solutions-blending across a boundary, where one side of the boundary has a discrete set of data providers and the other side has a different set.

Figure 25:
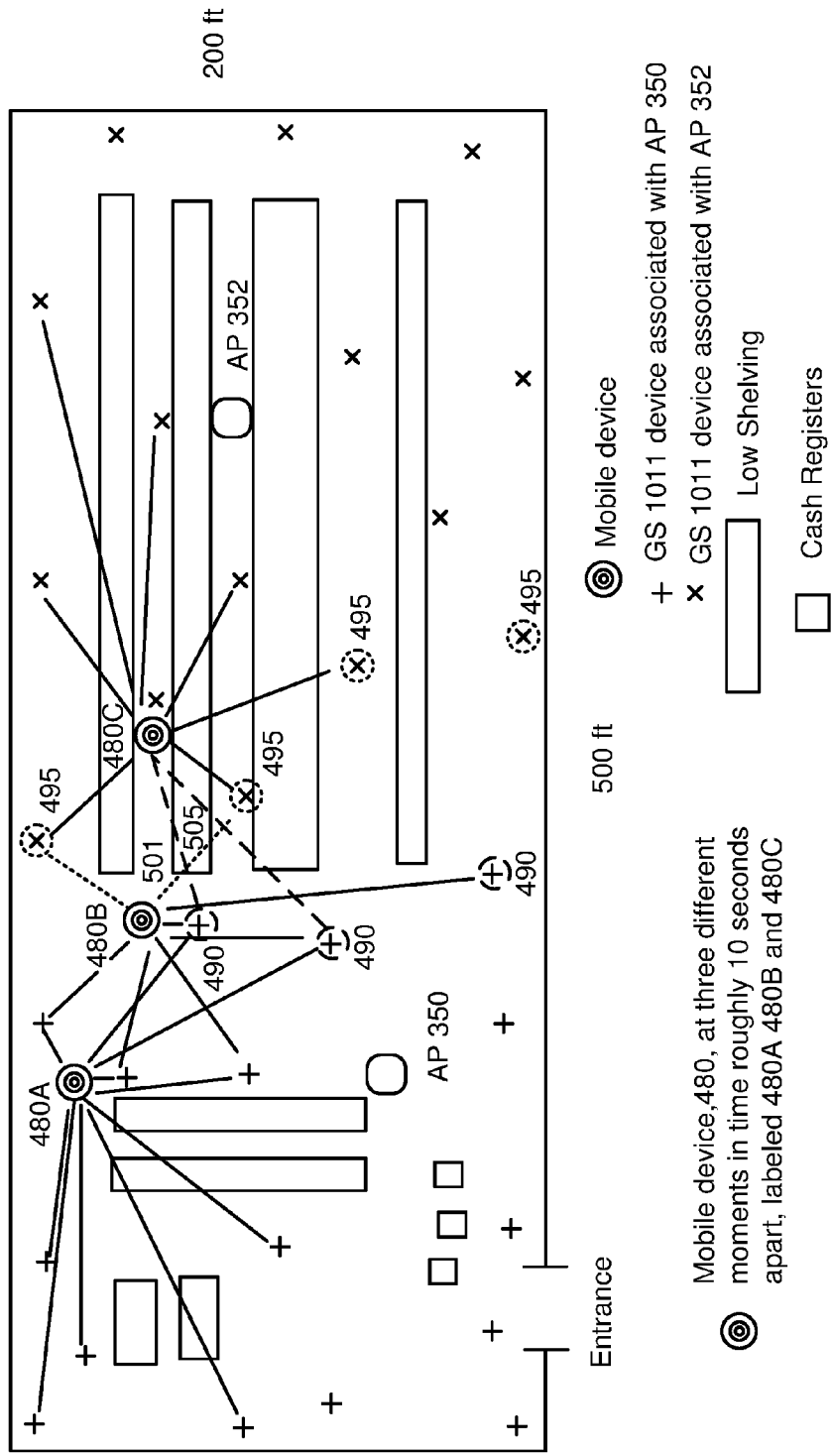
FIG. 25 is a diagram for describing another approach to changing connections among network nodes as the mobile device moves to different locations over time.

FIG. 25 depicts another approach to dealing with a changing set of connections as the mobile device moves in the store. In a nutshell, even though GS 1011 devices generally like to associate with a single AP, this does not have to be the case. For GS 1011 devices in that middle zone between AP 350 and AP 352, they have the option to cycle-switch between associating with 350 and then 352 and then back again. This might be switched every pung cycle, for example, generally once a second or once every couple of seconds. At the very low network layer, AP 350 and AP 352 may not even need to know about this switching, they just know that they hear from some given GS 1011 device every so often 'on their channel' and don't care what happens on other channels. The benefits of this channel switching is that now devices in that middle ground can participate in providing better solutions overall, with the price paid that they will be missing roughly half the transmissions from mobile devices and from other fixed infrastructure nodes associated with a given AP. But, this price in practice is relatively small IF there is a fair amount of data redundancy, i.e., where some given device now only hear a dozen pings as opposed to two dozen.

Returning to FIG. 25 then, we see that three circled nodes labeled 490, associated with AP 350 exclusively in previous figures, are all now doing this channel/association switching between AP 352 and AP 350. Likewise, four circled nodes labeled 495 are doing the same. Further depicted are the newly-discovered Tx-Rx good connections that would not otherwise be there in the earlier singular-association scenario, with these new good connections labeled 501 and 505. As those practiced in GPS location measurement well know, new 'diversity' in solutions far outweighs halving of the raw data averaging, all leading to improvements in Dilution Of Precision (DOP is a term used in GPS literature and appropriate here).

In the case of fixed-node devices which do this routine channel switching, they would of course inform LBR-space of this behavior such that from the Agent Registry 255, FIG. 13, all the way through to the solutions Agent 452, FIG. 22, they all know to expect such behavior and exploit its properties accordingly (and mitigate its costs).

Specification of 61/613,915

In the following section we detail several examples of systems for computing positions of mobile devices in wireless networks. These systems are related to prior work detailed in the space-time calibration patents incorporated above. These patent documents describe space-time calibration systems for a variety of applications, including positioning systems for networks of nodes that communicate wirelessly. Using the techniques described in these documents, the nodes within a network cooperate by transmitting pings to each other, determining a clock count value upon ping transmit or receipt and associating the events of ping transmission and receipt among nodes. A space-time calibration unit takes this information and calculates position and timing information for the network. This calibration can be used to provide locations for nodes, as well as calibration of clocks within the nodes, as those clocks are independent and have differing clock rates.

This document describes various embodiments for calculating position of mobile nodes in wireless networks. The space-time calibration patents provide background for these embodiments, as they describe examples of configurations for transmitting and receiving pings and associating these ping transmissions and receipts in preparation for space time calibration. The positioning techniques described in this document also operate on associated pings and provide additional techniques for computing positioning and timing information.

Figure 26:
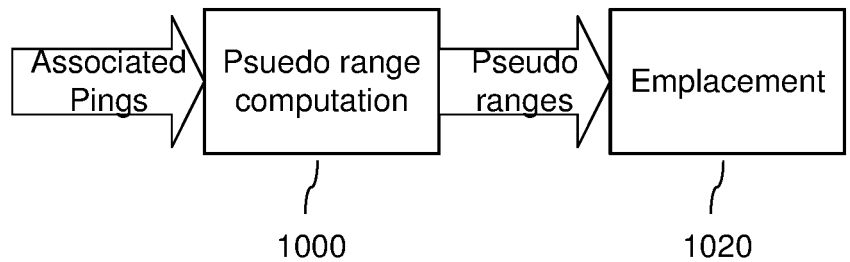
FIG. 26 is a general block diagram illustrating a positioning system that receives associated transmit/receive events (called pings) among nodes in a network and determines position of a mobile node.

FIG. 26 is a general block diagram illustrating a positioning system that receives associated transmit/receive events (called pings) among nodes in a network and determines position of a mobile node. A first software stage 1000 receives associated pings from a network of nodes, including at least one mobile device of unknown location, and provides pseudo ranges between the mobile device and each of a set of additional network nodes in wireless communication with the mobile device or each other. A second software stage 1020 takes the pseudo ranges and computes the location of the mobile device in a process called "emplacement." This software process can be executed in one or more computing devices, such as in a server or servers of a web service, within a router connected to the positioning network, a network node in the positioning network (such as a wireless access point device, fixed-location infrastructure node, or a mobile device in the network).

Figure 27:
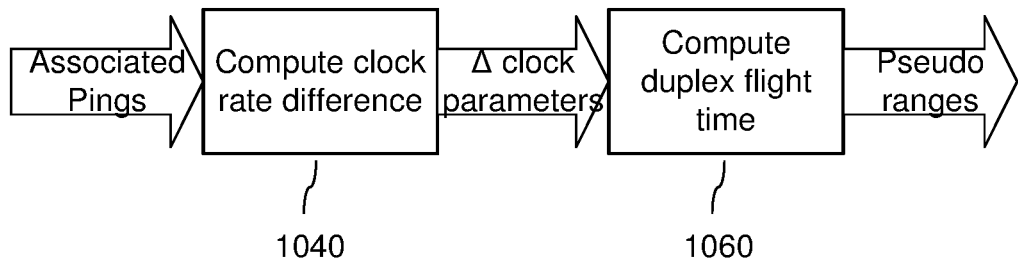
FIG. 27 is a block diagram illustrating a process for computing pseudo ranges between a mobile device and nodes in a positioning network.

In the following embodiment for a full duplex mode of nodes in a wi-fi network, clock parameters and range parameters are solved for in a two-step process as depicted in FIG. 26. FIG. 27 is a block diagram illustrating the first step. First, the clock rate difference between all pairs of nodes is computed (1040). Next, the duplex flight-time of pings between each pair of clocks is computed (1060). The already computed rate difference between the clocks is used to correct the duplex flight-time for clock drift. The outcome of this procedure is an estimate of the distance between each pair of nodes (called pseudo ranges). Finally, the position of each node is estimated in the process of emplacement. The following full duplex embodiment does not require an initial estimate of the clock positions. Full duplex refers to a case where the nodes transmit and receive pings and countstamp them. Later, we describe an embodiment that is not full duplex, in which the mobile device being located is less cooperative (e.g., transmit only and no countstamp on send).

Measuring Clock Rate Difference Between a Pair of Nodes

The first step in solving for the position of a mobile node involves measuring the clock rate difference between the mobile node's clock and that of another node that we wish to measure the mobile node's distance from. Once the rate differences are known, range measurements between nodes are estimated using a "pingloop" calculation.

The Clock Rate Relationship

The relationship between the countstamps of a pair of clocks is well-approximated by the linear relationship of equation (1), over a time window on the order of a second.

$$y - y_0 = (x - x_0) * (1 + \Delta_{1,2}) \tag{1}$$

The countstamps of clock 1 are given by x, where $x_0$ is the initial countstamp in the set of countstamps. The countstamps of clock 2 are given by y. Usually, the clocks run at approximately the same rate. The clock rate difference between the pair of clocks is expressed as the small number $\Delta_{1,2}$. We see that if $\Delta_{1,2}$ is a positive number, the countstamps of clock 2 grow relative to those of clock 1. The countstamp pairing here is not arbitrary. Rather, it is a consequence of the same ping. In practice, there are two ways in which this relationship exists:

1. The countstamps of clock1 are transmit countstamps and those of clock 2 are receive countstamps; i.e. clock 1 countstamps a ping at the time of transmission and clock 2 receives and countstamps the same ping.
2. Both the countstamps of clock 1 and clock 2 are receive countstamps. A transmitter multicasts a ping that is then received and countstamped by both clock 1 and clock 2.

In either case, a software routine finds and matches the countstamps between the pair of clocks. This process uses a ping identifier to match the transmit and receive countstamps. In particular, the transmitter includes a message number with the outgoing ping.

To see how clock rate difference is calculated between a pair of clocks, we re-write equation 1) in canonical slope-intercept form:

$$y - x = \Delta_{1,2} * (x - x_0) + b \tag{2}$$

The intercept, b, is the initial clock rate difference $y^* - x_0$. Note that $y^*$ is different from $y_0$. The former is the least squares fit of all measurements, while the latter is clock2's countstamp value when clock1's countstamp value is $x_0$. To solve for $\Delta_{1,2}$ in equation 2), we use linear regression. The intercept in the equation, b, is not of interest here.

$$\Delta_{1,2} = \frac{N \sum ((x - x0)(y - x)) - \mu_{x-x0} \mu_{y-x}}{N \sum (x - x_0)^2 - (\sum (x - x_0))^2} \tag{3}$$

In equation (3), $\mu_{x-x0}$ and $\mu_{y-x}$ are the means of each of N measurements of $(x_i - x_0)$ and $(y_i - x)$, respectively. Our approach is to generate one estimate of $\Delta_{1,2}$ per receiver pair, per transmitter. So, if a pair of receivers hears M different transmitters, we obtain M distinct estimates of $\Delta_{1,2}$. Glitches in the countstamping procedure can sometimes cause individual $\Delta_{1,2}$ estimates to be way off the mark. Therefore, we combine the M different estimates of $\Delta_{1,2}$ into a single estimate using a robust form of averaging. Specifically, if any of the $\Delta_{1,2}$ are outside of some consistency tolerance they are discarded and do not contribute to the final estimate.

Refining Clock Rate Difference Estimates

The result of the clock rate difference calculation is one clock rate difference estimate for every possible pair of nodes. If for example, there are ten nodes in the network, we can form 45 pairs by plugging 10 into equation (4).

$$\# \text{Node pairs} = (\text{num\_node}) * (\text{num\_nodes} - 1) / 2 \tag{4}$$

The set of clock rate difference estimates can be further refined by taking into account the relationship between the clock rate estimates. For example, knowing $\Delta_{1,2}$ and $\Delta_{1,3}$ tells us what $\Delta_{2,3}$ should be. The relationship is given by equation (5).

$$\Delta_{2,3} = \Delta_{1,3} - \Delta_{1,2} \tag{5}$$

Similar expressions involving all the clocks are rolled-up into a matrix, H, with (#Node pairs) rows and num_nodes columns. Under noiseless conditions, the multiplication of this matrix with the (num_nodes−1) clock rate differences between node1 and the remaining system nodes tells us what the clock rate differences of all other clock pairs should be. Under noisy conditions, we can turn this relationship on its head by solving the matrix equation of (6)

$$F = \text{pinv}(H) * deltaSet, \tag{6}$$

where deltaSet=[delta$_{1,2}$, . . . , $\Delta_{1,num\_nodes}$, $\Delta_{2,3}$, . . . , $\Delta_{num\_nodes-1,num\_nodes}$]

Then, if we multiply F by H, we get a refined estimate of deltaSet. It is often not necessary in practice to perform this refinement step because the improved clock difference resolution does not necessarily translate into improved range measurements. This is especially true in a multipath rich environment, where range errors due to multipath dominate other sources of error.

Determining Ranges: The Ping Loop Calculation

Once we have solved for clock rate differences between the nodes we are ready to compute the ranges between each possible node pair. In some cases, the range between nodes of known position is of little interest and can hence be skipped. Other times such calculations are required because they shed light on certain nuisance parameters that hamper the ultimate positioning of a mobile node.

The ping loop calculation begins with finding all instances of full-duplex communication between a chosen pair of nodes in a specified time interval. That is, we single out the pings between the pair of nodes. This operation results in something like the situation shown in Table 1. The next step is to sort the set of pings from earliest occurrence to latest. For the example given in Table 1, the sorting has already been performed.

TABLE 1

| Event # | Tx ID | Tx Countstamp | Rx ID | Rx Countstamp |
|---------|-------|---------------|-------|---------------|
| 1 | 1 | 10000 | 2 | 20001 |
| 2 | 2 | 20050 | 1 | 10050 |
| 3 | 1 | 10100 | 2 | 20102 |
| 4 | 2 | 20150 | 1 | 10149 |

Once we have the data in the format of Table 1, we find all instances where node1 transmits to node 2. For each transmission in this set of transmissions, we look for the earliest subsequent transmission of node2 back to node1. For the example given in Table 1, Events 1 and 3 are transmissions from node 1 to node 2. Event 2 is the earliest subsequent transmission to Event 1 of Node 2 back to Node 1. Likewise, Event 4 is the earliest subsequent transmission to Event 3 of Node 2 back to Node 1. Each of the pairings (Event1, Event2) and (Event 3, Event 4) constitutes a ping loop.

$$Rx_1 - Tx_1 = (Tx_2 - Rx_2)(1 + \text{delta}_{1,2}) + 2 \cdot d_{1,2} + \alpha_1 + \alpha_2 + p_{1,2} \quad (7)$$

Where $d_{1,2}$ is the distance between the nodes, $\alpha 1$ and $\alpha 2$, are the intrinsic device receiver delays, and $p_{1,2}$ is a multipath delay between the nodes. Equation (7) is expressed in a slope-intercept format in equation (8):

$$(Rx_1 - Tx_1) - (Tx_2 - Rx_2) = \Delta_{1,2} \cdot (Tx_2 - Rx_2) + 2d_{1,2} + \alpha_1 + \alpha_2 + 2p_{1,2} \quad (8a)$$

$$y = m \cdot x + b \quad (8b)$$

In equation 8, the ordinate, y, is a difference relation between countstamps. The slope, m, is the clock rate difference. The abscissa, x, is the difference in count units between the time clock2 receives a ping from node1 and the time it transmits back to node1. Finally, the intercept, b is the combination of flight time, receiver delays, and multipath delay. Given the four countstamp values and the estimated clock rate difference, equation (8) shows how to obtain the intercept, b.

Graphical Interpretation of a Pingloop

Figure 28:
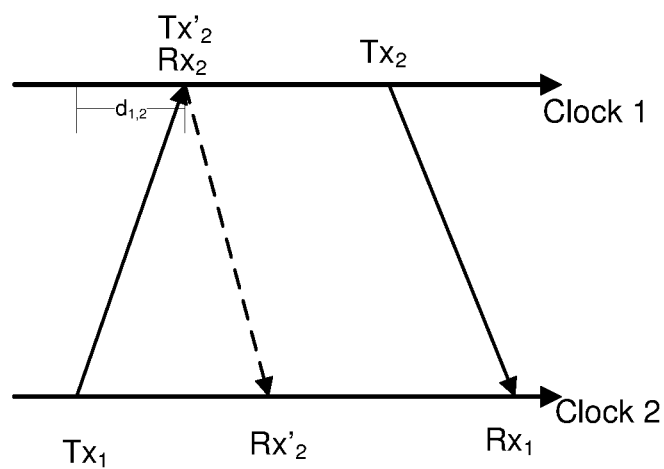
FIG. 28 shows clock axes of a pair of network nodes involved in duplex communications.

FIG. 28 shows the clock axes of a pair of nodes involved in duplex communications.

In FIG. 28, Clock 1 transmits to Clock2 at time $Tx_1$ according to its own clock. Clock 2 receives the transmission at time $Rx_2$ according to its clock. The flight time is designated as $d_{1,2}$. A straight vertical arrow would connect Clock1's axis at time $Tx_1$ to Clock2's axis if the flight time were 0. For simplicity, we have ignored other sources of delay, namely $\alpha_2$ and $p_{1,2}$. These could be incorporated into the figure by replacing $d_{1,2}$ with the sum $(d_{1,2} + \alpha_2 + p_{1,2})$. At a later point in time, $Tx_2$, Clock2 transmits a ping to Clock 1, which is received at time $Rx_1$. According to equation (8), directly measuring the intercept would require setting the abscissa, $Tx_2 - Rx_2$, to zero, which occurs when Clock2 simultaneously receives a ping from Clock1 and transmits to Clock1. This situation is illustrated with the countstamp values, $Tx'_2$ and $Rx'_1$, and the dashed line from Clock2 to Clock 1. The quantity $(Rx'_1 - Tx_1)$ is a direct measure of the total delay, $(2 d_{1,2} + \alpha_2 + 2 p_{1,2} + \alpha_1)$. By using equation (8), we have effectively achieved the condition illustrated by the loop involving the dashed line, and hence we are able to obtain an estimate of the total delay directly.

Special Cases

In practice, not all the quantities that comprise the total delay, $2 d_{1,2} + \alpha_2 + 2 p_{1,2} + \alpha_1$, are unknown. Before exploring these cases, we address the fact that that $p_{1,2}$ can be made more general by not restricting it to the same value for transmission from node 1 to node 2 as for the reverse case. Such an asymmetry in the path delay has not been observed to be of significant importance to model in practice.

In a system with N nodes, we obtain $N(N-1)/2$ total delay relations (set of equations) involving all possible node pairs. The completely general case in which all delay parameters are unknown is intractable. For example, if all $p_{n,m}$ are unknown and non-zero and all other quantities are known, the set of delay relationships is exactly determined. The set of equations becomes under-determined if we include the N receiver delays in the unknown category along with the path delays. The same is true of the $N(N-1)/2$ pairwise distance relationships, although in this case the number of unknowns is actually less than $N(N-1)/2$ via the geometrical relationship between node position and distance.

Known Receiver Delays

Transmission between node pairs often involves nodes that are part of the backbone of the network. These nodes have receiver delays that can easily be measured in a network calibration phase. Moreover, if these backbone nodes are all the same type of unit, the delays may sometimes be regarded as identical. At any rate, the known delays can be subtracted directly from the received countstamps to remove their effect. The delay can also be removed when the node pair involves one or more mobile nodes provided the delay characteristics of the device are known a priori.

Known Node Distances

A typical situation in which the distance between a pair of nodes is known is when the nodes are elements of the backbone of the network. In this case, the positions of the nodes are known and fixed. This allows the distance between the nodes to be calculated and subtracted from the received countstamps involving that pair. Alternatively, this subtraction may be delayed until the bias term is computed, equation (8).

Another situation involves the tracking problem in which one or more mobile nodes comprise the node pair and we have an initial position estimate of said node(s). The initial distance estimate is removed as per the method of the previous paragraph, leaving a residual error. An emplacement algorithm then operates on this residual value to update the node positions.

Mixed Cases Involving Path Delays

There are several interesting cases here. One involves receivers of unknown intrinsic delay and known position. Here, there are $N(N-1)/2$ equations and at least N unknowns. We can solve uniquely for the set of N intrinsic receiver delays provided at least $(N(N-1)/2-N)$ of the path delays are zero, or are at least of unappreciable size. Closely related to this is the tracking problem. In this case we have a previous estimate of the distance, and we know the intrinsic delays of all devices. The unknowns here include the path delay between the node pair and the change in distance between the nodes. We cannot generate a unique solution without using the relationships between the tracked mobile node and other network nodes. A third case, which is most relevant to commercial applications, involves the combination of unknown path delay and unknown mobile position. Receiver delays are presumed known. In this scenario all available total delay measurements involving the mobile node are used. Furthermore, some of the path delays must be small. These are the conditions under which we have implemented and operated multipath mitigation techniques with success. These techniques are described further below. Additional ways of compensating for multipath are described in Ser. No. 13/187,723 filed Jul. 21, 2011, entitled MULTI-PATH-COMPENSA- TION METHODS FOR LOCATION-DETERMINATION OF MOBILE DEVICES (Now published as US Patent Application Publication 2012-0309415), which is incorporated herein.

Emplacement

Emplacement refers to the procedure by which the position of a mobile node is estimated. The mobile node's position may have been known or estimated at a recent previous point in time (node tracking). Alternatively, the node's position may be more generally unknown (general emplacement). In this case the possible positions of the mobile node are bounded by an area that encompasses the range of the other nodes it communicates with.

Node Tracking

Our approach to node tracking begins with the relationship between two nodes in two dimensions, one fixed and the other moving. The distance relationship between the two nodes at some initial point, to, in time is given by equation (9)

$$d^2 = (x_f - x_0)^2 + (y_f - y_0)^2 \quad (9)$$

In equation (9), d is the distance between the nodes. The Cartesian pairs $(x_f, y_f)$ and $(x_0, y_0)$ are the coordinates of a fixed node and a mobile node, respectively. At a second point in time, $t_1$, the distance relationship is given by equation (10)

$$(d+\Delta)^2 = (x_f - (x_0 + dx))^2 + (y_f - (y_0 + dy))^2 \quad (10)$$

Here, dx and dy represent the change in respective x and y position of the mobile. Provided $\Delta$ is small, i.e. the mobile node has not moved very much during the time interval ($t_1 - t_0$), equation (9) is well-approximated by the linear relationship of equation (11).

$$2d\Delta + \Delta^2 \approx -2dx(x_0 - 1) - 2dy(y_0 - 1) \quad (11)$$

In equation 10, there are two unknowns, dx and dy. The quantity on the left-hand-side of the equation is derived from the new range estimate, $(d+\Delta)^2$, and d. Extending to N nodes and three dimensions, there are N–1 equations (number of range estimates) and three unknowns (dx, dy, and dz). This leads to an over-determined solution for the unknowns provided there are at least five nodes in the network.

One caveat to the foregoing is that the solutions (dx, dy, dz) do not necessarily lead to an improved position estimate relative to simply leaving the position unchanged. Therefore the solution is checked to see if there is a reduction in residual error, equation (12).

$$e_0 = \Sigma_{i=1}^{N-1}(r_i - d_i)^2 \quad (12a)$$

$$e_1 = \Sigma_{i=1}^{N-1}(r_i - d'_i)^2 \quad (12b)$$

In equation (12), the set $r_i$ comprise the range measurements from the mobile to each of the other N–1 nodes. The $d_i$ are the initial distances to each of the nodes and the $d'_i$ are the distances after incorporating the estimated change in mobile position, (dx,dy,dz). The quantities $e_0$ and $e_1$ are the residual errors. If $e_1$ is less than $e_0$, we update the mobile's position using the estimate (dx,dy,dz). Otherwise, we leave the position unchanged. In situations where there are multiple mobile nodes in full-duplex communication with each other, equation (11) does not fully apply when both of the nodes involved are in motion. Nevertheless, pretending that one of the nodes is fixed seems to work well enough when the change in position is small relative to the update interval. One could apply iterative methods in which the position of each mobile node is updated several times for a given set of range measurements. For example, the position of each mobile node is updated using the method described above. Then, the same process is applied using the newly updated positions for each mobile node to get an improved position estimate for each of the mobiles, etc. In many situations, however, such iteration is probably unnecessary.

General Emplacement

The strategy for general emplacement is to perform an exhaustive search for a position that provides a "best fit" to the data. "Data" in this case refers to any known node positions and the set of range measurements between the mobile node and the other N–1 nodes. Equation (9) describes the relationship between the mobile node's unknown position $(x_0, y_0)$, the position of the fixed node $(x_f, y_f)$ and the range between them, d. There are N–1 such relations involving the mobile and each of the fixed nodes. The emplacement relation is described by equation (13):

$$p^* = \operatorname{argmin}_j \Sigma_i^{N-1}(\|x_i - m_j\| - r_i)^2 \quad (13)$$

In equation 13, the vector $x_i$ is the position of the $i^{th}$ fixed node. Similarly, $m_j$ is the $j^{th}$ candidate position of the mobile. The range measurement between the $i^{th}$ fixed node and the mobile is given by $r_i$. The best mobile position estimate is obtained by choosing the position that minimizes (13). Implementation of equation (13) involves defining a grid of candidate mobile locations, pre-computing the distance between each candidate position and each fixed node ($\|x_i - m_j\|$), and putting the result in a look-up-table.

Complicating Factors

The purpose of this section is to provide and characterize a laundry list of issues that alter or hamper the procedure described above.

1. Countstamp inaccuracies: countstamping is not always reliable on both the receiving and transmitting ends for a variety of reasons. It is important that under such conditions the core positioning algorithms identify and remove bogus countstamps. Generally, this is done through consistency checking methods.
2. Clock resets: It is not uncommon for clocks to reset their counters. If left unchecked this causes problems during both the clock rate difference and pingloop calculations because the true relationships go from linear to piecewise linear.
3. Variable path delay: multipath is a highly variable phenomenon when one or more of the nodes involved in duplex communications is in motion. Moreover, even when a node pair is fixed the path delay can vary. In this situation, too, inaccuracies may occur in clock rate difference and pingloop calculations. Ideally, strategies should be deployed to detect and mitigate any corresponding problems.
4. Unknown mobile delay: When the intrinsic device delay of a mobile is unknown and this mobile has unknown initial position, equation (13) cannot be used because the range terms, $r_i$ all contain an offset that is equal to this unknown receiver delay. There are several ways to deal with this issue. Perhaps the most straightforward is to modify equation (13) to be invariant to a constant bias in the range measurements.
5. Non-full-duplex communications: In practice many devices are not equipped to both countstamp packets that they transmit and countstamp packets that they receive. A typical situation is that a network is comprised of a number of fixed position nodes that have full-duplex connectivity. Mobile nodes of unknown position send pings to the fixed nodes in order to obtain position estimates. The mobile nodes are incapable of countstamping packets that they transmit and they are also incapable of receiving pings from any other node. Position estimates are obtained using most of the same procedures described herein as well as a few additional procedures that are detailed further below.

6. Unknown residual path delays (aka multipath): One of the more vexing problems is general emplacement when the ranges in equation (13) are corrupted by unknown quantities of multipath. If left unmitigated, applying equation (13) in such cases leads to large positioning errors. One procedure for handling this situation is to apply a multipath compensation technique to the ranges, which estimates and removes some of the path delay using node geometry. After multipath compensation is applied, general emplacement is applied to position the mobile node(s).

Transmit Only Mobile Devices

Building upon the description above, this section describes an example of an implementation where full-duplex communication is not available for the mobile node being located. This implementation determines the location of a mobile node (e.g., smartphone or other mobile wi-fi enabled device) that transmits pings, but is incapable of countstamping packets that it transmits and is incapable of receiving pings. This is particularly useful for providing location to a consumer's personal mobile device, such as a cell phone, with minimal cooperation of that device (e.g., it only needs to transmit packets that multiple nodes in the network receive and countstamp).

Table 2 below provides an example of associated pings for this configuration.

TABLE 2

| Tx ID | Tx Countstamp | Rx ID | Rx Countstamp |
|---|---|---|---|
| 2 | 5000 | 1 | 8000 |
| 2 | 5200 | 1 | 8100 |
| 1 | 8050 | 2 | 5100 |
| −3 | M2 | 2 | 8200 |
| 3 | 5000 | 3 | 10000 |

There are two types of devices in the network for generating pings, infrastructure nodes that transmit and receive pings, and mobile nodes that only transmit messages, without countstamping them. The message transmission depicted in the third row of Table 2 has a negative transmit ID, simply to reflect that it is a mobile device. It does not have a transmit countstamp, as this mobile device does not provide one. Rather, the packets transmitted by the mobile device are simply identified by a message identifier, e.g., M2 of mobile device (−3) (to reflect the second message sent from device, −3). Infrastructure nodes receive this message and countstamp it. They also operate in full duplex mode relative to each other, transmitting and receiving pings and countstamping on transmit and receipt of pings. Ping events collected for pings exchanged among the infrastructure nodes are used to estimate a baseline clock difference. Path delays between infrastructure nodes are estimated with pingloop calculations, similar to the method described above for full duplex mode. The baseline clock difference and path delays are then used to compute pseudoranges between the mobile device and infrastructure nodes. These pseudoranges, in turn, are provided to the emplacement process to compute location of the mobile device.

Figure 29:
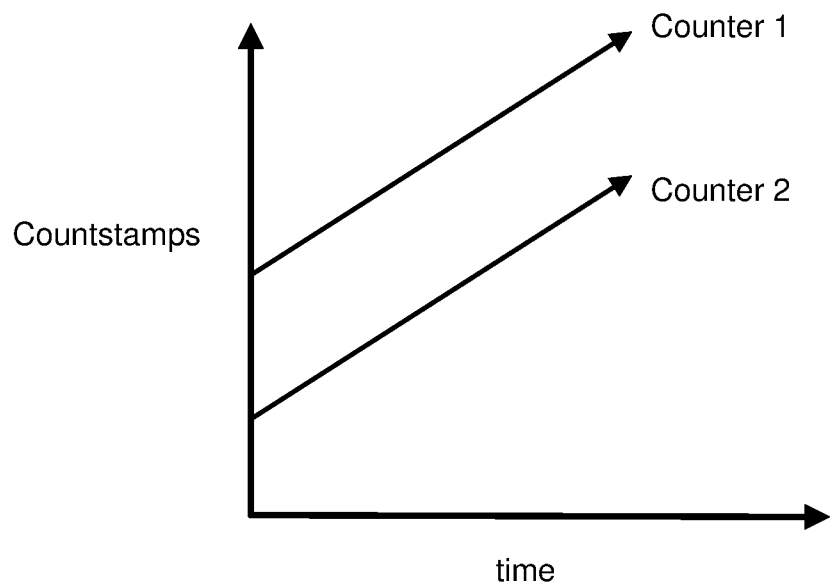
FIG. 29 is a plot of the count stamps output from counters 1 and 2 for respective network devices over time.
Figure 30:
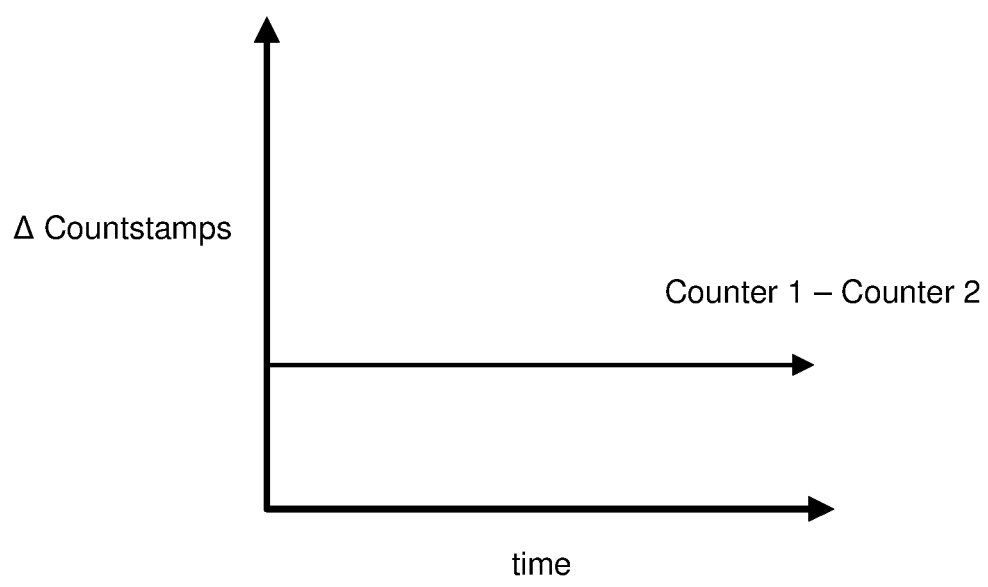
FIG. 30 is a plot of the count stamp differences (Δ count stamps) for counters 1 and 2 depicted in FIG. 29.

To illustrate this mode of operation, we begin with simplified example of clocks of network devices operating at the same rate. FIG. 29 is a plot of the countstamps output from counters 1 and 2 for respective network devices over time. When these clocks count at the same rate, the lines representing the counter outputs of each clock are parallel. The corresponding plot of the delta countstamps between the two clocks is a horizontal line, as shown in FIG. 30. The difference in countstamps between the two clocks is comprised of a baseline clock difference, $D_B$, the flight time between devices, $d_{n,m}$, and the path delay, $p_{n,m}$ between the devices. Equation (14) expresses this countstamp difference for infrastructure nodes 1 and 2 receiving a ping transmitted by infrastructure node 3:

$$\text{Countstamp difference} = D_B + d_{1,3} + p_{1,3} - d_{2,3} - p_{2,3} \quad (14)$$

Equation (15) expresses counstamp difference for infrastructure nodes 1 and 2 receiving a ping transmitted by mobile device (m):

$$\text{Countstamp difference} = D_B + d_{1,m} + p_{1,m} - d_{2,m} - p_{2,m} \quad (15)$$

Figure 31:
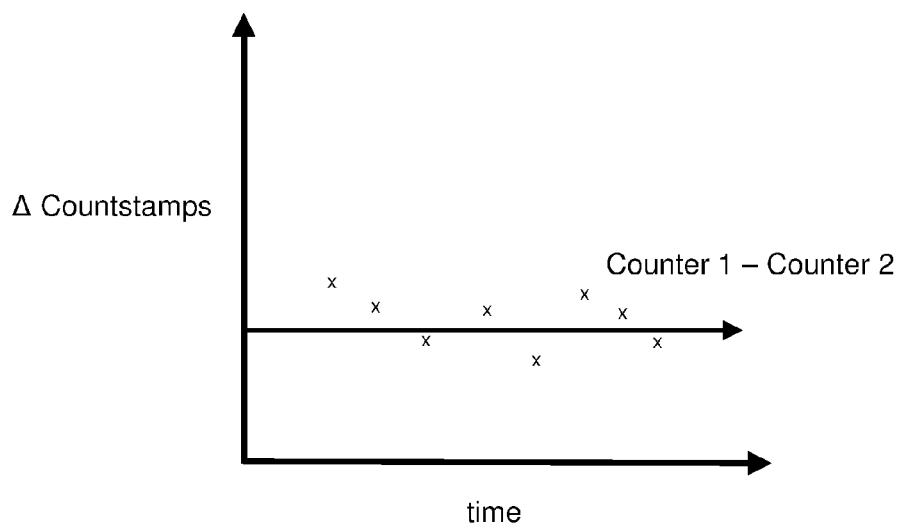
FIG. 31 illustrates a sampling of measured count stamp differences between devices, as an example leading to derivation of clock rate differences among devices in a wireless network.

First, the baseline clock difference is estimated from data collected for infrastructure nodes, according to the expression of equation (14). Referring to the case of no clock drift in FIG. 30, the countstamp difference data corresponds to data points sampled around the horizontal line, which is the best fit to the data points. FIG. 31 shows an example of this data sampling around a plot of the countstamp difference between two nodes. DB is derived by averaging the data points. This baseline clock difference determination may follow a median approach, in which outlier data points are removed and DB estimated from the remaining data set.

After determining the baseline clock drift from infrastructure nodes, this baseline clock difference is applied to the equation for the mobile device as explained further here.

The location of the infrastructure nodes is determined at system installation and verified periodically through system monitoring. This location information provides range (and associated time of flight) between infrastructure nodes. With these known ranges/flight times, both the baseline clock difference and the path delays between infrastructure nodes are calculated. To explain this process, we begin with the process of determining the baseline clock difference. Then, we review briefly how to use pingloops to get estimates of the path delays between nodes (the known ones).

Figure 32:
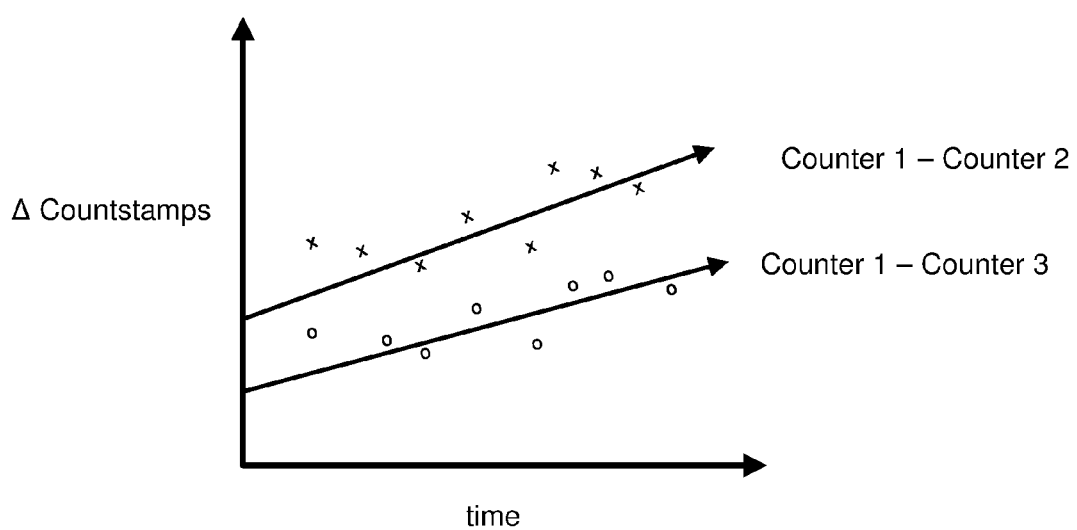
FIG. 32 illustrates a plot of count stamp differences of two pair of devices in a wireless network, showing how clock differences are measured among devices in the wireless network.

Knowing the ranges between known nodes, the baseline clock difference for the case of no clock drift is measured directly, following equation (14). However, the presence of clock drift complicates the calculation. To illustrate, we turn to FIG. 32, which depicts the case where there is a difference in clock rates among the devices in the network. In contrast to FIG. 30, the plots of countstamp differences for two pairs of clocks in FIG. 32 do not have slope of zero. To get a baseline clock difference, the sampled clock difference data is fit to a line using a least squares approach. This process can be further modified to use consistency checking to get a more accurate approximation of the clock rate difference. The clock rate difference should vary slowly, and based on tracking a history of the clock rate, values outside the norm are removed from the data set used to perform the least squares fit. The removal of outliers is a form of consistency checking, and other approaches to checking for consistency may also be used.

Next, a baseline clock difference is determined from the linear approximation of the clock difference data. A reference point is selected for the data set, and this serves as a reference point from which the baseline clock difference is taken for each of the clock difference data sets, each corresponding to pairs of clocks. This reference point is akin to the y-intercept in the depicted plots of count differences. Yet in practice, there is no concept of t=0. Instead, the method selects a reference point and this is used to set the point at which the baseline clock difference is computed for each data set of clock differences between pairs of nodes.

Pingloops calculations for infrastructure nodes provide an estimate of the path delay between nodes. Specifically, the round trip time for a ping loop, can be expressed as $2\,d_{1,3} + p_{1,3} + p_{3,1}$+internal device receiver delays. Simplifying this expression by assuming that the same infrastructure device types have the same internal receiver delays, and the path delay on each leg of the trip is the same, the expression becomes $2\,d1,3 + 2\,p_{1,3}$. Knowing the range between nodes, then the path delay is computed by subtracting the flight time and dividing the resulting total path delay for the round trip by 2.

The baseline clock difference derived from infrastructure node calculations is substituted into equation (15). Likewise the path delays are also substituted into the equation (15). The results of these substitutions are differential ranges of the infrastructure nodes relative to the mobile device.

Next, the pseudo ranges between the mobile device and the infrastructure nodes are calculated.

The range difference of the mobile device relative to nodes, 1 and 2, is approximated as:

$$d_{1,m} - d_{2,m} + D_B - D_B. \quad (16)$$

Where $D_B\hat{}$, is the estimated baseline clock difference, and the path delay is removed using the estimate of path delay from the ping loop calculation.

This leaves a set of range difference estimates that together can be put into a matrix equation in terms of the pseudo ranges that we seek to derive:

$$\begin{bmatrix} 1 & -1 & 0 \\ 1 & 0 & -1 \\ 0 & 1 & -1 \\ 1 & 1 & 1 \end{bmatrix} \begin{bmatrix} d_{1,m} \\ d_{2,m} \\ d_{3,m} \\ 0 \end{bmatrix} = \begin{bmatrix} d_{1,m} - d_{2,m} \\ d_{1,m} - d_{3,m} \\ d_{2,m} - d_{3,m} \\ 0 \end{bmatrix} \quad (17)$$

The pseudo ranges, represented as $d_{n,m}$, where n is the infrastructure node and m is the message received by that node from the mobile device, are computed by solving for them in equation (17). One implementation solves for the pseudo ranges in the rank deficient matrix of equation (17) assuming that they have zero mean. The error bias that this assumption introduces is addressed in the emplacement process. The output of this procedure is a set of pseudo ranges that is supplied to the emplacement process (1020, FIG. 26) to locate the position of the mobile device.

Figure 33:
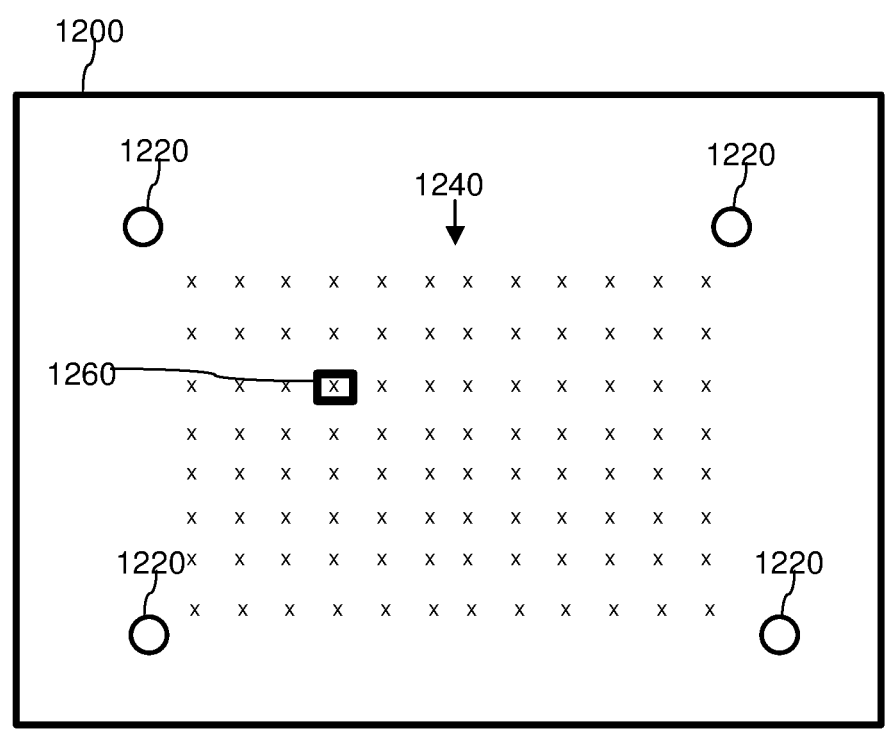
FIG. 33 is a diagram illustrating an example of a configuration of nodes in a positioning network for a venue.

As background from emplacement, we start with a diagram illustrating nodes and a mobile device. FIG. 33 is a diagram illustrating an example of a configuration of nodes in a positioning network for a venue 1200. This is a simple example to help illustrate the system, and many other configurations are possible. The venue may be an indoor shopping venue, and office building, an area within a city block, etc. The circles, such as item labeled 1220, represent infrastructure nodes. These nodes, as explained previously receive messages from a mobile device within the venue. The "x" marks represent locations where a mobile device 1260 (such as a user's smart phone, tablet PC or other wireless network appliance) may be located. In practice, the infrastructure nodes need not be arranged in uniform pattern. Preferably, they are positioned to have relatively clear line of sight to nearby locations within the venue where a mobile device may be located.

When the system is set up for a venue, possible locations for mobile devices within a reasonable precision tolerance (shown with x marks) are recorded in system memory. These locations are converted into ranges to each of the neighboring nodes and stored in a look up table to facilitate fast computation. For each location, the system is checked to ensure that the strength of signal received at the nodes from a mobile device at each of the locations is sufficiently strong. The node wi fi radios and countstamping mechanisms are also calibrated to measure and set internal receiver delays in the system.

In a first stage of emplacement, the process calculates residuals for each candidate location in the venue. The residual is the difference between the range from the candidate location and a node and the pseudo range for that node. This residual can be expressed by the following equation:

$$\begin{bmatrix} d_{1,m} + B + N_1 \\ d_{2,m} + B + N_2 \\ d_{3,m} + B + N_3 \end{bmatrix} - \begin{bmatrix} d_{1x} \\ d_{2x} \\ d_{3x} \end{bmatrix} = R \quad (18)$$

The $d_{nx}$ term of this equation is the range between the node, n, and the candidate position, x. As noted, this can be pre-calculated and stored in a look up table to make computation of the residual, R, efficient. The B term is the bias in the pseudo range values. N represents the noise associated with the particular node.

The possible solution for the position of the mobile device may be the candidate position with the least variation in the residual across all participating nodes. However, when there is significant multipath error, it is better to use multipath mitigation techniques. Next we will describe various mitigation techniques.

First, as noted above, multipath compensation is described in unpublished U.S. patent application Ser. No. 13/187,723 filed Jul. 21, 2011, entitled MULTI-PATH-COMPENSATION METHODS FOR LOCATION-DETERMINATION OF MOBILE DEVICES (Now published as US Patent Application Publication 2012-0309415), which is incorporated above. That document provides additional information on this topic that may be applied here.

In our implementations, we use a combination of multipath estimation and compensation techniques. There are a variety of strategies. The combination of strategies that will perform the best will vary depending on the circumstances of a particular installation. A flexible approach that can leverage multiple different techniques is preferred.

One strategy is to estimate multipath across the network configuration, identify areas in the network where the estimated multipath appears to be clustered around relatively consistent estimates, and assign that multipath estimate to those areas. For example, in one implementation, multipath mitigation is performed first by checking the differential range estimates for a mobile device, e.g., $d_{m,1} - d_{m,2}$, and clipping the estimate to the distance between the nodes, if the differential range is larger than that known distance. For that pair of nodes, a minimum multipath error is estimated, e.g., using techniques in U.S. patent application Ser. No. 13/187,723 (Now published as US Patent Application Publication 2012-0309415). The result is then set as the multipath estimate for that pair. Then for each infrastructure node, the multipath estimate for that node is computed by selecting the largest estimate from the set of minimum estimates per pair of nodes that the node is a member of.

Another strategy is to estimate the multipath error from the residual calculation (the differences between the range of the candidate position to a node and the pseudo range from the node to the mobile device). One such approach is to calculate the residuals for each candidate position, keeping track of the difference between the largest and the smallest residual for each candidate position. The multipath estimate assigned to the node is the minimum differential between the largest and smallest residual. This may be performed for the entire venue or for particular regions defined by bounding areas around nodes.

A variation of the second strategy is to keep track of the sum of residuals for each candidate position and then select the candidate position with the smallest sum of residuals to be the candidate position of the mobile device.

A hybrid strategy combines these strategies to get a better estimate of multipath. Estimates of the multipath for each node are estimated according to each strategy, and then the multipath estimate assigned to the node is the larger of the two estimates from prior multipath estimation stages.

Yet another category of multipath mitigation strategy is to leverage the observation that multipath errors are uncorrelated. Estimates of multipath that are taken under conditions that are uncorrelated are refined by averaging the estimates taken from two or more uncorrelated (independent) conditions. These conditions may simply be measurements made at different points in time, where the multipath error is known or predicted to be un-correlated. Conditions leading to independence of the estimates may be a change in the antennae position of the mobile device. This can be approximated by using estimates from different points in time, or initiated when the mobile device communicates a change in state, such as a change in orientation based on its internal sensors (inertial or accelerometers, for example). If the mobile device is completely stationary, multipath estimates are highly correlated over time. In other words, the multipath estimate for each pair of nodes changes very little under this scenario. However, a very slight change in the mobile devices position, relative to the resolution of positioning, does introduce approximately independent multipath estimates.

There are alternative schemes for implementing multipath mitigation either as a preliminary stage to emplacement or combined with it. One scheme is to estimate the multipath on nodes and subtract the multipath error from the pseudo ranges prior to emplacement. Emplacement then repeats a similar analysis of subtracting the ranges for the candidate positions from the corrected pseudo ranges. The candidate position with lowest variation in residual is determined to be the location of the mobile device.

Another approach is to estimate and remove multipath error during the emplacement process. This effectively combines multipath estimation and compensation into the emplacement process. Again, the location of the mobile device is determined as the location with the lowest variation in residual.

Compression of Shared Pings

The above methods share ping data among devices in packets. This shared ping data is referred to as pungs or pung data. For background information about pungs, please see the space time calibration patent documents incorporated above. The sharing of pung data can increase network traffic. To reduce this network traffic, more computation can be performed on nodes and only the results shared. We have developed a variety of methods to minimize pung traffic, which we refer to as pung compression. These methods are described in further detail below.

By reformulating our methods for sending pung data, it is possible to simultaneously drastically reduce the bandwidth consumed in punging (~an order of magnitude) and decrease the amount of packets dropped by the positioning router (PR). The PR is a programmed network device that receives pungs and routes it to a service for computing position and timing as described above. This service is implemented as web service, running on one or more servers, that receives associated pings and computes position and timing information. The servers of the web service connect to the positioning network through a wireless network access point node that forms a wireless network with the infrastructure nodes and mobile devices at a particular venue.

To reduce pung traffic and dropping of packets, here are some system configurations:

1. Previous fixed node transmit countstamps (CS) are transmitted as payloads of subsequent pings broadcast among fixed nodes.
   a. The compression scheme involves computing and punging model parameters, as opposed to raw countstamp (CS) values.
   b. The PR also needs these tx CS values. Options here are either to have each fixed node separately unicast this data to the PR, or to require the PR to "listen to" the broadcast pings from the fixed nodes to obtain these values via payload recovery.
   c. It is important that the tx CS values are received at each of the intended fixed nodes (as well as the PR). Therefore, it is advisable to transmit this information multiple times.
2. Each fixed node broadcasts to the other nodes according to a predictable schedule. Periodically a raw Tx countstamp is sent to the other nodes followed by a series of coded prediction errors.
   a. Initial prediction errors are computed based upon the known transmission schedule and the most recent raw Tx countstamp
   b. The prediction errors may be entropy encoded to further reduce bandwidth.
3. Pung data comprised of received pings from other fixed nodes is compressed via a linear model involving the transmitting nodes tx-CS and the receiving nodes rx-CS
   a. To achieve lossless compression the model parameters and prediction error are transmitted to the PR.
4. To minimize the possibility of data outage, it may be advisable to either send pung data comprised of received pings from other fixed nodes multiple times to the PR, or to use a back-channel from PR to fixed node, over which the PR can whine about not receiving expected pungs.
5. Received pings from mobile nodes may also be compressed when punging to the PR. Decent compression can best be achieved by configuring the mobile nodes to transmit according to a (known by everybody) uniform schedule. As in the case with fixed nodes, closer adherence to the schedule leads to better compression.

The following sections provide on the above and further schema for how to bundle the pung data.

Rx Pungs from Fixed Nodes

This type of data is required by a core positioning system (referred to as the core position engine, CPE, which implements the method of FIG. 26) but not any of the other fixed nodes in a local network. The CPE may be implemented within the web service servers, or elsewhere in the network as noted. It makes sense to transmit it via unicast from each fixed node to the router, which in turn communicates it to the CPE. Given a series of received pings from a specific transmitting fixed node in the local network, compression is accomplished using a linear regression model between the tx countstamps of the transmitting node and the rx countstamps of the receiving node. [The next section deals with how fixed nodes get access to one another's tx-countstamps]. The canonical model parameters are dzt and ZT, which are the difference in clock rate and the absolute clock countstamp difference, respectively. ZT varies with time as a function of dzt; so ZT is associated with a specific reference time. To achieve lossless compression we transmit an error vector that is the difference between actual rx countstamps and the rx model predictions.
Complicating factors Compressing fixed node pung data would be a rather straightforward matter if it was not for a few problems that arise in practice. A partial list of such problems is given here. The following refers to a "harmonic block." As described in related US Patent Application Publication 20090213828, ping data is collected, sorted and organized into blocks of data for a time interval referred to as a harmonic block (HB). This is defined in terms of ping events, e.g., 10 sets of ping data per node, which depending on the ping frequency, varies in length (e.g., around 10 milliseconds in the approach of 20090213828). Some of the challenges for processing pings are:

1. Not all pings that are transmitted in a harmonic block by one fixed node in a network are received by the other fixed nodes in the network.
    a. This problem can be overcome by transmitting a binary string that indicates which expected pings were received and which pings are missing.
2. Sometimes the received countstamps take on outlier values, resulting in enormous deviations from the model.
    a. This situation can be dealt with by correctly recognizing such countstamps as outliers and then treating them as missed pings.
3. In the presence of multipath, the received pings can sometimes take on a multi-modal distribution, in which there will be effectively be a single dzt and multiple ZTs. There are several ways to deal with this problem:
    a. Do not do anything different. Simply accept the fact that it will take more bits to compress the error vector.
    b. Eliminate all pings from the mode with larger multipath before computing the model parameters.
    c. Allow for this case during encoding. In addition to encoding multiple ZTs, we would need to tell the router which pings belong to which ZT.

Preferred Schema for Fixed Node Rx-Pungs

In this schema a "key" pung packet (KPP) is sent followed by a chain of predicted pung packets (PPPs). The point of this approach is that each pung packet is received by the PR. Otherwise, PPPs cannot be decoded. For normal ranges of HB pung size in terms of the number of transmitted pings, KPPs require twice the bandwidth of PPPs. If it is found in a particular installation that pung drop-outs are frequent, this schema should not be used. Here are a few ways to mitigate problems of unreliable pung reception:

A KPP would be sent every so often.
A back-channel from the PR to the receiving node would be used to alert the node that expected pung data was not received.
    Should not be used when pung dropouts are frequent due to increased latency
Pung packets are transmitted more than once by default when pung dropouts are frequent.

KPP Schema (~150 bits when 8 pings are involved)
1. Header information
    a. KPP indicator (1 bit, is this a KPP or not?)
    b. Transmitting Node ID (8 bits)
    c. Serial Number of first transmit CS in HB (16 bits)
        i. Used to match pung data to appropriate set of transmit countstamps at the positioning router
    d. Optional: Expected number of received pings in the KPP (8 bits)
        i. It is recommended that this is a global parameter that everybody knows and abides by. There is no reason to send it.
2. Model parameters
    a. dzt—slope value; the measured rate difference between the transmitting and receiving clocks (~10 bits)
    b. ZT—intercept value; effectively the model difference between the transmitting clock and the receiving clock at a specific reference tx-countstamp value. (64 bits)
3. A string of bits that indicates which of the transmitted pings from the tx node in question were actually received out of a maximum number $N_{fXHB}$
    a. Actual size should be less than $N_{fXHB}$ because the probability of any given ping being received is not equal to 50%. Usually it is much higher. Classic compression principles should reduce the average size.
4. Deviation from model for each of the received pings. The deviation is typically within a count value or two. Shouldn't require more than an average of 3 bits per ping to cover it
5. RSSI values of the received pings
    a. 8 bits for first RSSI value
    b. The remaining RSSI values are differentially encoded (~2 bits each)

PPP schema (~65 bits when 8 pings are involved)
1. Header information
    a. KPP indicator (1 bit, is this a KPP or not?)
        i. This bit is '0' in this case
    b. Transmitting Node ID (8 bits)
    c. Bit indicating whether the serial number of the first transmit countstamp is as expected.
        i. Normally, the serial number would be as expected. The exception would be when the receiving node "decides" not to pung due to a dearth of received pings.
    d. If serial number is not as expected, serial Number of first transmit countstamp in PPP (16 bits)
        i. Alternatively, might consider sending the number of periods that have elapsed since the last pung packet. The serial number can be derived from this number. Should be ~4 bits
2. Model parameters: Offset and rate model parameters are predicted from stored previous block's values. Any swing in predicted offset error over magnitude 1 is typically due to a dual-state situation
    a. dzt—slope value; the measured rate difference between the transmitting and receiving clocks (~3 bits)
    b. ZT—intercept value; effectively the model difference between the transmitting clock and the receiving clock at a specific reference tx-countstamp value. (~4 bits)
3. A string of bits that indicates which of the transmitted pings from the tx node in question were actually received out of a maximum number $N_{fXHB}$
4. Deviation from model for each of the received pings. The deviation is typically within a count value or two. Shouldn't require more than an average of 3 bits per ping to cover it
5. RSSI values of the received pings: all RSSI values are differentially encoded (~2 bits each)

Alternative Schema for Fixed Node Rx-Pungs

In this schema solely KPPs are sent (please see previous subsection for schema layout). This schema is appropriate when dropped rx-pungs are frequent and perhaps when no back-channel is available or desirable.

Lossy Compression

A lossy compression scheme might entail punging the model parameters but not the vector of individual errors relative to the model parms. In this case, only the origin tx-counstamp would need to be communicated to the CPU. Some potential problems with this approach include inaccuracy of clock rate differences, and failure to establish a common origin for all pings receiving from a given transmitter, which occurs when there are missing pings. This second problem may perhaps be overcome by estimating what the origin would be if the ping corresponding to the origin is missing.

Tx Countstamp Transmission

Tx counstamps from each fixed node in the local network are required at both the PR and each of the other fixed network nodes. In order to calculate model parameters for all pings received from a given fixed-node transmitter, each receiver that receives said pings must know the transmitter's tx countstamps. Hence these should be broadcast to the other fixed nodes in the network as payloads of normal pings. The PR also must know the tx-counstamps used to compute model parameters for every receiver. One way to handle this is to have the PR selectively listen for payload-carrying pings from the transmitters when broadcasting to other nodes in the network. The term "selectively" is used to connote the fact that not necessarily all pings are payload-carrying. Moreover, the PR knows the transmission schedule of the transmitting nodes in the network. So it knows when and to whom it needs to listen. Another way to handle this issue is to retransmit the tx-countstamps to the PR in a unicast mode, along with other pung data.

The following is a description of what exactly need to be transmitted. Given this schema, the tx data may be sent one counstamp at a time, or in bundles like a pung.

TX Countstamp Transmission Payload
1. Is the countstamp a raw countstamp or predicted version? (1 bit)
2. If, the countstamp is raw
   a. CS Serial number (16 bits)
   b. Raw CS value (64 bits)
3. If the countstamp is predicted
   a. Indicator bit that if set says the next tx countstamp is different than expected
   b. If indicator bit is set either
      i. Send full 16 bit serial number or
      ii. Encode the difference with expected serial number (much less than 16 bits)
   c. Prediction error of the current CS value from last raw CS and the number of pings that have elapsed since it was transmitted
      i. Prediction is based upon the assumption of a regular transmission schedule of outgoing pings. The precision of the prediction in practice controls the number of bits needed to encode the prediction error.
      ii. Based on analysis of collected data, range of prediction error can be encoded with ~20 bits.
      iii. Prediction error is not uniformly distributed; so fewer bits may be needed if entropy coding is used.
4. ping serial number of I ping, Raw 64-bit countstamp of I ping, delta$_2$, delta$_3$, . . . delta$_N$
   a. delta$_m$ is defined as the difference between the actual ping countstamp of ping$_m$ and its predicted value. Prediction is based upon the assumption of a regular transmission schedule of outgoing pings. The precision of the prediction in practice controls the number of bits needed to encode each delta.

It is important that the PR and all fixed nodes receive the raw countstamp transmissions. Otherwise, all predicted versions will not have a basis on which to operate, rendering them useless. It is somewhat less problematic when predicted tx countstamps are not received. In this case, the fixed node rx pung schema requires a slight modification to compensate for missing tx data. At any rate, it is desirable to transmit the tx CS data more than once. Rough calculations from data recorded at initial implementations within a building similar to a large retail store (sometimes referred to as a big box or warehouse store) show that the successful ping reception rate is usually >90%. It is higher in the lab testing environment. The number of times the TX CS data should be sent depends upon our willingness to accept loss of ability to do the modeling calculations for rx pungs involving the transmitter. For example, in the case of a large retailer building, choose N such that p(Lost pung)>=(1−0.9)^N. Note: this model presumes that the probability of a dropped ping is independent of whether neighboring pings are received (it probably is not).

Note: robustness of the system may be increased by using the back channel from the PR to send tx CS data when it is communicating to a given fixed node that it is missing expected pung data.

Pungs Involving Mobile Data

The received pings from one or more mobile transmitters (that do not have tx countstamps) can also be compressed. The first ping from a mobile device is assigned a differential rx-countstamp value that is relative to the receiving node's transmitted pings. More specifically, the differential value is the number of clock ticks after the most recent transmitted ping. Assuming that the transmitter is on a regular ping schedule of N (equally-spaced) pings per second, we need log 2(clockRate/N) bits to encode the differential value and several additional bits to specify which ping in the harmonic block the received ping is after. For infrastructure nodes, we have used GS-1010 TLS, and GS-1011, "system-on-a-chip" wireless devices available from GainSpan Corporation of Los Gatos, Calif. For a Gainspan node running at 33 Mhz and transmitting 3 pings per second, approximately 24 bits are needed to encode the differential value. If the fixed-node transmission schedule of pings is not uniform in time, the number of bits necessary to encode the rx-countstamp depends upon the distance in time between ping$_k$ and ping$_{k+1}$, when the receive countstamp lies between these values.

Another way to accomplish differential encoding of the first ping received from a mobile device is to use the fixed node rx countstamps as a reference. Although this approach slices the time-interval finer, it may not prove any more useful because it would require encoding which fixed node transmitted the ping of interest.

To encode pings after the first received ping from a mobile device, we can use the same schedule differencing trick we discussed for encoding tx-countstamps. More precisely, it is assumed that each mobile device will ping at a constant rate that is known to the network nodes. The greater the precision of this transmission rate relative to the network node clock resolution, the fewer bits that are needed to encode actual deviations from the predicted schedule. One minor complicating factor is that it may be possible for the application on the mobile device to be configured for more than one possible discrete ping rate. This matters little as long as the network nodes are aware of each possible configuration. Specifically, a few additional bits would be required to encode the active configuration. When discussing the schema for encoding mobile node pings we will leave out this possibility. In practice it may be reasonable to globally establish one ping rate that all mobile devices use.

Perhaps a more vexing problem is the potential variability in scheduling precision the set of possible participating mobile devices may have. For example, a device that has a faster clock may be more precise than a device with a slower clock. A simple solution would be to allocate a number of bits that encodes for the lowest common denominator case. A better solution would be to make sure the type of device is identified in its ping payload and to use a number of bits appropriate for that particular device. An inconvenience here is that if entropy coding is used to encode schedule deviations, a different model to do the encoding for every potential device must be stored on the fixed nodes.

Preferred Schema for Mobile Pings in a Harmonic Block

The presumption is that the PR received the previous pung data from the receiver Note: may need confirmation that the PR received pung data via a back channel. Otherwise, one cannot assume the PR knows about previous pungs when dealing with the current one. The back-channel is probably best construed as a safety feature. A good practice would be to transmit the pung data 2 or more times to ensure it gets through. Transmission on the back-channel would then only be employed in the unlikely event that both pungs were not received.

Case A: No Received Pings from any Mobile Devices in Previous Pung Packet
1. Pings from a new mobile (0 or 1)?
    a. If 0, end of pung
    b. If 1, continue to 2
2. Serial number of mobile 1 (? Bits)
    a. Although there is a good chance that we will be able to reliably associate mobile pings received at one receiver with those from another receiver, the serial number of the mobile must be communicated to the CPU so that the mobile ultimately receives a position estimate.
    b. Also need type of mobile device is that is not readily identifiable from the serial number
3. Which tx ping first mobile ping is after (3-4) bits, depending upon harmonic block size
4. Differential value of first mobile ping relative to previous tx ping ~24 bits
    a. Distribution of this value is presumed uniform; so it is not entropy encoded.
5. Binary string that is the length of the additional number of pings from the mobile that the receiver expects to receive in this harmonic block; e.g. (1,0,1) would indicate that of the 3 additional pings the receiver expects to hear, it only hears the first and third. The binary string will typically contain more ones than zeros; so it can be encoded.
6. Set of differences relative to presumed mobile transmission schedule that the network node receives, if applicable (<24 bits each)
    a. Depending upon the frequency of transmission and when the first mobile ping is received, there may be no expected transmissions
    b. It is expected that the distribution of these differences is non-uniform and we will therefore benefit from entropy encoding them, provided we use the appropriate model for the distribution.
7. Continue steps 1 through 6 as long as there are additional new mobile devices heard during this harmonic block Case B: Received Pings from One or More Mobile Devices in Previous Pung Packet
1. Are there new (expected) pings from the mobile device in this slot the last tx pung (0 or 1)?
    a. If '1' continue to step 2
    b. If 0, repeat 1 while there are slots for remaining previously transmitting mobile devices. Otherwise, go to step 5.
    c. If we believe that the mobile device has stopped transmitting by virtue of some critical number of non-received pings reached, the slot for this mobile is deleted and the remaining mobile slots move up the list to occupy its place next pung
2. Binary string that is the length of the additional number of pings from the mobile that the receiver expects to receive in this harmonic block
3. Set of differences relative to presumed mobile transmission schedule that the network node receives, if applicable (<24 bits each)
4. Continue steps 2-4 while there are remaining expected previous mobile slots. Then go to step 5.
5. Pings from a new mobile (0 or 1)?
    a. If 0, end of pung
    b. If 1, continue to 6
6. Serial number of mobile 1 (? Bits)
7. Which tx ping first mobile ping is after (3-4) bits, depending upon harmonic block size
8. Differential value of first mobile ping relative to previous tx ping ~24 bits
9. Binary string that is the length of the additional number of pings from the mobile that the receiver expects to receive in this harmonic block
10. Set of differences relative to presumed mobile transmission schedule that the network node receives, if applicable (<24 bits each)
11. Continue steps 5 through 10 as long as there are additional new mobile devices heard during this harmonic block Another Schema for Mobile Pings in a Harmonic Block In this case the schema is memoryless and therefore the first ping from a mobile device in the HB is a new event, even if pings from that device were heard in previous HBs. Although simpler, this schema consumes more bandwidth on average.

Case A: No Received Pings from any Mobile Devices in Previous Pung Packet
1. Pings from a mobile (0 or 1)?
    a. If 0, end of pung
    b. If 1, continue to 3
2. Serial number of mobile 1 (? Bits)
3. Which tx ping first mobile ping is after (3-4) bits, depending upon harmonic block size
4. Differential value of first mobile ping relative to previous tx ping ~24 bits
5. Binary string that is the length of the additional number of pings from the mobile that the receiver expects to receive in this harmonic block; e.g. (1,0,1) would indicate that of the 3 additional pings the receiver expects to hear, it only hears the first and third.
6. Set of differences relative to presumed mobile transmission schedule that the network node receives, if applicable (<24 bits each)
7. Continue steps 1 through 6 as long as there are additional mobile devices heard during this harmonic block System Architectures for Scaling Up Position Service to Many Mobile Nodes We have designed an implementation of the positioning system so that it can scale up to handle requests for position and timing for several mobile devices within a venue. For a particular venue, infrastructure nodes (e.g., GainSpan devices noted above) are placed at ceiling height and distributed around the building, without requiring a predetermined pattern. The nodes listen to mobile device messages (e.g., from user's smartphones), and pass data among each other and ultimately route that data to the web service through a wi-fi access node in buildings wireless Local Area Network. A small piece of software code runs on the user's device, instructing it to chirp to the wi-fi network. These chirps are simply UDP packets, which are countstamped upon receipt by infrastructure nodes as detailed above. A router in the network sends associated ping data to the servers of a cloud based web service, which implements the positioning and timing engine. The web service returns (X, Y, Z, t) position and time information to the requesting system, which could be an analytic system monitoring mobile devices, the mobile devices themselves, or other requesting software or device.

With this background, the following sections describe configurations for organizing and routing data collected from a position network for processing by a core positioning engine. This configuration is designed to handle the data processing for multiple moving mobile devices within a venue.

The Fixed Node Connections Structure

The following is an example of a data structure constructed to store fixed node (e.g., infrastructure node) data.

| Region | Node ID | Node Coords | Connected Nodes | Node Distances |
|--------|---------|-------------|-----------------|----------------|
| A | 1 | (x1,y1) | 2,3,6,7 | D12,d13,d16 |
| A | 4 | (x4,y4) | 2,5,8,(B,2) | |
| B | 2 | | (A,4),1,3,5 | |

In addition to illustrating this example data structure, we note the following:

The core positioning methods are given the network parameters, such as node ID, region #, and node coordinates It is up to the core methods to determine who can hear whom through analyzing the received data packets. This is done during an initialization phase of processing Separate Processing of Mobile and Fixed Node Core Operations In this version, we have tried to separate as much as possible fixed node and mobile node operations. For the case of the fixed nodes, this encompasses two tasks.

1. Compute channel delays between receivers and reference transmitters.
2. Compute rx pair parameters with all nodes that a given receiver can hear.
   a. In general, there are more valid and useful rx pairs than we compute here. For example, a pair of nodes may have a physical obstruction between them that prevents them from hearing one another. Nevertheless, they may still hear the same transmitter (in the sense of receiving its RF signal)

Table for Computing Fixed Infrastructure Parameters

| Duplex Pair ({node 1 Region, node1 ID}, {node 2 Region, node2 ID) | Common transmitters |
|---|---|
| (A,1),(A,2) | (A,3),(B,2) |
| (A,1),(A,3) | (A,2),(B,2) |
| (A,1),(B,2) | (A,2),(A,3) |

The underlying rule for computing fixed infrastructure parameters is that the rx pair must comprise a full duplex pair.

Pairs are constructed from the list of which fixed nodes heard other fixed nodes (Fixed Node Connections Structure)

Organization of the pairings proceeds from the lowest node number to the highest node number within a region and from lowest region number to highest region number. Each pair is counted once.

Mobile Receiver List

Another data structure is constructed to store a list of nodes that receive pings from a corresponding mobile device by mobile ID. For example, see the following table:

| Mobile ID | Rx ID, Region ID |
|-----------|------------------|
| M1 | (1,A),(2,A),(6,A),(10,A),(6,B) |
| M2 | (1,C),(2,C),(7,C),(5,D) |
| M3 | (2,E),(5,E),(8,E),(7,F),(9,F) |

Constructing Mobile Data Records Structures

The system constructs data records per mobile device for which positioning and timing is computed in the core methods. The following provides an example of a mobile data record data structure and processing of it.

1. Given the selected mobile ID from the menu, build a list of receivers whose data we want to grab, by region:
   a. For M1, we have Region A: (1, 2, 6) and Region B: (6)
   b. For M2, we have Region C: (1, 2, 7) and Region D: (5)
   c. For M3, we have Region E: (2, 5, 8) and Region F: (7, 9)
2. Construct a list of potential receiver pairs for each mobile ID. Then from each potential pair see if it is a full duplex pair, which means we already have reference data calculated for it.

| Mobile ID | Rx ID, Region ID | Full duplex pairs | Unconnected pairs |
|-----------|------------------|-------------------|-------------------|
| M1 | (1,A), (2,A),(6,A),(10,A),(6,B) | {(1,A),(2,A)}, {(1,A),(6,A)}, {(2,A),(10,A)}, {(6,A),(6,B)} | {(1,A),(10,A)}, {(1,A),(6,B)}, {(2,A),(6,A)}, {(2,A),(6,B)}, {(10,A),(6,B)} |
| M2 | (1,C),(2,C),(7,C),(5,D) | | |
| M3 | (2,E),(5,E),(8,E),(7,F),(9,F) | | |

3. Get all countstamp data from each listed receiver in the region for the chosen mobile ID
   a. For (M1,1,A) we have the following. NI means not important for this discussion

| Tx Region | Tx Num | Tx countstamp | Rx countstamp |
|---|---|---|---|
| — | M1 | NI | NI |
| A | 2 | NI | NI |
| A | 3 | NI | NI |
| A | 6 | NI | NI |
| A | 7 | NI | NI |
| B | 5 | NI | NI | b. For (M1,2,A) we have

| Tx Region | Tx Num |
|---|---|
| — | M1 |
| A | 1 |
| A | 3 |
| A | 5 |
| A | 7 |
| B | 5 | c. Finally, for (M1,B,6) we have the following. Evidently, (B,6) is a boundary receiver. It is closely associated with both receivers in A and B.

| Tx Region | Tx Num |
|---|---|
| — | M1 |
| A | 6 |
| A | 7 |
| B | 1 |
| B | 3 |
| B | 5 |

4. Build receiver pair/reference transmitter list for all non-connected receiver pairs. Continuing with the M1; A(1, 2,6); B(6) example, we generate the following lists:

| Rx Pair | Reference Transmitters |
|---|---|
| {(1,A),(10,A)} | {(3,A),(7,A),(5,B)} |
| {(1,A),(6,B)} | {(3,A),(7,A)} |
| {(2,A),(6,A)} | {(3,A),(5,A),(7,A)} |
| {(2,A),(6,B)} | {(7,A),(5.B)} |
| {(10,A),(6,B)} | {(7,3)} |

5. If there are transmitting nodes in the list of all reference transmitters that are not also in the list of receivers that received pings from the mobile node, we need to get the received data from all such transmitters. In this example, we have only grabbed data from one of the reference transmitters, (3,B). So, we need to grab all received data from the others.

6. For all receivers in the composite list of receivers (primary receivers+non-mobile receiving reference transmitters), get receiver coordinates and distances to any other node in the fixed node infrastructure that the receiver is expected to hear. This information is made available in the shared-memory partition dedicated to all receivers within a given region. An example of how this data is formatted is as follows:

| Receiver in R3 | Position | Nodes with expected comm | Distances |
|---|---|---|---|
| 1 | (x,y,z) | {(R3,2), (R3,3), (R3,4), (R3,5), (R3,7)},{(R4,6)} | d1, d2, d3, . . . , dN |
| 2 | Similar | Similar | Similar |
| … | … | … | … |
| 7 | (x,y,z) | Similar | Similar |

7. At this point all data required for the current mobile data record (MDR) is available and ready to process.

Additional Preprocessing

1. All data submitted to the core positioning method needs to be put in a format that is similar to the current harmonic block format.

Pseudo-Code Describing Required Core Method Adaptation for Scaling Up for Several Mobile Devices The following is a pseudo code listing of software processing positioning and timing for multiple mobile devices.

1. Highest level-loop over MDRs
   a. Get all relevant Rx data for the current mobile ID as per steps of previous section
   b. See if there is any stored data available for any of the Rx pairs in the list or ping loop data involving any reference transmitters and receivers. If so, feed that to the core method in addition to the entirety of receiver data.
   c. Apply regular non-cooperative processing to Rx pair/ Ref trans. list
   d. In addition to positioning estimates for the current mobile device, computed parameters for all Rx pairs and Rx/ref Tx ping-loops are exported. These may be used again in some other iteration of the highest level loop; i.e. this happens when the same receiver pair hears multiple mobile devices during the same processing period.
2. Internal modifications to handle non-cooperative devices (e.g., transmit only mobile devices)
   a.
      i. Round robin ranger (rrr) is software routine in the system that organizes data from nodes. It follows a node numbering and ordering scheme. It also builds Rx pairs and reference transmitter lists according to this scheme. We adapt this routine to accept the already constructed list of rxpairs/ref tx as input.
      ii. Need to make sure any potentially shared data is exported
      iii. Relevant node distances are to be computed outside of this routine, outside of the core for the most part.
   b. ProcessBlock_mobileTx. This routine is adapted to expect mobile devices that do not have a constant transmit ID.
   c. Compute_fixed_node_path_delays
      i. Similar to rrr, this routine expects a particular node ordering and numbering scheme. It needs to be adapted to accept a list of duplex pairs as input.
      ii. The routine also expects that clock rate parameters are packaged in a particular way.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the positioning and timing processes may be implemented in programmable computers, processing units or special purpose digital circuits, employing combinations of software, firmware, hardware, or combinations of software, firmware and hardware. The methods and processes described above may be implemented in programs executed from a system's memory (a computer readable medium, such as an electronic, optical or magnetic storage device). Processing modules may be implemented as software or firmware instructions executed on a processor (one or more processing units, such as a CPU, GPU, DSP, etc.), as digital circuitry, or a combination of these two.

The particular combinations of elements and features in the above-detailed embodiments are exemplary only; the interchanging and substitution of these teachings with other teachings in this and the incorporated-by-reference patents/applications are also contemplated.

I claim:

1. A method for determining location and timing for wi-fi nodes in a wi-fi network, wherein at least one of the nodes is moving, and the nodes have free running clocks, with a corresponding clock error parameter, the method comprising:
   obtaining observations of count stamps from the free running clocks for wi-fi packet transmissions between nodes in a group of the nodes occurring over a current time interval, the nodes in the group having a radio, and a processor for obtaining a count stamp from the free running clock in the node, the count stamp corresponding to receipt of a wi-fi packet transmission from another node in the group;
   with a programmed processor, generating from the model an estimate of network state based on the observations and a previous estimate of the network state, the network state comprising:
      a first difference between a previous clock parameter in a previous time interval and a corresponding clock parameter in the current time interval;
      a second difference between location parameter estimates in the previous time interval and corresponding location parameters in the current time interval;
      the model of network state characterizing statistical properties of errors between clock and location parameter estimates for a previous time interval and corresponding clock and location parameters in the current time interval;
   with a programmed processor, adding the estimate of network state to clock parameter and location parameter estimates of a previous time interval to recursively calculate updated clock parameter and location parameter estimates for the current time interval; and
   providing a solution of node position from the location parameter estimates for the current time interval via wireless transmission to at least one of the nodes.

2. The method of claim 1 where the model of network state models relationships between position of network nodes using coarse direction vectors representing coarse directions between corresponding pairs of nodes.

3. The method of claim 1 wherein the clock parameters comprise a rate offset and a clock error.

4. The method of claim 1 wherein the network state is based on statistical properties of clocks within the nodes.

5. The method of claim 1 wherein the model comprises a model of location error of nodes.

6. A system for determining location and timing for wi-fi nodes in a wi-fi network, the system comprising:
   a router in communication with network nodes for receiving, via wi-fi packet transmission from radios in the nodes, ping data transmitted between the nodes, the ping data comprising observations of clock count stamps from clocks in the nodes for pings of wi-fi packets wirelessly transmitted between radios in pairs of the nodes;
   clock count stamps being produced by a processor in a node by latching count values of a clock in a node upon receipt of a wi-fi packet;
   a processing agent in communication with the router for receiving the ping data and organizing the ping data for a time interval; and
   a solution agent for receiving the organized ping data from the processing agent and applying the organized ping data to a model of network state, and generating from the model an estimate of network state based on the observations and a previous estimate of the network state, the network state comprising:
   a first difference between a previous clock parameter in a previous time interval and a corresponding clock parameter in the current time interval;
   a second difference between location parameter estimates in the previous time interval and corresponding location parameters in the current time interval;
   the model of network state characterizing statistical properties of errors between clock and location parameter estimates for a previous time interval and corresponding clock and location parameters in the current time interval;
   the solution agent configured to add the estimate of network state to clock parameter and location parameter estimates of a previous time interval to recursively calculate updated clock parameter and location parameter estimates for the current time interval, the solution agent in communication with a wireless radio, the solution agent configured to provide a solution of node position from the location parameter estimates for the current time interval via wireless transmission from the wireless radio to at least one of the nodes.

7. The system of claim 6 further including a grouping agent, the grouping agent in communication with the router for establishing the network of nodes that participate in providing the ping data that is organized and applied to the model of network state.

8. The system of claim 7 wherein the grouping agent is in communication with the processing agent for identifying the nodes that form the network for determining position and timing solutions by the solution agent, the processing agent using identification of the network from the grouping agent to organize ping data into the organized ping data.

9. A method for determining position of a first node in a network of devices, the method comprising:
   receiving timing for wi-fi transmission of signals between radios in pairs of nodes in the network, the timing providing time of flight of the signals based on internal, free running clocks in the nodes;
   with a processor, initializing a model of state of position of the nodes in the network;
   with a processor, generating from the model an estimate of state based on the observations of the timing over a current time interval and a previous estimate of state, the state comprising:

a first difference between a previous clock parameter in a previous time interval and a corresponding clock parameter in the current time interval;

a second difference between location parameter estimates in the previous time interval and corresponding location parameters in the current time interval;

the model of state characterizing statistical properties of errors between clock and location parameter estimates for a previous time interval and corresponding clock and location parameters in the current time interval;

with a processor, adding the estimate of state to clock parameter and location parameter estimates of a previous time interval to recursively calculate updated clock parameter and location parameter estimates for the current time interval; and with a processor in communication with a wireless radio, providing a solution of node position of the first node from the location parameter estimates for the current time interval, the solution being provided to the first node via wireless transmission from the wireless radio to a radio in the first node.

10. The method of claim 9 further including collecting the timing from the nodes and, for pairs of nodes in the network, organizing the timing into relationships between error in relative position of the nodes of a pair and differences between estimated and observed distances between the nodes of a pair.

11. The method of claim 10 wherein the relationships are linearized such that the model of the state is based on linear relationships for error in relative position of pairs of nodes.

12. The method of claim 11 wherein the relationships are linearized based on a coarse direction vector estimating direction between nodes in a pair.

13. The method of claim 9 wherein the model of state is based in part on variance in clock rate and clock offset of the clocks in the nodes.

14. The method of claim 9 wherein updating the model includes updating an estimate of node clock parameters based on input clock estimates and observations of clock parameters over a time interval.

15. The method of claim 9 wherein a reference clock is updated over time as a function of recursively estimated clock parameters for clocks in the nodes of the network.

16. The method of claim 9 wherein a reference coordinate space for nodes in the network is updated in time as a function of recursively estimated node position.

17. The method of claim 16 wherein a reference clock is updated over time as a function of recursively estimated clock parameters for clocks in the nodes of the network.

18. The method of claim 9 wherein the model is based on variances in clock rates of independent clocks in the nodes.

19. A tangible, non-transitory, computer readable medium, on which is stored instructions for performing a method of determining position or timing of nodes, the method comprising:

obtaining observations of count stamps from free running clocks in the nodes for wi-fi radio transmissions between the nodes in a group of the nodes occurring over a time interval, the nodes in the group having a radio, and a processor for obtaining a count stamp from the free running clock in the node, the count stamp corresponding to receipt of a wireless radio transmission from another node in the group;

applying the observations to a model of network state; and generating from the model an estimate of network state based on the observations and previous estimate of the network state, the network state comprising:

a first difference between a previous clock parameter in a previous time interval and a corresponding clock parameter in the current time interval;

a second difference between location parameter estimates in the previous time interval and corresponding location parameters in the current time interval;

the model of network state characterizing statistical properties of errors between clock and location parameter estimates for a previous time interval and corresponding clock and location parameters in the current time interval;

with a programmed processor, adding the estimate of network state to clock parameter and location parameter estimates of a previous time interval to recursively calculate updated clock parameter and location parameter estimates for the current time interval; and providing a solution of node position from the location parameter estimates for the current time interval via wireless transmission to at least one of the nodes.

* * * * *